United States Patent
Qiao et al.

(10) Patent No.: US 11,146,986 B2
(45) Date of Patent: Oct. 12, 2021

(54) AF INITIATED ALWAYS-ON PDU SESSION

(71) Applicant: Ofinno, LLC, Reston, VA (US)

(72) Inventors: Weihua Qiao, Herndon, VA (US);
Esmael Hejazi Dinan, McLean, VA (US); Kyungmin Park, Vienna, VA (US); Peyman Talebi Fard, Sterling, VA (US); Jayshree Bharatia, Plano, TX (US); Jinsook Ryu, Herndon, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

(21) Appl. No.: 16/721,238

(22) Filed: Dec. 19, 2019

(65) Prior Publication Data
US 2020/0213897 A1   Jul. 2, 2020

Related U.S. Application Data

(60) Provisional application No. 62/785,946, filed on Dec. 28, 2018, provisional application No. 62/786,897, filed on Dec. 31, 2018, provisional application No. 62/791,490, filed on Jan. 11, 2019.

(51) Int. Cl.
*H04W 28/02* (2009.01)
*H04W 76/10* (2018.01)
*H04W 8/20* (2009.01)

(52) U.S. Cl.
CPC ......... *H04W 28/0268* (2013.01); *H04W 8/20* (2013.01); *H04W 76/10* (2018.02)

(58) Field of Classification Search
CPC .... H04W 28/0268; H04W 76/10; H04W 8/20
USPC ......................................... 370/310, 328, 329
See application file for complete search history.

(56) References Cited

U.S. PATENT DOCUMENTS

| | | | |
|---|---|---|---|
| 6,854,014 B1 | 2/2005 | Amin et al. | |
| 2012/0246325 A1 | 9/2012 | Marcos et al. | |
| 2017/0288886 A1 | 10/2017 | Atarius et al. | |
| 2019/0364541 A1* | 11/2019 | Ryu | H04W 76/25 |
| 2020/0099750 A1* | 3/2020 | Kim | H04W 76/25 |

FOREIGN PATENT DOCUMENTS

| | | |
|---|---|---|
| WO | 2014016676 A1 | 1/2014 |
| WO | 2018008980 A1 | 1/2018 |
| WO | 2018231029 A1 | 12/2018 |

OTHER PUBLICATIONS

3GPP TS 23.502v15.4.0, Technical Specification Group Services and System Aspects; Procedures for the 5G System; Release 15; dated Dec. 18, 2018; 346 pages. (Year: 2018).*

(Continued)

*Primary Examiner* — Obaidul Huq
(74) *Attorney, Agent, or Firm* — Philip R. Smith; Kavon Nasabzadeh; Jacob L. Mangan

(57) ABSTRACT

A policy control function (PCF) receives a first message from an application function (AF). The first message comprises: an always-on PDU session requested indication; an identity of a wireless device; and application service information. The PCF maps, based on the first message, the application service information to an always-on PDU Session for the wireless device. The PCF sends to a session management function (SMF), at least one policy and charging rule for the always-on PDU Session.

20 Claims, 40 Drawing Sheets

(56) References Cited

OTHER PUBLICATIONS

3GPP TS 24.501v15.1.0, Technical Specification Group Core Network and Terminals; Non-Access-Stratum (NAS) protocol for 5G system (5GS); Release 15; dated Sep. 21, 2018; 398 pages. (Year: 2018).*
3GPP TS 23.203 V15.0.0 (Sep. 2017); 3rd Generation Partnership Project; Technical Specification Group Services and System Aspects; Policy and charging control architecture (Release 15).
3GPP TS 23.502 V15.0.0 (Dec. 2017); 3rd Generation Partnership Project; Technical Specification Group Services and System Aspects; Procedures for the 5G System; Stage 2 (Release 15).
3GPP TS 24.501 V15.0.0 (Jun. 2018); 3rd Generation Partnership Project; Technical Specification Group Core Network and Terminals; Non-Access-Stratum (NAS) protocol for 5G System (5GS); Stage 3 (Release 15).
3GPP TS 23.501 V15.0.0 (Dec. 2017); 3rd Generation Partnership Project; Technical Specification Group Services and System Aspects; System Architecture for the 5G System; Stage 2 (Release 15).
International Search Report and Written Opinion for International Application No. PCT/US19/067472, dated May 11, 2020.
3GPP TSG-CT WG1 Meeting #110 C1-182183; Kunming (P.R of China), Apr. 16-20, 2018 (was C1-181196); Source Qualcomm Incorporated, Intel, Nokia, Nokia Shanghai Bell, InterDigital, ZTE; Title: Concurrent service request procedures not allowed; Spec: 3GPP TS 24.501 v1.0.0; Agenda item: 15.2.2.3; Document for: Agreement.
3GPP TSG CT WG1 Meeting #110 C1-182334; Kunming (P.R. of China), Apr. 16-20, 2018; Source: Samsung; Title: Disc of 5G SR in comparison with legacy SR.; Agenda item: 15.2.2.3; Document for: Discussion.
3GPP TSG-CT WG1 Meeting #110 C1-182335; Kunming (P.R. of China), Apr. 16-20, 2018; Source: Samsung; Title: Discussion on KPIs in 5G.; Agenda item: 15.2.2.3; Document for: Discussion.
3GPP TSG-CT WG1 Meeting #110 C1-182336; Kunming (P.R. of China), Apr. 16-20, 2018; Source: Samsung, Vodafone, Deutsche Telekom; Title: SR in 5G ; Spec: 3GPP TS 24.501 v1.0; Agenda item: 15.2.2.3; Document for: Agreement.
3GPP TSG-CT WG1 Meeting #110 C1-182708; Kunming (P.R. of China), Apr. 16-20, 2018; Source: Samsung, Qualcomm Incorporated, Vodafone, Deutsche Telekom, InterDigital, Huawei, Hisilicon, Intel, T-Mobile USA; Title: SR in 5G—Alt 2; Spec: 3GPP TS 24.501 v1.0; Agenda item: 15.2.2.3; Document for: Agreement.
3GPP TSG-CT WG1 Meeting #113 C1-188319; West Palm Beach (FL), USA, Nov. 26-30, 2018; Change Request; rev—Current version: 15.1.0; Title: Setting of the Uplink data status IE for always-on PDU sessions; Source to WG: Intel; Source to TSG: C1; Work item code: 5GS_Ph1-CT Date: Nov. 19, 2018; Category: F Release: Rel-15.
3GPP TSG-CT WG1 Meeting #113 C1-188350; West Palm Beach (FL), USA, Nov. 26-30, 2018; CR-Form-v11.2; Change Request; 24.501 CR 0646 rev—Current version: 15.1.0; Title: Always-on PDU sessions and associated access; Source to WG: vivo; Source to TSG: C1; Work item code: 5GS_Ph1-CT Date: Nov. 6, 2018; Category: F Release: Rel-15.
SA WG2 Meeting #S2-127BIS S2-184683; May 28-Jun. 1, 2018, Newport Beach, California, USA; 3GPP TSG CT WG1 Meeting# 110; TDoc C1-182809; Kunming (P.R. of China), Apr. 16-20, 2018; Title: LS on SR in 5G; Response to: None; Release: Release 15; Work Item: 5GS_Ph1-CT.
SA WG2 Meeting #127bis S2-186173; May 28-Jun. 1, 2018, Newport Beach, USA; Title: Reply LS on SR in 5G; Reply to: (C1-182809/S2-184638) LS on SR in 5G; Release: Release 15; Work Item: 5GS_Ph1-CT.
SA WG2 Meeting #S2-129 S2-1810016; Oct. 15-19, 2018, Dongguan, P.R. China; 3GPP TSG CT WG1 Meeting 112 TDoc C1-185795; West Palm Beach, FL (USA), Aug. 20-24, 2018; Title: Working Agreement on "Network control for always-on PDU sessions"; Release: 15; Work Item: 5GS_Ph1-CT.

3GPP TSG-SA WG2 Meeting #129 S2-1811571; Oct. 15-19, 2018, Dongguan, P. R. China (revision of S2-1811425); CR-Form-v11.2; Change Request; 23.501 CR 0679 rev 3 Current version: 15.3.0; Title: Alignment for always-on PDU sessions; Source to WG: Catt, Ericsson; Source to TSG: S2; Work item code: 5GS_Ph1 Date Oct. 2, 2018; Category: F Release: Rel-15.
3GPP TSG-SA WG2 Meeting #129 S2-1811572; Oct. 15-19, 2018, Dongguan, P. R. China (revision of S2-1811426); CR-Form-v11.2; Change Request; 23.502 CR 0786 rev 3 Current version: 15.3.0; Proposed change affects: UICC apps Me X Radio Access Network Core Network X; Title: Alignment for always-on PDU sessions; Source to WG: Catt, Ericsson; Source to TSG: S2; Work item code: 5GS_Ph1 Date: Oct. 2, 2018; Category: F Release: Rel-15.
3GPP TSG-SA WG2 Meeting #129-Bis S2-1811843; Nov. 26-30, 2018, West Palm Beach, USA (revision of S2-181xxx); CR-Form-v11.2; Change Request; 23.501 CR 0699 rev Current version: 15.3.0; Proposed change affects: UICC apps Me Radio Access Network Core Network X; Title: Selective deactivation for always-on PDU sessions; Source to WG: NTT Docomo, LG Electronics, Ericsson; Source to TSG: S2; Work item code: 5GS_Ph1 Date: Nov. 15, 2018; Category: F Release: Rel-15.
3GPP TSG-SA WG2 Meeting #129-Bis S2-1811844; Nov. 26-30, 2018, West Palm Beach, USA (revision of S2-181xxxx); CR-Form-v11.2; Change Request; 23.502 CR 0817 rev Current version: 15.3.0; Title: Selective deactivation for always-on PDU sessions; Source to WG: NTT Docomo, LG Electronics, Ericsson; Source to TSG S2; Work item code: 5GS_Ph1 Date: Nov. 15, 2018; Category: F Release: Rel-15.
3GPP TSG-SA WG2 Meeting #129bis S2-1812148; Nov. 26-30, 2018, West Palm Beach, USA; CR-Form-v11.2; Change Request; 23.501 CR 0721 rev—Current version: 15.3.0; Title: Always on Setting for the EBI allocated PDU Session; Source to WG: Huawei, HiSilicon; Source to TSG: SA2; Work item code: 5GS_Ph1 Date Nov. 20, 2018; Category: F Release: Rel-15.
3GPP TSG-SA WG2 Meeting #129bis S2-1812149; Nov. 26-30, 2018, West Palm Beach, USA; CR-Form-v11.2; Change Request; 23.502 CR 0844 rev—Current version: 15.3.0; Proposed change affects: UICC apps Me X Radio Access Network Core Network X; Title: Always on Setting for the EBI allocated PDU Session; Source to WG: Huawei, HiSilicon; Source to TSG: S2; Work item code: 5GS_Ph1 Date: Nov. 20, 2018; Category: F Release: Rel-15.
3GPP TSG-SA WG2 Meeting #129bis; S2-1812159; West Palm Beach, USA, Nov. 26-30, 2018; Source: LG Electronics; Title: Discussion on Always-on PDU Session; Document for: Discussion; Agenda Item: 6.5.7 3GPP access specific functionality and flows; Work Item / Release: 5GS_Ph1 / Rel-15.
3GPP TSG-SA WG2 Meeting #129 S2-1812168; Oct. 15-19, 2018, Dongguan, P. R. China (revision of S2-1811571); CR-Form-v11.2; Change Request; 23.501 CR 0679 rev 4 Current version: 15.3.0; Proposed change affects: UICC apps Me X Radio Access Network Core Network X; Title: Alignment for always-on PDU sessions; Source to WG: LG Electronics; Source to TSG: S2; Work item code: 5GS_Ph1 Date: Oct. 2, 2018; Category: F Release: Rel-15.
3GPP TSG-SA WG2 Meeting #129bis S2-1812341; Nov. 26-30, West Palm Beach, USA (revision of S2-18xxxxx); CR-Form-v11.2; Change Request; 23.503 CR 0184 rev—Current version: 15.3.0; Proposed change affects: UICC apps Me X Radio Access Network Core Network X; Title: UE criteria to request always-on PDU session; Source to WG: Nokia, Nokia Shanghai Bell; Source to TSG: SA2; Work item code: 5GS_Ph1 Date Nov. 1, 2018; Category: C Release: Rel-15.
3GPP TSG-SA WG2 Meeting #129bis S2-1812344; Nov. 26-30, 2018, West Palm Beach, USA (revision of S2-1811425); CR-Form-v11.2; Change Request; 23.501 CR 0679 rev 5 Current version: 15.3.0 ; Proposed change affects: UICC apps Me X Radio Access Network Core Network X; Title: Alignment for always-on PDU sessions; Source to WG: Nokia, Nokia Shanghai Bell; Source to TSG: S2; Work item code: 5GS_Ph1 Date Nov. 1, 2018; Category: F Release: Rel-15.

* cited by examiner

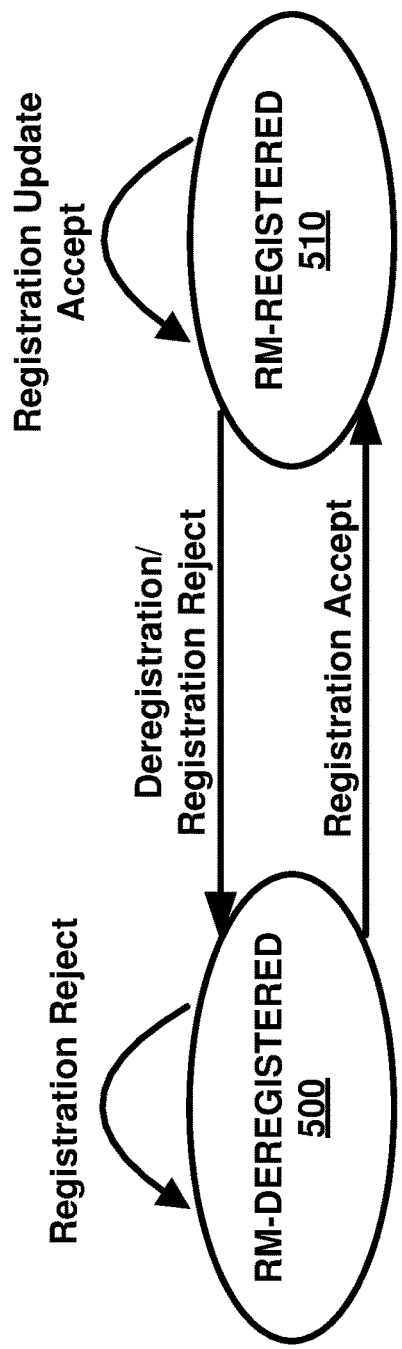
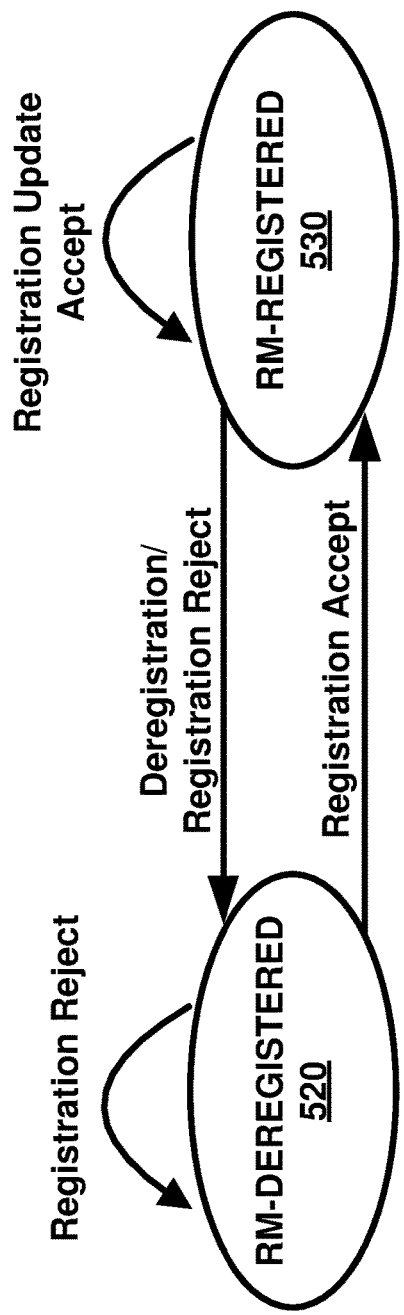
FIG. 5A
FIG. 5B

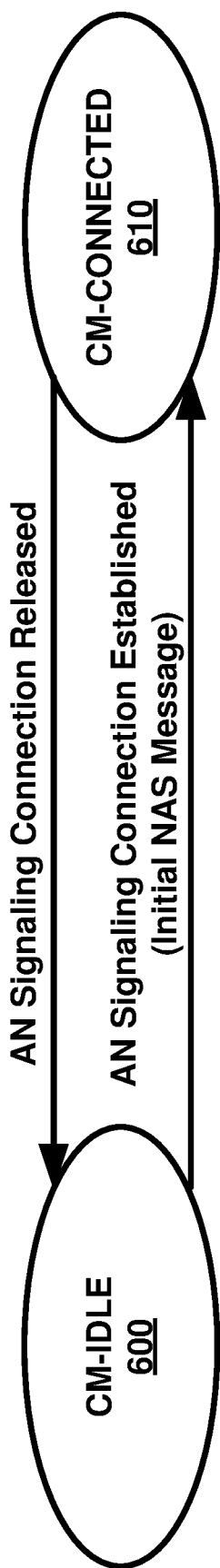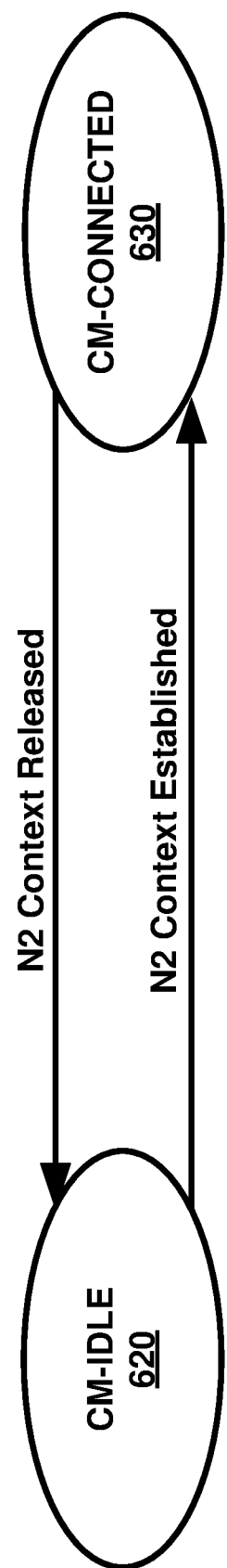

| Information name | Description | Category | PCF permitted to modify in a UE context | Scope |
|---|---|---|---|---|
| Rule Precedence | Determines the order the URSP rule is enforced in the UE. | Mandatory (NOTE 1) | Yes | UE context |
| Traffic descriptor | *This part defines the traffic descriptors for the URSP rule.* | | | |
| Application descriptors | It consists of OSId and OSAppId(s). (NOTE 2) | Optional | Yes | UE context |
| List of Restricted Service for Always-On PDU Session | List of Application Identifiers, and an indication specifying the Restricted Service is allowed or not allowed for Always-On PDU Session | Optional | Yes | UE context |
| IP descriptors | IP 3 tuple(s) (destination IP address or IPv6 network prefix, destination port number, protocol ID of the protocol above IP). | Optional | Yes | UE context |
| Non-IP descriptors | Descriptor(s) for non-IP traffic | Optional | Yes | UE context |
| DNN | This is the DNN information provided by the application. | Optional | Yes | UE context |
| Connection Capabilities | This is the information provided by a UE application when it requests a network connection with certain capabilities. | Optional | Yes | UE context |
| List of Route Selection Descriptors | A list of Route Selection Descriptors. | Mandatory | | |
| NOTE 1: Rules in a URSP shall have different precedence values. | | | | |
| NOTE 2: The information is used to identify the Application(s) that is(are) running on the UE's OS. | | | | |

FIG. 21

Receive, by a SMF from a wireless device, a 1st message comprising: a request to establish PDU session(s) for a wireless device, the 1st message comprising a parameter indicating a request for an always-on PDU session Send, by the SMF to a PCF, a 2nd message comprising the parameter indicating a request for an always-on PDU session Receive, by the SMF from the PCF, a 3rd message comprising: policy and charging control rule(s), where the policy and charging control rule(s) comprise a charging rate for the always-on PDU session; and an always-on PDU session granted indication indicating the request for an always-on PDU session is granted Determine, by the SMF a requested charging rate based on the charging rate Select, by the SMF a CHF based on policy and charging control rule(s) and the always-on PDU session granted indication Send, by the SMF to the CHF, a charging request message comprising the requested charging rate and the always-on PDU session granted indication

FIG. 25

```
Send, by a PCF to a UDM, a 1st message comprising: an always-on PDU
session granted indication for an always-on PDU session; an PDU session ID for
       the always-on PDU session; and an identify of a wireless device
```

```
Receive, by the PCF from the UDM, a 2nd message comprising: the always-on
   PDU session requested indication; the identify of a wireless device; and
                      application service information
```

```
Map, by the PCF based on the 2nd message, the application service information
              to an always-on PDU Session for the wireless device
```

```
Determine, by the PCF based on the application service information, apolicy
              and charging rule(s) for the always-on PDU Session
```

```
Send, by the PCF to the SMF, a 3rd message comprising the policy and
                            charging rule(s)
```

FIG. 34

AF INITIATED ALWAYS-ON PDU SESSION

CROSS-REFERENCE TO RELATED APPLICATIONS

This application claims the benefit of U.S. Provisional Application No. 62/785,946, filed Dec. 28, 2018, U.S. Provisional Application No. 62/786,897, filed Dec. 31, 2018, and U.S. Provisional Application No. 62/791,490, filed Jan. 11, 2019, which are hereby incorporated by reference in their entirety.

BRIEF DESCRIPTION OF THE SEVERAL VIEWS OF THE DRAWINGS

Examples of several of the various embodiments of the present disclosure are described herein with reference to the drawings.

FIG. 5A and FIG. 5B depict two registration management state models in UE 100 and AMF 155 as per an aspect of embodiments of the present disclosure.

FIG. 6A and FIG. 6B depict two connection management state models in UE 100 and AMF 155 as per an aspect of embodiments of the present disclosure.

FIG. 21 is an example diagram depicting the UE route selection policy as per an aspect of an embodiment of the present disclosure.

FIG. 25 is an example diagram depicting the procedures of SMF as per an aspect of an embodiment of the present disclosure.

FIG. 34 is an example diagram depicting the procedures of PCF as per an aspect of an embodiment of the present disclosure.

DETAILED DESCRIPTION OF EXAMPLES

Example embodiments of the present invention enable implementation of enhanced features and functionalities in 5G systems. More particularly, the embodiments of the technology disclosed herein may relate to restricted service (e.g. for 5G or future communication system) for always-on PDU session. The embodiments of the technology disclosed herein may relate to policy and charging control for always-on PDU session. The embodiments of the technology disclosed herein may relate to AF initiated always-on PDU session. Throughout the present disclosure, UE, wireless device, and mobile device are used interchangeably. Throughout the present disclosure, base station, (Radio) Access Network ((R)AN), Next Generation Radio Access Network (NG-RAN), New radio Node B (gNB), Next Generation eNodeB (ng-eNBs) are used interchangeably.

Figure 1:
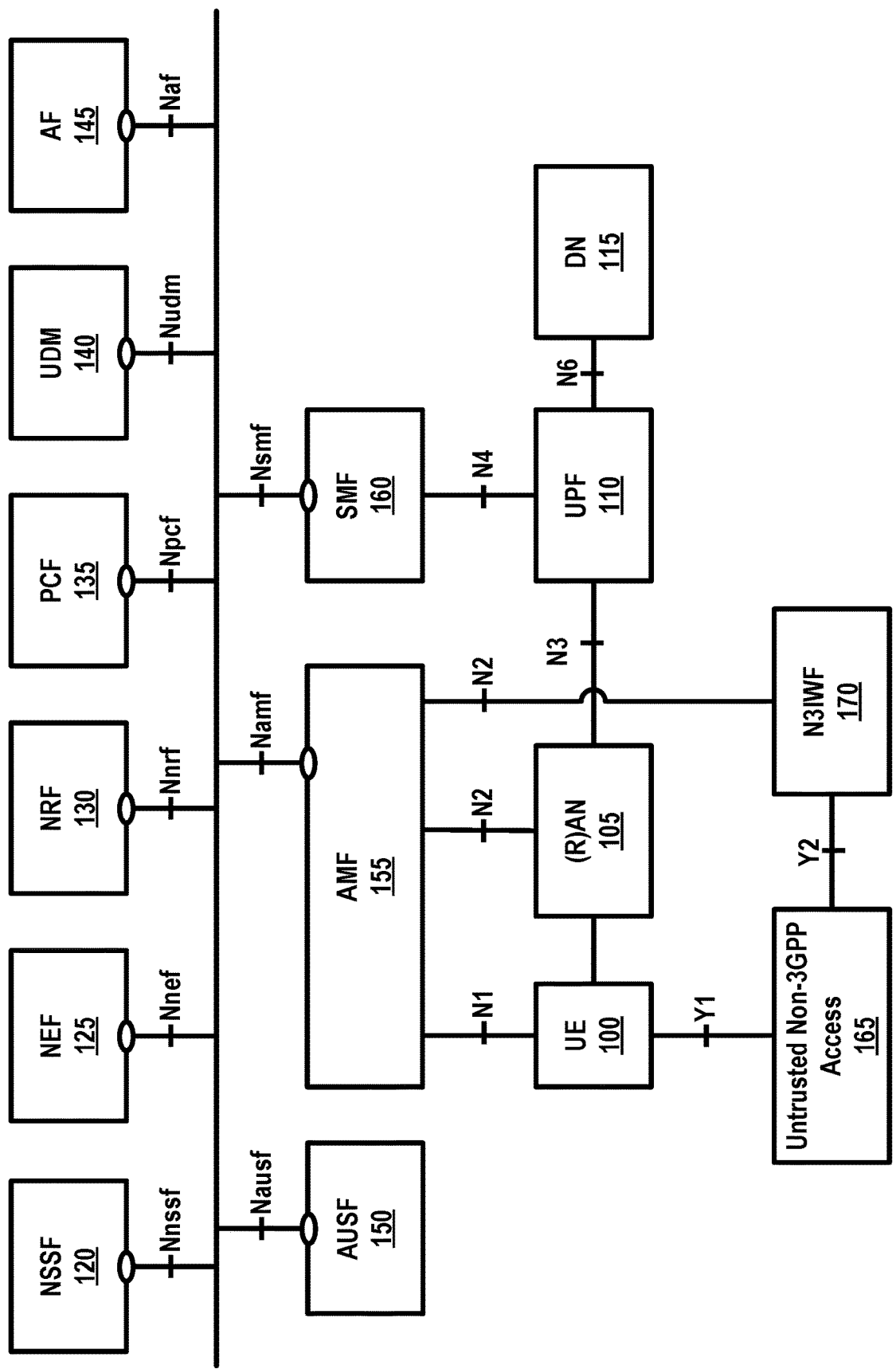
FIG. 1 is a diagram of an example 5G system architecture as per an aspect of an embodiment of the present disclosure.
Figure 2:
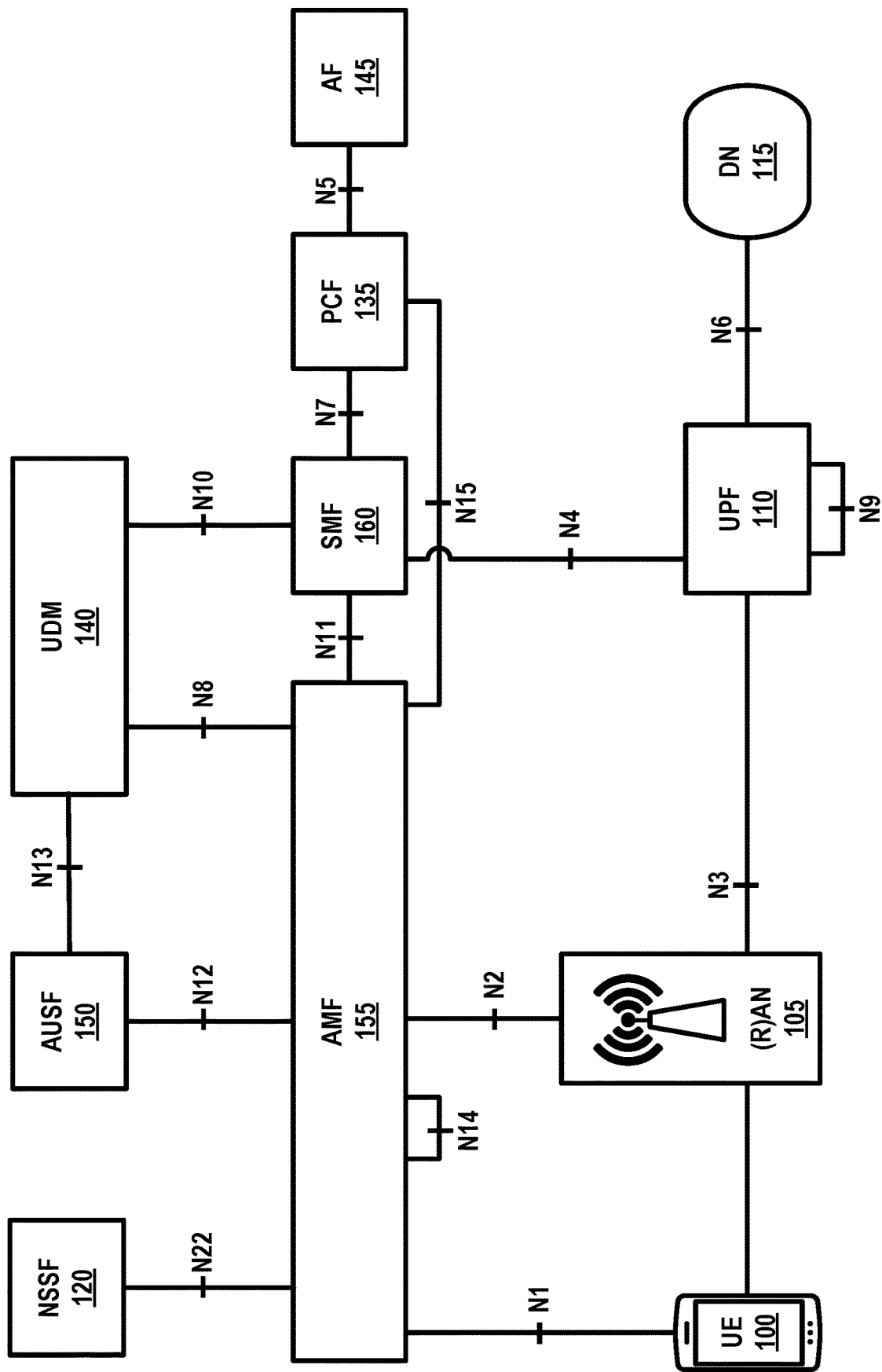
FIG. 2 is a diagram of an example 5G System architecture as per an aspect of an embodiment of the present disclosure.

The following acronyms are used throughout the present disclosure:

5G 5th generation mobile networks
5GC 5G Core Network
5GS 5G System
5G-AN 5G Access Network
5QI 5G QoS Indicator
AF Application Function
AMBR Aggregate Maximum Bit Rate
AMF Access and Mobility Management Function
AN Access Network
APN Access Point Name
ARP Allocation and Retention Priority
BD Billing Domain
CDR Charging Data Record
CHF Charging Function
CN Core Network
CP Control Plane
DDoS Distributed Denial of Service
DL Downlink
DN Data Network
DN-AAA Data Network Authentication Authorization and Accounting
DNN Data Network Name
EPS Evolved Packet System
FDD Frequency Division Duplex
FQDN Fully Qualified Domain Name
GPSI Generic Public Subscription Identifier
GW Gateway
HTTP Hypertext Transfer Protocol
ID Identifier
IMS IP Multimedia core network Subsystem
IOT Internet of Things
IP Internet Protocol
IP-CAN IP Connectivity Access Network
L2 Layer 2 (data link layer)
L3 Layer 3 (network layer)
LADN Local Area Data Network
LAN local area network
MAC Media Access Control
MICO Mobile Initiated Connection Only
N3IWF Non-3GPP InterWorking Function
NAS Non Access Stratum
NAT Network address translation
NEF Network Exposure Function
NF Network Function
NR New Radio
NG-RAN NR Radio Access Network
NRF Network Repository Function
NSI Network Slice Instance
NSSAI Network Slice Selection Assistance Information
NSSF Network Slice Selection Function
NWDAF Network Data Analytics Function
OAM Operation Administration and Maintenance
PCC Policy and Charging Control
PCF Policy Control Function
PDU Packet Data Unit
PEI Permanent Equipment Identifier
PLMN Public Land Mobile Network
QCI QoS Class Identifier
QFI QoS Flow Identifier
QoS Quality of Service
RA Random Access
RAN Radio Access Network
RAT Radio Access Technology
RRC Radio Resource Control
RM Registration Management
SBA Service Based Architecture
SM Session Management
SMF Session Management Function
SMSF SMS Function
S-NSSAI Single Network Slice Selection Assistance information
SS Synchronization Signal
SSC Session and Service Continuity
SUPI Subscriber Permanent Identifier
TA Tracking Area
TAI Tracking Area Identity
TCP Transmission Control Protocol
UDR Unified Data Repository
UDM Unified Data Management
UDP User Datagram Protocol
UE User Equipment
UL Uplink
UL CL Uplink Classifier
UPF User Plane Function
URLLC Ultra-Reliable Low Latency Communication
XML Extensible Markup Language Example FIG. 1 and FIG. 2 depict a 5G system comprising of access networks and 5G core network. An example 5G access network may comprise an access network connecting to a 5G core network. An access network may comprise an NG-RAN 105 and/or non-3GPP AN 165. An example 5G core network may connect to one or more 5G access networks 5G-AN and/or NG-RANs. 5G core network may comprise functional elements or network functions as in example FIG. 1 and example FIG. 2 where interfaces may be employed for communication among the functional elements and/or network elements.

Figure 3:
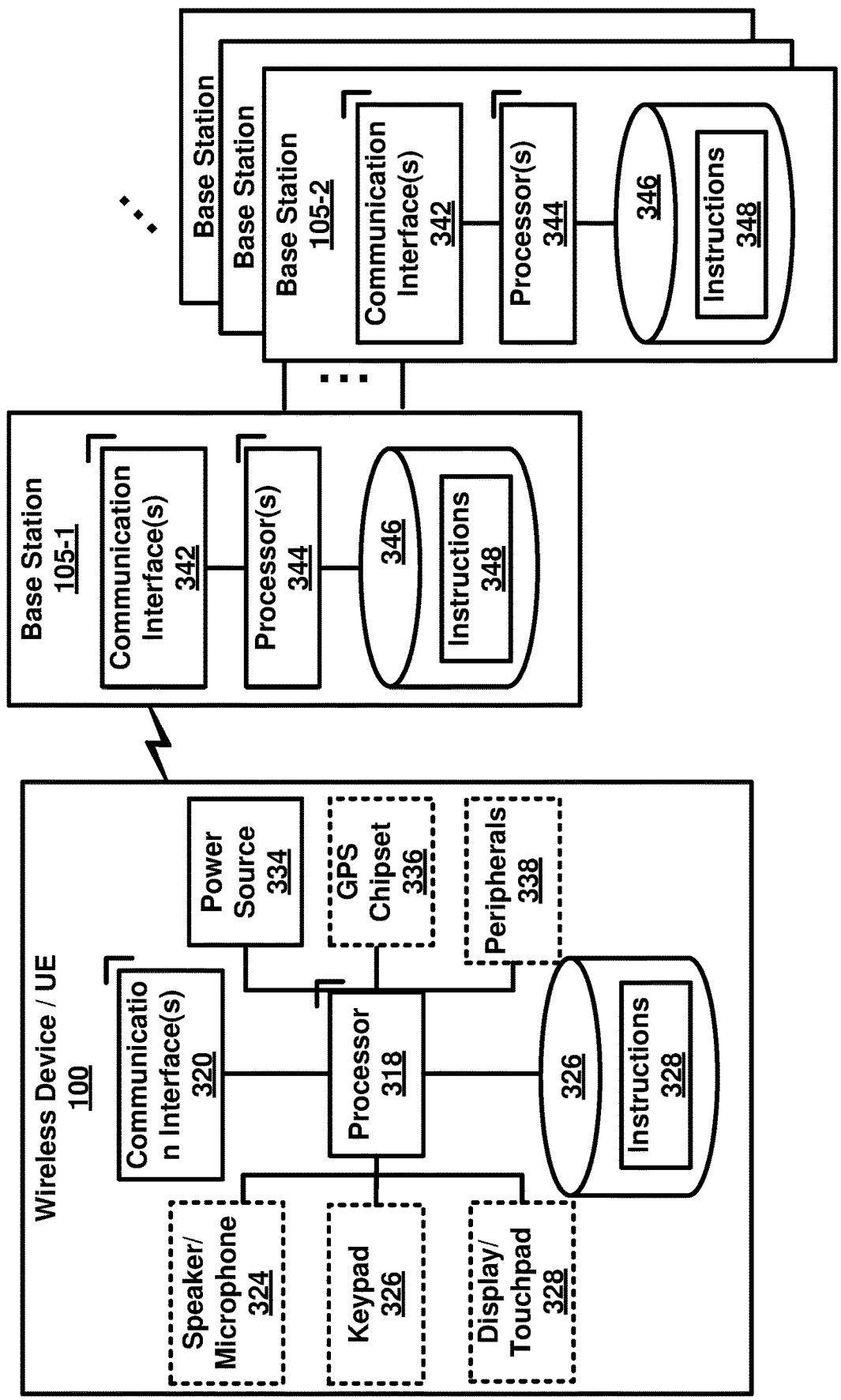
FIG. 3 is a system diagram of an example wireless device and a network node in a 5G system as per an aspect of an embodiment of the present disclosure.
Figure 4:
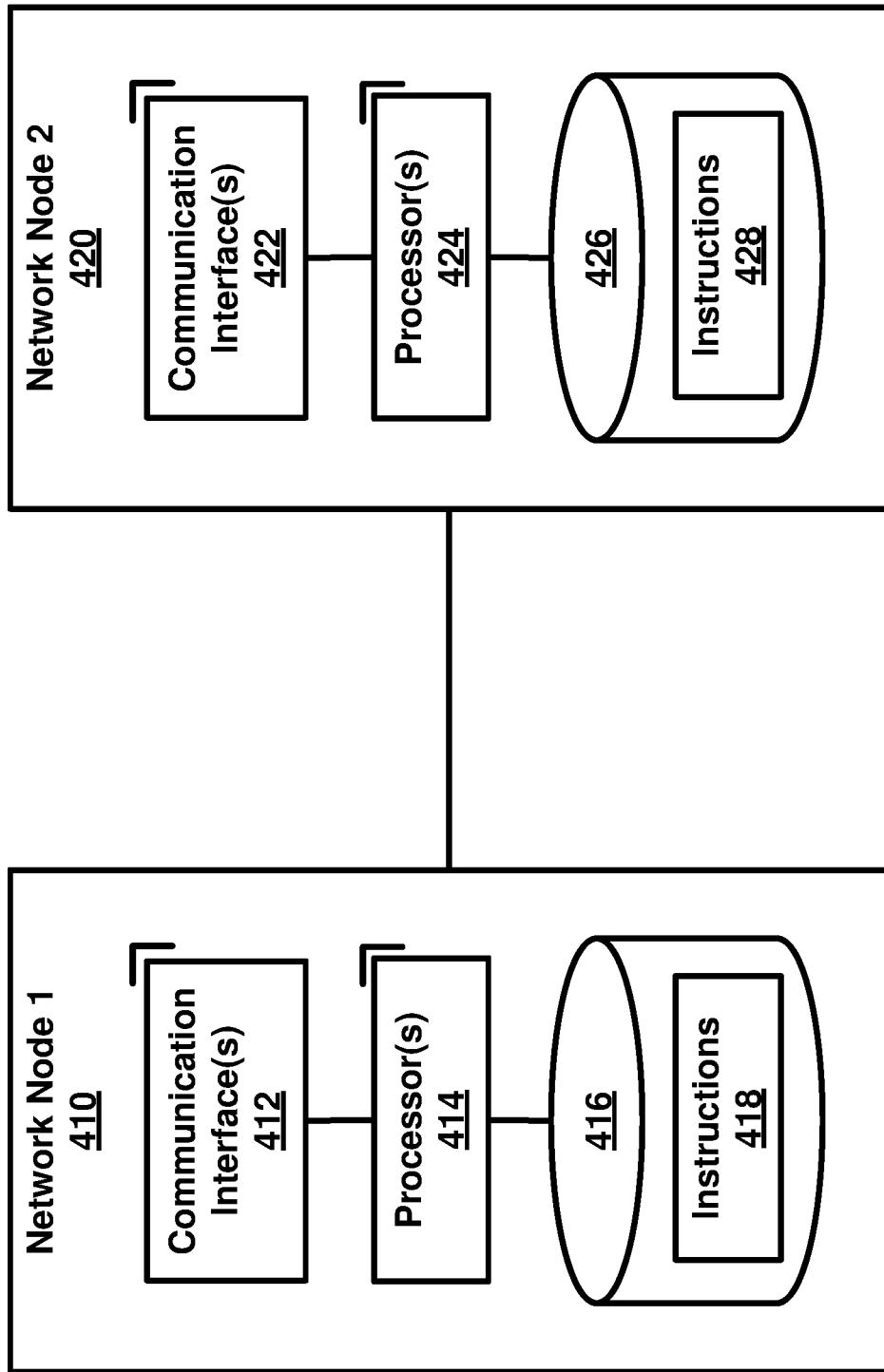
FIG. 4 is a system diagram of an example network nodes as per an aspect of an embodiment of the present disclosure.

In an example, a network function may be a processing function in a network, which may have a functional behavior and/or interfaces. A network function may be implemented either as a network element on a dedicated hardware, and/or a network node as depicted in FIG. 3 and FIG. 4, or as a software instance running on a dedicated hardware and/or shared hardware, or as a virtualized function instantiated on an appropriate platform.

In an example, access and mobility management function, AMF 155, may include the following functionalities (some of the AMF 155 functionalities may be supported in a single instance of an AMF 155): termination of RAN 105 CP interface (N2), termination of NAS (N1), NAS ciphering and integrity protection, registration management, connection management, reachability management, mobility management, lawful intercept (for AMF 155 events and interface to LI system), provide transport for session management, SM messages between UE 100 and SMF 160, transparent proxy for routing SM messages, access authentication, access authorization, provide transport for SMS messages between UE 100 and SMSF, security anchor function, SEA, interaction with the AUSF 150 and the UE 100, receiving the intermediate key established as a result of the UE 100 authentication process, security context management, SCM, that receives a key from the SEA that it uses to derive access network specific keys, and/or the like.

In an example, the AMF 155 may support non-3GPP access networks through N2 interface with N3IWF 170, NAS signaling with a UE 100 over N3IWF 170, authentication of UEs connected over N3IWF 170, management of mobility, authentication, and separate security context state(s) of a UE 100 connected via non-3GPP access 165 or connected via 3GPP access 105 and non-3GPP access 165 simultaneously, support of a coordinated RM context valid over 3GPP access 105 and non 3GPP access 165, support of CM management contexts for the UE 100 for connectivity over non-3GPP access, and/or the like.

In an example, an AMF 155 region may comprise one or multiple AMF 155 sets. The AMF 155 set may comprise some AMF 155 that serve a given area and/or network slice(s). In an example, multiple AMF 155 sets may be per AMF 155 region and/or network slice(s). Application identifier may be an identifier that may be mapped to a specific application traffic detection rule. Configured NSSAI may be an NSSAI that may be provisioned in a UE 100. DN 115 access identifier (DNAI), for a DNN, may be an identifier of a user plane access to a DN 115. Initial registration may be related to a UE 100 registration in RM-DEREGISTERED 500, 520 states. N2AP UE 100 association may be a logical per UE 100 association between a 5G AN node and an AMF 155. N2AP UE-TNLA-binding may be a binding between a N2AP UE 100 association and a specific transport network layer, TNL association for a given UE 100.

In an example, session management function, SMF 160, may include one or more of the following functionalities (one or more of the SMF 160 functionalities may be supported in a single instance of an SMF 160): session management (e.g. session establishment, modify and release, including tunnel maintain between UPF 110 and AN 105 node), UE 100 IP address allocation & management (including optional authorization), selection and control of UP function(s), configuration of traffic steering at UPF 110 to route traffic to proper destination, termination of interfaces towards policy control functions, control part of policy enforcement and QoS. lawful intercept (for SM events and interface to LI System), termination of SM parts of NAS messages, downlink data notification, initiation of AN specific SM information, sent via AMF 155 over N2 to (R)AN 105, determination of SSC mode of a session, roaming functionality, handling local enforcement to apply QoS SLAs (VPLMN), charging data collection and charging interface (VPLMN), lawful intercept (in VPLMN for SM events and interface to LI System), support for interaction with external DN 115 for transport of signaling for PDU session authorization/authentication by external DN 115, and/or the like.

In an example, a user plane function, UPF 110, may include one or more of the following functionalities (some of the UPF 110 functionalities may be supported in a single instance of a UPF 110): anchor point for Intra-/Inter-RAT mobility (when applicable), external PDU session point of interconnect to DN 115, packet routing & forwarding, packet inspection and user plane part of policy rule enforcement, lawful intercept (UP collection), traffic usage reporting, uplink classifier to support routing traffic flows to a data network, branching point to support multi-homed PDU session(s), QoS handling for user plane, uplink traffic verification (SDF to QoS flow mapping), transport level packet marking in the uplink and downlink, downlink packet buffering, downlink data notification triggering, and/or the like.

In an example, the UE 100 IP address management may include allocation and release of the UE 100 IP address and/or renewal of the allocated IP address. The UE 100 may set a requested PDU type during a PDU session establishment procedure based on its IP stack capabilities and/or configuration. In an example, the SMF 160 may select PDU type of a PDU session. In an example, if the SMF 160 receives a request with PDU type set to IP, the SMF 160 may select PDU type IPv4 or IPv6 based on DNN configuration and/or operator policies. In an example, the SMF 160 may provide a cause value to the UE 100 to indicate whether the other IP version is supported on the DNN. In an example, if the SMF 160 receives a request for PDU type IPv4 or IPv6 and the requested IP version is supported by the DNN the SMF 160 may select the requested PDU type.

In an example embodiment, the 5GC elements and UE 100 may support the following mechanisms: during a PDU session establishment procedure, the SMF 160 may send the IP address to the UE 100 via SM NAS signaling. The IPv4 address allocation and/or IPv4 parameter configuration via DHCPv4 may be employed once PDU session may be established. IPv6 prefix allocation may be supported via IPv6 stateless autoconfiguration, if IPv6 is supported. In an example, 5GC network elements may support IPv6 parameter configuration via stateless DHCPv6.

The 5GC may support the allocation of a static IPv4 address and/or a static IPv6 prefix based on subscription information in a UDM 140 and/or based on the configuration on a per-subscriber, per-DNN basis.

User plane function(s) (UPF 110) may handle the user plane path of PDU sessions. A UPF 110 that provides the interface to a data network may support functionality of a PDU session anchor.

In an example, a policy control function, PCF 135, may support unified policy framework to govern network behavior, provide policy rules to control plane function(s) to enforce policy rules, implement a front end to access subscription information relevant for policy decisions in a user data repository (UDR), and/or the like.

A network exposure function, NEF 125, may provide means to securely expose the services and capabilities provided by the 3GPP network functions, translate between information exchanged with the AF 145 and information exchanged with the internal network functions, receive information from other network functions, and/or the like.

In an example, a network repository function, NRF 130 may support service discovery function that may receive NF discovery request from NF instance, provide information about the discovered NF instances (be discovered) to the NF instance, and maintain information about available NF instances and their supported services, and/or the like.

In an example, an NSSF 120 may select a set of network slice instances serving the UE 100, may determine allowed NSSAI. In an example, the NSSF 120 may determine the AMF 155 set to be employed to serve the UE 100, and/or, based on configuration, determine a list of candidate AMF 155($s$) 155 by querying the NRF 130.

In an example, stored data in a UDR may include at least user subscription data, including at least subscription identifiers, security credentials, access and mobility related subscription data, session related subscription data, policy data, and/or the like.

In an example, an AUSF 150 may support authentication server function (AUSF 150).

In an example, an application function, AF 145, may interact with the 3GPP core network to provide services. In an example, based on operator deployment, application functions may be trusted by the operator to interact directly with relevant network functions. Application functions not allowed by the operator to access directly the network functions may use an external exposure framework (e.g., via the NEF 125) to interact with relevant network functions.

In an example, control plane interface between the (R)AN 105 and the 5G core may support connection of multiple different kinds of AN(s) (e.g. 3GPP RAN 105, N3IWF 170 for Un-trusted access 165) to the 5GC via a control plane protocol. In an example, an N2 AP protocol may be employed for both the 3GPP access 105 and non-3GPP access 165. In an example, control plane interface between the (R)AN 105 and the 5G core may support decoupling between AMF 155 and other functions such as SMF 160 that may need to control the services supported by AN(s) (e.g. control of the UP resources in the AN 105 for a PDU session).

In an example, the 5GC may provide policy information from the PCF 135 to the UE 100. In an example, the policy information may comprise: access network discovery and selection policy, UE 100 route selection policy (URSP), SSC mode selection policy (SSCMSP), network slice selection policy (NSSP), DNN selection policy, non-seamless offload policy, and/or the like.

In an example, as depicted in example FIG. 5A and FIG. 5B, the registration management, RM may be employed to register or de-register a UE/user 100 with the network, and establish the user context in the network. Connection management may be employed to establish and release the signaling connection between the UE 100 and the AMF 155.

In an example, a UE 100 may register with the network to receive services that require registration. In an example, the UE 100 may update its registration with the network periodically in order to remain reachable (periodic registration update), or upon mobility (e.g., mobility registration update), or to update its capabilities or to re-negotiate protocol parameters.

Figure 8:
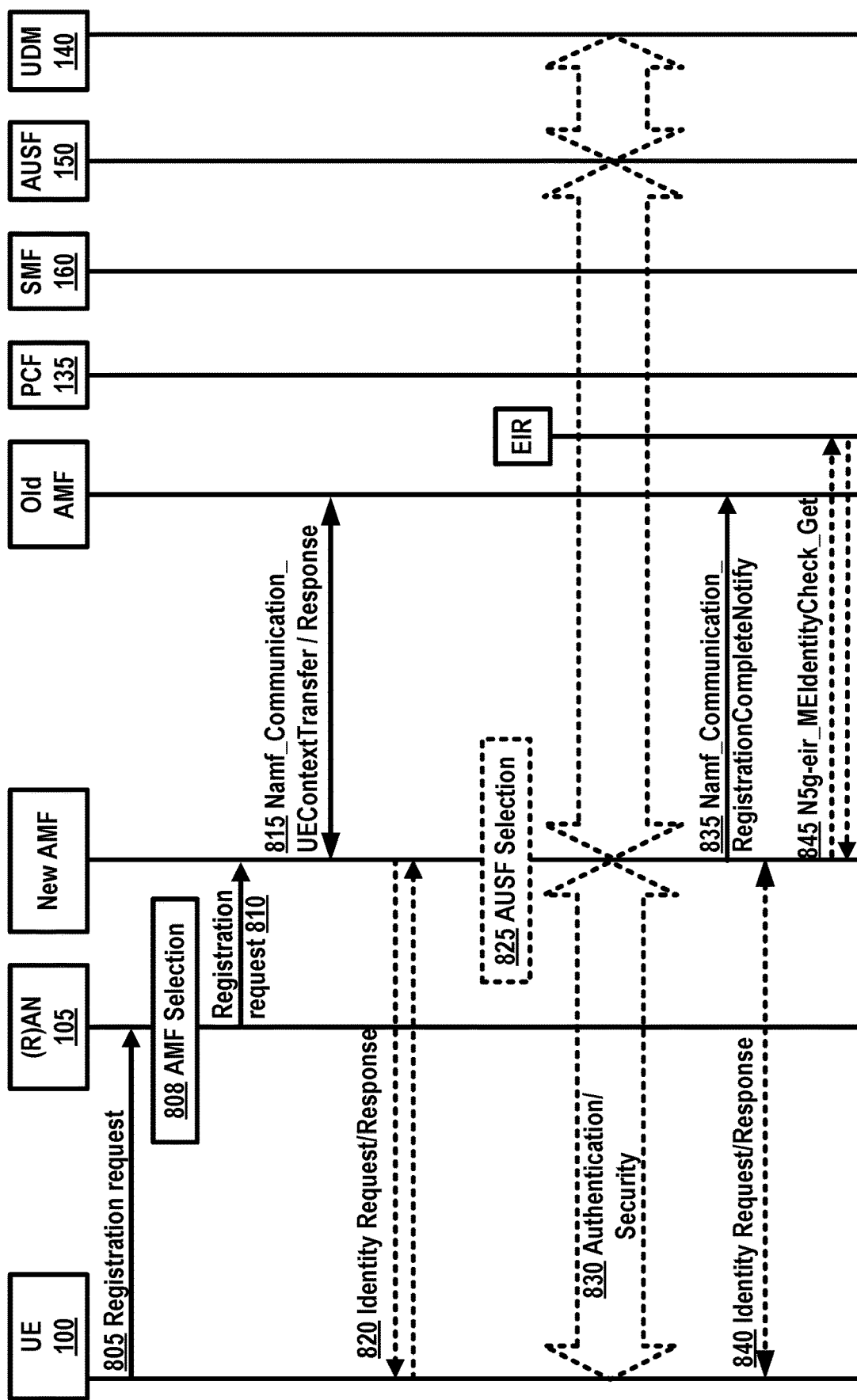
FIG. 8 and FIG. 9 is an example call flow for registration procedure as per an aspect of an embodiment of the present disclosure.
Figure 9:
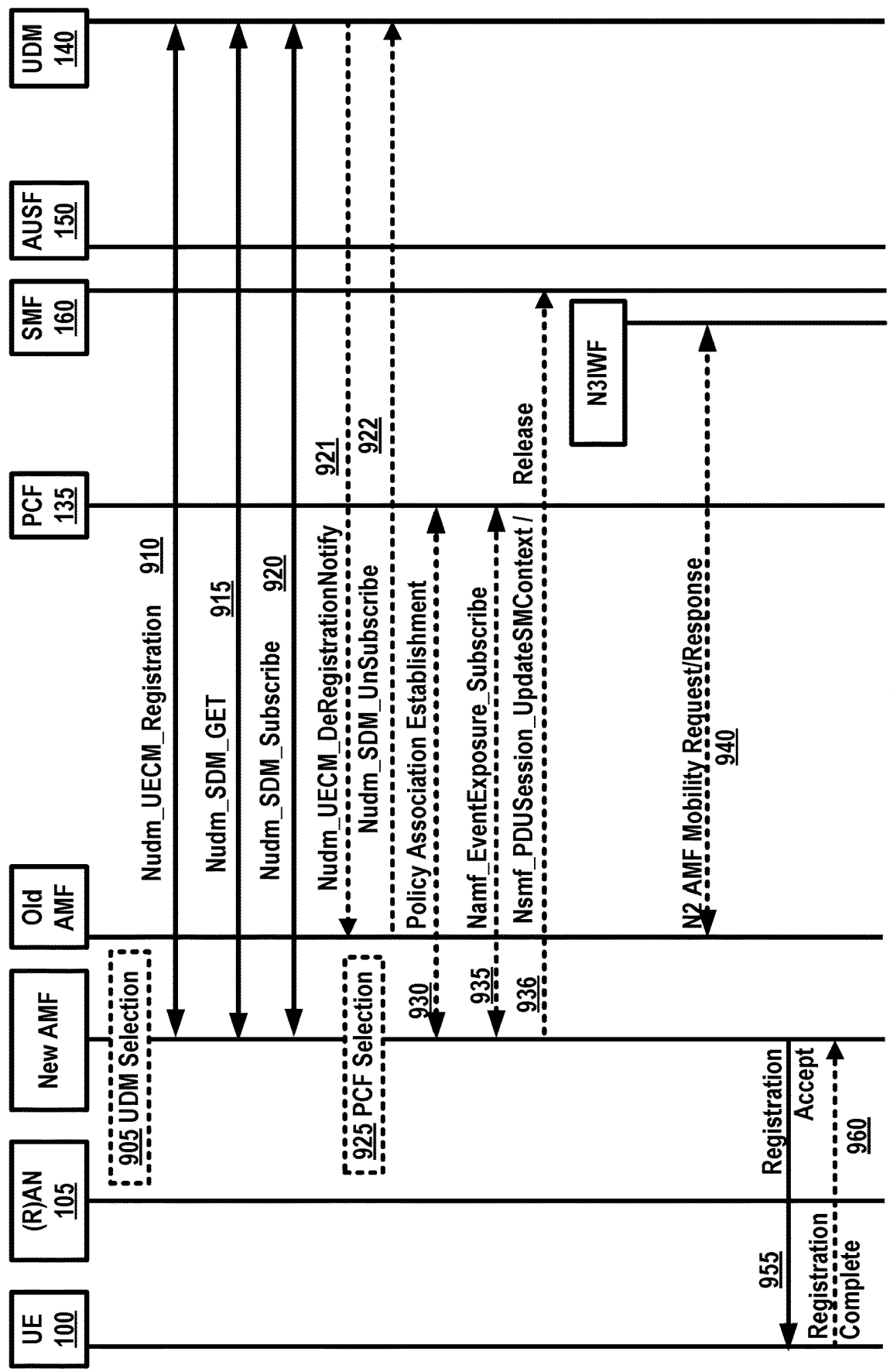

In an example, an initial registration procedure as depicted in example FIG. 8 and FIG. 9 may involve execution of network access control functions (e.g. user authentication and access authorization based on subscription profiles in UDM 140). Example FIG. 9 is a continuation of the initial registration procedure depicted in FIG. 8. As a result of the initial registration procedure, the identity of the serving AMF 155 may be registered in a UDM 140.

In an example, the registration management, RM procedures may be applicable over both 3GPP access 105 and non 3GPP access 165.

An example FIG. 5A may depict the RM states of a UE 100 as observed by the UE 100 and AMF 155. In an example embodiment, two RM states may be employed in the UE 100 and the AMF 155 that may reflect the registration status of the UE 100 in the selected PLMN: RM-DEREGISTERED 500, and RM-REGISTERED 510. In an example, in the RM DEREGISTERED state 500, the UE 100 may not be registered with the network. The UE 100 context in the AMF 155 may not hold valid location or routing information for the UE 100 so the UE 100 may not be reachable by the AMF 155. In an example, the UE 100 context may be stored in the UE 100 and the AMF 155. In an example, in the RM REGISTERED state 510, the UE 100 may be registered with the network. In the RM-REGISTERED 510 state, the UE 100 may receive services that may require registration with the network.

In an example embodiment, two RM states may be employed in AMF 155 for the UE 100 that may reflect the registration status of the UE 100 in the selected PLMN: RM-DEREGISTERED 520, and RM-REGISTERED 530.

As depicted in example FIG. 6A and FIG. 6B, connection management, CM, may comprise establishing and releasing a signaling connection between a UE 100 and an AMF 155 over N1 interface. The signaling connection may be employed to enable NAS signaling exchange between the UE 100 and the core network. The signaling connection between the UE 100 and the AMF 155 may comprise both the AN signaling connection between the UE 100 and the (R)AN 105 (e.g. RRC connection over 3GPP access) and the N2 connection for the UE 100 between the AN and the AMF 155.

As depicted in example FIG. 6A and FIG. 6B, two CM states may be employed for the NAS signaling connectivity of the UE 100 with the AMF 155, CM-IDLE 600, 620 and CM-CONNECTED 610, 630. A UE 100 in CM-IDLE 600 state may be in RM-REGISTERED 510 state and may have no NAS signaling connection established with the AMF 155 over N1. The UE 100 may perform cell selection, cell reselection, PLMN selection, and/or the like. A UE 100 in CM-CONNECTED 610 state may have a NAS signaling connection with the AMF 155 over N1.

In an example embodiment two CM states may be employed for the UE 100 at the AMF 155, CM-IDLE 620 and CM-CONNECTED 630.

In an example, an RRC inactive state may apply to NG-RAN (e.g. it may apply to NR and E-UTRA connected to 5G CN). The AMF 155, based on network configuration, may provide assistance information to the NG RAN 105, to assist the NG RAN's 105 decision whether the UE 100 may be sent to RRC inactive state. When a UE 100 is CM-CONNECTED 610 with RRC inactive state, the UE 100 may resume the RRC connection due to uplink data pending, mobile initiated signaling procedure, as a response to RAN 105 paging, to notify the network that it has left the RAN 105 notification area, and/or the like.

In an example, a NAS signaling connection management may include establishing and releasing a NAS signaling connection. A NAS signaling connection establishment function may be provided by the UE 100 and the AMF 155 to establish the NAS signaling connection for the UE 100 in CM-IDLE 600 state. The procedure of releasing the NAS signaling connection may be initiated by the 5G (R)AN 105 node or the AMF 155.

In an example, reachability management of a UE 100 may detect whether the UE 100 is reachable and may provide the UE 100 location (e.g. access node) to the network to reach the UE 100. Reachability management may be done by paging the UE 100 and the UE 100 location tracking. The UE 100 location tracking may include both UE 100 registration area tracking and UE 100 reachability tracking. The UE 100 and the AMF 155 may negotiate UE 100 reachability characteristics in CM-IDLE 600, 620 state during registration and registration update procedures.

In an example, two UE 100 reachability categories may be negotiated between a UE 100 and an AMF 155 for CM-IDLE 600, 620 state. 1) UE 100 reachability allowing mobile device terminated data while the UE 100 is CM-IDLE 600 mode. 2) Mobile initiated connection only (MICO) mode. The 5GC may support a PDU connectivity service that provides exchange of PDUs between the UE 100 and a data network identified by a DNN. The PDU connectivity service may be supported via PDU sessions that are established upon request from the UE 100.

In an example, a PDU session may support one or more PDU session types. PDU sessions may be established (e.g. upon UE 100 request), modified (e.g. upon UE 100 and 5GC request) and/or released (e.g. upon UE 100 and 5GC request) using NAS SM signaling exchanged over N1 between the UE 100 and the SMF 160. Upon request from an application server, the 5GC may be able to trigger a specific application in the UE 100. When receiving the trigger, the UE 100 may send it to the identified application in the UE 100. The identified application in the UE 100 may establish a PDU session to a specific DNN.

Figure 7:
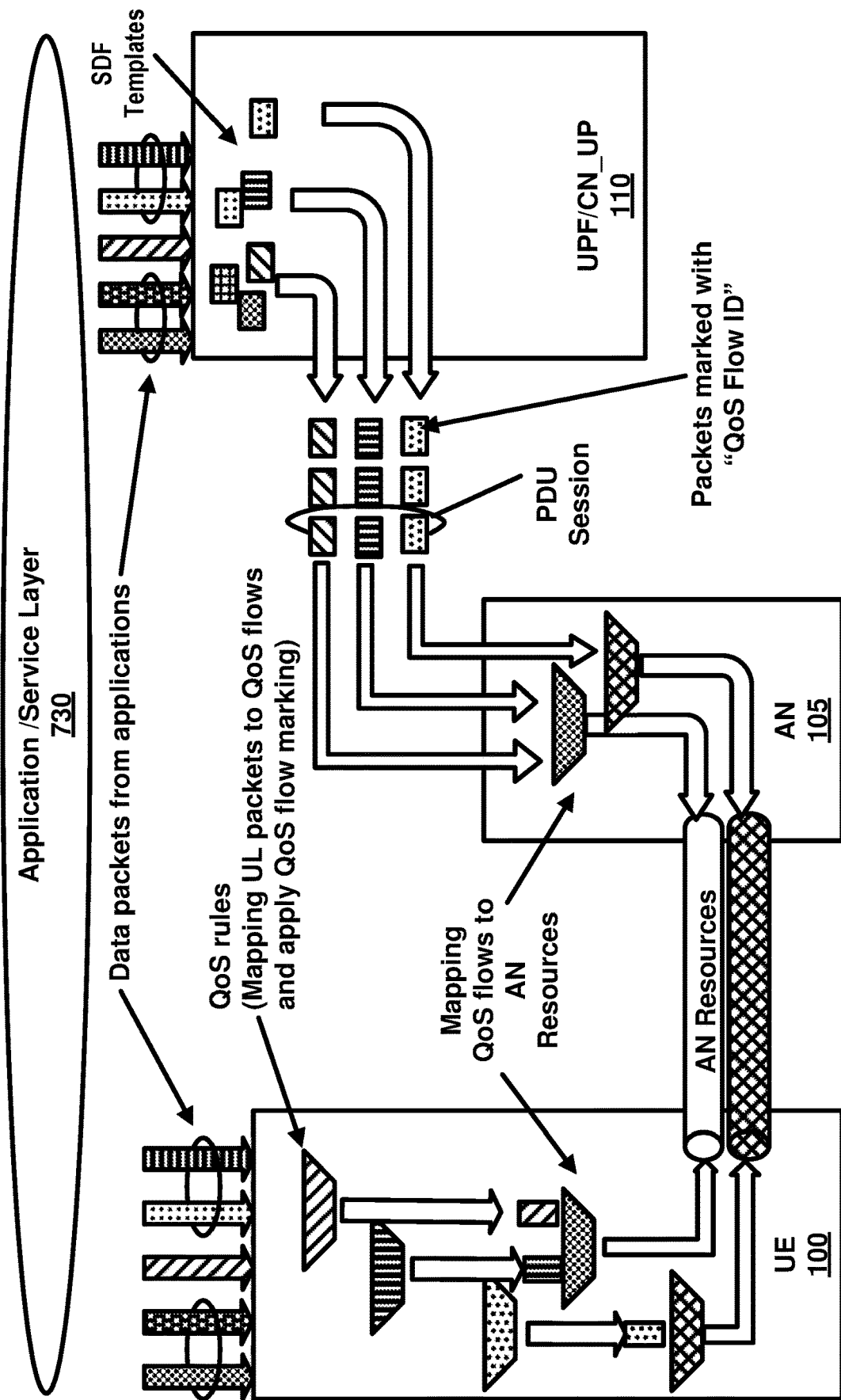
FIG. 7 is diagram for classification and marking traffic as per an aspect of an embodiment of the present disclosure.

In an example, the 5G QoS model may support a QoS flow based framework as depicted in example FIG. 7. The 5G QoS model may support both QoS flows that require a guaranteed flow bit rate and QoS flows that may not require a guaranteed flow bit rate. In an example, the 5G QoS model may support reflective QoS. The QoS model may comprise flow mapping or packet marking at the UPF 110 (CN_UP) 110, AN 105 and/or the UE 100. In an example, packets may arrive from and/or destined to the application/service layer 730 of UE 100, UPF 110 (CN_UP) 110, and/or the AF 145.

In an example, the QoS flow may be a granularity of QoS differentiation in a PDU session. A QoS flow ID, QFI, may be employed to identify the QoS flow in the 5G system. In an example, user plane traffic with the same QFI within a PDU session may receive the same traffic forwarding treatment. The QFI may be carried in an encapsulation header on N3 and/or N9 (e.g. without any changes to the end-to-end packet header). In an example, the QFI may be applied to PDUs with different types of payload. The QFI may be unique within a PDU session.

In an example, the QoS parameters of a QoS flow may be provided to the (R)AN 105 as a QoS profile over N2 at PDU session establishment, QoS flow establishment, or when NG-RAN is used at every time the user plane is activated. In an example, a default QoS rule may be required for every PDU session. The SMF 160 may allocate the QFI for a QoS flow and may derive QoS parameters from the information provided by the PCF 135. In an example, the SMF 160 may provide the QFI together with the QoS profile containing the QoS parameters of a QoS flow to the (R)AN 105.

In an example, 5G QoS flow may be a granularity for QoS forwarding treatment in the 5G system. Traffic mapped to the same 5G QoS flow may receive the same forwarding treatment (e.g. scheduling policy, queue management policy, rate shaping policy, RLC configuration, and/or the like). In an example, providing different QoS forwarding treatment may require separate 5G QoS flows.

In an example, a 5G QoS indicator may be a scalar that may be employed as a reference to a specific QoS forwarding behavior (e.g. packet loss rate, packet delay budget) to be provided to a 5G QoS flow. In an example, the 5G QoS indicator may be implemented in the access network by the 5QI referencing node specific parameters that may control the QoS forwarding treatment (e.g. scheduling weights, admission thresholds, queue management thresholds, link layer protocol configuration, and/or the like).

In an example, 5GC may support edge computing and may enable operator(s) and 3rd party services to be hosted close to the UE's access point of attachment. The 5G core network may select a UPF 110 close to the UE 100 and may execute the traffic steering from the UPF 110 to the local data network via a N6 interface. In an example, the selection and traffic steering may be based on the UE's 100 subscription data, UE 100 location, the information from application function AF 145, policy, other related traffic rules, and/or the like. In an example, the 5G core network may expose network information and capabilities to an edge computing application function. The functionality support for edge computing may include local routing where the 5G core network may select a UPF 110 to route the user traffic to the local data network, traffic steering where the 5G core network may select the traffic to be routed to the applications in the local data network, session and service continuity to enable UE 100 and application mobility, user plane selection and reselection, e.g. based on input from application function, network capability exposure where 5G core network and application function may provide information to each other via NEF 125, QoS and charging where PCF 135 may provide rules for QoS control and charging for the traffic routed to the local data network, support of local area data network where 5G core network may provide support to connect to the LADN in a certain area where the applications are deployed, and/or the like.

An example 5G system may be a 3GPP system comprising of 5G access network 105, 5G core network and a UE 100, and/or the like. Allowed NSSAI may be an NSSAI provided by a serving PLMN during e.g. a registration procedure, indicating the NSSAI allowed by the network for the UE 100 in the serving PLMN for the current registration area.

In an example, a PDU connectivity service may provide exchange of PDUs between a UE 100 and a data network. A PDU session may be an association between the UE 100 and the data network, DN 115, that may provide the PDU connectivity service. The type of association may be IP, Ethernet and/or unstructured.

Establishment of user plane connectivity to a data network via network slice instance(s) may comprise the following: performing a RM procedure to select an AMF 155 that supports the required network slices, and establishing one or more PDU session(s) to the required data network via the network slice instance(s).

In an example, the set of network slices for a UE 100 may be changed at any time while the UE 100 may be registered with the network, and may be initiated by the network, or the UE 100.

In an example, a periodic registration update may be UE 100 re-registration at expiry of a periodic registration timer. A requested NSSAI may be a NSSAI that the UE 100 may provide to the network.

In an example, a service based interface may represent how a set of services may be provided/exposed by a given NF.

In an example, a service continuity may be an uninterrupted user experience of a service, including the cases where the IP address and/or anchoring point may change. In an example, a session continuity may refer to continuity of a PDU session. For PDU session of IP type session continuity may imply that the IP address is preserved for the lifetime of the PDU session. An uplink classifier may be a UPF 110 functionality that aims at diverting uplink traffic, based on filter rules provided by the SMF 160, towards data network, DN 115.

In an example, the 5G system architecture may support data connectivity and services enabling deployments to use techniques such as e.g. network function virtualization and/or software defined networking. The 5G system architecture may leverage service-based interactions between control plane (CP) network functions where identified. In 5G system architecture, separation of the user plane (UP) functions from the control plane functions may be considered. A 5G system may enable a network function to interact with other NF(s) directly if required.

In an example, the 5G system may reduce dependencies between the access network (AN) and the core network (CN). The architecture may comprise a converged access-agnostic core network with a common AN-CN interface which may integrate different 3GPP and non-3GPP access types.

In an example, the 5G system may support a unified authentication framework, stateless NFs, where the compute resource is decoupled from the storage resource, capability exposure, and concurrent access to local and centralized services. To support low latency services and access to local data networks, UP functions may be deployed close to the access network.

In an example, the 5G system may support roaming with home routed traffic and/or local breakout traffic in the visited PLMN. An example 5G architecture may be service-based and the interaction between network functions may be represented in two ways. (1) As service-based representation (depicted in example FIG. 1), where network functions within the control plane, may enable other authorized network functions to access their services. This representation may also include point-to-point reference points where necessary. (2) Reference point representation, showing the interaction between the NF services in the network functions described by point-to-point reference point (e.g. N11) between any two network functions.

In an example, a network slice may comprise the core network control plane and user plane network functions, the 5G Radio Access Network; the N3IWF functions to the non-3GPP Access Network, and/or the like. Network slices may differ for supported features and network function implementation. The operator may deploy multiple network slice instances delivering the same features but for different groups of UEs, e.g. as they deliver a different committed service and/or because they may be dedicated to a customer. The NSSF 120 may store the mapping information between slice instance ID and NF ID (or NF address).

In an example, a UE 100 may simultaneously be served by one or more network slice instances via a 5G-AN. In an example, the UE 100 may be served by k network slices (e.g. k=8, 16, etc.) at a time. An AMF 155 instance serving the UE 100 logically may belong to a network slice instance serving the UE 100.

In an example, a PDU session may belong to one specific network slice instance per PLMN. In an example, different network slice instances may not share a PDU session. Different slices may have slice-specific PDU sessions using the same DNN.

An S-NSSAI (Single Network Slice Selection Assistance information) may identify a network slice. An S-NSSAI may comprise a slice/service type (SST), which may refer to the expected network slice behavior in terms of features and services; and/or a slice differentiator (SD). A slice differentiator may be optional information that may complement the slice/service type(s) to allow further differentiation for selecting a network slice instance from potentially multiple network slice instances that comply with the indicated slice/service type. In an example, the same network slice instance may be selected employing different S-NSSAIs. The CN part of a network slice instance(s) serving a UE 100 may be selected by CN.

In an example, subscription data may include the S-NSSAI(s) of the network slices that the UE 100 subscribes to. One or more S-NSSAIs may be marked as default S-NSSAI. In an example, k S-NSSAI may be marked default S-NSSAI (e.g. k=8, 16, etc.). In an example, the UE 100 may subscribe to more than 8 S-NSSAIs.

In an example, a UE 100 may be configured by the HPLMN with a configured NSSAI per PLMN. Upon successful completion of a UE's registration procedure, the UE 100 may obtain from the AMF 155 an Allowed NSSAI for this PLMN, which may include one or more S-NSSAIs.

In an example, the Allowed NSSAI may take precedence over the configured NSSAI for a PLMN. The UE 100 may use the S-NSSAIs in the allowed NSSAI corresponding to a network slice for the subsequent network slice selection related procedures in the serving PLMN.

In an example, the establishment of user plane connectivity to a data network via a network slice instance(s) may comprise: performing a RM procedure to select an AMF 155 that may support the required network slices, establishing one or more PDU sessions to the required data network via the network slice instance(s), and/or the like.

In an example, when a UE 100 registers with a PLMN, if the UE 100 for the PLMN has a configured NSSAI or an allowed NSSAI, the UE 100 may provide to the network in RRC and NAS layer a requested NSSAI comprising the S-NSSAI(s) corresponding to the slice(s) to which the UE 100 attempts to register, a temporary user ID if one was assigned to the UE, and/or the like. The requested NSSAI may be configured-NSSAI, allowed-NSSAI, and/or the like.

In an example, when a UE 100 registers with a PLMN, if for the PLMN the UE 100 has no configured NSSAI or allowed NSSAI, the RAN 105 may route NAS signaling from/to the UE 100 to/from a default AMF 155.

In an example, the network, based on local policies, subscription changes and/or UE 100 mobility, may change the set of permitted network slice(s) to which the UE 100 is registered. In an example, the network may perform the change during a registration procedure or trigger a notification towards the UE 100 of the change of the supported network slices using an RM procedure (which may trigger a registration procedure). The network may provide the UE 100 with a new allowed NSSAI and tracking area list.

In an example, during a registration procedure in a PLMN, in case the network decides that the UE 100 should be served by a different AMF 155 based on network slice(s) aspects, the AMF 155 that first received the registration request may redirect the registration request to another AMF 155 via the RAN 105 or via direct signaling between the initial AMF 155 and the target AMF 155.

In an example, the network operator may provision the UE 100 with network slice selection policy (NSSP). The NSSP may comprise one or more NSSP rules.

In an example, if a UE 100 has one or more PDU sessions established corresponding to the a specific S-NSSAI, the UE 100 may route the user data of the application in one of the PDU sessions, unless other conditions in the UE 100 may prohibit the use of the PDU sessions. If the application provides a DNN, then the UE 100 may consider the DNN to determine which PDU session to use. In an example, if the UE 100 does not have a PDU session established with the specific S-NSSAI, the UE 100 may request a new PDU session corresponding to the S-NSSAI and with the DNN that may be provided by the application. In an example, in order for the RAN 105 to select a proper resource for supporting network slicing in the RAN 105, the RAN 105 may be aware of the network slices used by the UE 100.

In an example, an AMF 155 may select an SMF 160 in a network slice instance based on S-NSSAI, DNN and/or other information e.g. UE 100 subscription and local operator policies, and/or the like, when the UE 100 triggers the establishment of a PDU session. The selected SMF 160 may establish the PDU session based on S-NSSAI and DNN.

In an example, in order to support network-controlled privacy of slice information for the slices the UE 100 may access, when the UE 100 is aware or configured that privacy considerations may apply to NSSAI, the UE 100 may not include NSSAI in NAS signaling unless the UE 100 has a NAS security context and the UE 100 may not include NSSAI in unprotected RRC signaling.

In an example, for roaming scenarios, the network slice specific network functions in VPLMN and HPLMN may be selected based on the S-NSSAI provided by the UE 100 during PDU connection establishment. If a standardized S-NSSAI is used, selection of slice specific NF instances may be done by each PLMN based on the provided S-NSSAI. In an example, the VPLMN may map the S-NSSAI of HPLMN to a S-NSSAI of VPLMN based on roaming agreement (e.g., including mapping to a default S-NSSAI of VPLMN). In an example, the selection of slice specific NF instance in VPLMN may be done based on the S-NSSAI of VPLMN. In an example, the selection of any slice specific NF instance in HPLMN may be based on the S-NSSAI of HPLMN.

As depicted in example FIG. 8 and FIG. 9, a registration procedure may be performed by the UE 100 to get authorized to receive services, to enable mobility tracking, to enable reachability, and/or the like.

In an example, the UE 100 may send to the (R)AN 105 an AN message 805 (comprising AN parameters, RM-NAS registration request (registration type, SUCI or SUPI or 5G-GUTI, last visited TAI (if available), security parameters, requested NSSAI, mapping of requested NSSAI, UE 100 5GC capability, PDU session status, PDU session(s) to be re-activated, Follow on request, MICO mode preference, and/or the like), and/or the like). In an example, in case of NG-RAN, the AN parameters may include e.g. SUCI or SUPI or the 5G-GUTI, the Selected PLMN ID and requested NSSAI, and/or the like. In an example, the AN parameters may comprise establishment cause. The establishment cause may provide the reason for requesting the establishment of an RRC connection. In an example, the registration type may indicate if the UE 100 wants to perform an initial registration (i.e. the UE 100 is in RM-DEREGISTERED state), a mobility registration update (e.g., the UE 100 is in RM-REGISTERED state and initiates a registration procedure due to mobility), a periodic registration update (e.g., the UE 100 is in RM-REGISTERED state and may initiate a registration procedure due to the periodic registration update timer expiry) or an emergency registration (e.g., the UE 100 is in limited service state). In an example, if the UE 100 performing an initial registration (i.e., the UE 100 is in RM-DEREGISTERED state) to a PLMN for which the UE 100 does not already have a 5G-GUTI, the UE 100 may include its SUCI or SUPI in the registration request. The SUCI may be included if the home network has provisioned the public key to protect SUPI in the UE. If the UE 100 received a UE 100 configuration update command indicating that the UE 100 needs to re-register and the 5G-GUTI is invalid, the UE 100 may perform an initial registration and may include the SUPI in the registration request message. For an emergency registration, the SUPI may be included if the UE 100 does not have a valid 5G-GUTI available; the PEI may be included when the UE 100 has no SUPI and no valid 5G-GUTI. In other cases, the 5G-GUTI may be included and it may indicate the last serving AMF 155. If the UE 100 is already registered via a non-3GPP access in a PLMN different from the new PLMN (e.g., not the registered PLMN or an equivalent PLMN of the registered PLMN) of the 3GPP access, the UE 100 may not provide over the 3GPP access the 5G-GUTI allocated by the AMF 155 during the registration procedure over the non-3GPP access. If the UE 100 is already registered via a 3GPP access in a PLMN (e.g., the registered PLMN), different from the new PLMN (i.e. not the registered PLMN or an equivalent PLMN of the registered PLMN) of the non-3GPP access, the UE 100 may not provide over the non-3GPP access the 5G-GUTI allocated by the AMF 155 during the registration procedure over the 3GPP access. The UE 100 may provide the UE's usage setting based on its configuration. In case of initial registration or mobility registration update, the UE 100 may include the mapping of requested NSSAI, which may be the mapping of each S-NSSAI of the requested NSSAI to the S-NSSAIs of the configured NSSAI for the HPLMN, to ensure that the network is able to verify whether the S-NSSAI(s) in the requested NSSAI are permitted based on the subscribed S-NSSAIs. If available, the last visited TAI may be included in order to help the AMF 155 produce registration area for the UE. In an example, the security parameters may be used for authentication and integrity protection. requested NSSAI may indicate the network slice selection assistance information. The PDU session status may indicates the previously established PDU sessions in the UE. When the UE 100 is connected to the two AMF 155 belonging to different PLMN via 3GPP access and non-3GPP access then the PDU session status may indicate the established PDU session of the current PLMN in the UE. The PDU session(s) to be re-activated may be included to indicate the PDU session(s) for which the UE 100 may intend to activate UP connections. A PDU session corresponding to a LADN may not be included in the PDU session(s) to be re-activated when the UE 100 is outside the area of availability of the LADN. The follow on request may be included when the UE 100 may have pending uplink signaling and the UE 100 may not include PDU session(s) to be re-activated, or the registration type may indicate the UE 100 may want to perform an emergency registration.

In an example, if a SUPI is included or the 5G-GUTI does not indicate a valid AMF 155, the (R)AN 105, based on (R)AT and requested NSSAI, if available, may selects 808 an AMF 155. If UE 100 is in CM-CONNECTED state, the (R)AN 105 may forward the registration request message to the AMF 155 based on the N2 connection of the UE. If the (R)AN 105 may not select an appropriate AMF 155, it may forward the registration request to an AMF 155 which has been configured, in (R)AN 105, to perform AMF 155 selection 808.

In an example, the (R)AN 105 may send to the new AMF 155 an N2 message 810 (comprising: N2 parameters, RM-NAS registration request (registration type, SUPI or 5G-GUTI, last visited TAI (if available), security parameters, requested NSSAI, mapping of requested NSSAI, UE 100 5GC capability, PDU session status, PDU session(s) to be re-activated, follow on request, and MICO mode preference), and/or the like). In an example, when NG-RAN is used, the N2 parameters may comprise the selected PLMN ID, location information, cell identity and the RAT type related to the cell in which the UE 100 is camping. In an example, when NG-RAN is used, the N2 parameters may include the establishment cause.

In an example, the new AMF 155 may send to the old AMF 155 an Namf_Communication_UEContextTransfer (complete registration request) 815. In an example, if the UE's 5G-GUTI was included in the registration request and the serving AMF 155 has changed since last registration procedure, the new AMF 155 may invoke the Namf_Communication_UEContextTransfer service operation 815 on the old AMF 155 including the complete registration request IE, which may be integrity protected, to request the UE's SUPI and MM Context. The old AMF 155 may use the integrity protected complete registration request IE to verify if the context transfer service operation invocation corresponds to the UE 100 requested. In an example, the old AMF 155 may transfer the event subscriptions information by each NF consumer, for the UE, to the new AMF 155. In an example, if the UE 100 identifies itself with PEI, the SUPI request may be skipped.

In an example, the old AMF 155 may send to new AMF 155 a response 815 to Namf_Communication_UEContext-Transfer (SUPI, MM context, SMF 160 information, PCF ID). In an example, the old AMF 155 may respond to the new AMF 155 for the Namf_Communication_UEContext-Transfer invocation by including the UE's SUPI and MM context. In an example, if old AMF 155 holds information about established PDU sessions, the old AMF 155 may include SMF 160 information including S-NSSAI(s), SMF 160 identities and PDU session ID. In an example, if old AMF 155 holds information about active NGAP UE-TNLA bindings to N3IWF, the old AMF 155 may include information about the NGAP UE-TNLA bindings.

In an example, if the SUPI is not provided by the UE 100 nor retrieved from the old AMF 155 the identity request procedure 820 may be initiated by the AMF 155 sending an identity request message to the UE 100 requesting the SUCI.

In an example, the UE 100 may respond with an identity response message 820 including the SUCI. The UE 100 may derive the SUCI by using the provisioned public key of the HPLMN.

In an example, the AMF 155 may decide to initiate UE 100 authentication 825 by invoking an AUSF 150. The AMF 155 may select an AUSF 150 based on SUPI or SUCI. In an example, if the AMF 155 is configured to support emergency registration for unauthenticated SUPIs and the UE 100 indicated registration type emergency registration, the AMF 155 may skip the authentication and security setup, or the AMF 155 may accept that the authentication may fail and may continue the registration procedure.

In an example, the authentication 830 may be performed by Nudm_UEAuthenticate_Get operation. The AUSF 150 may discover a UDM 140. In case the AMF 155 provided a SUCI to AUSF 150, the AUSF 150 may return the SUPI to AMF 155 after the authentication is successful. In an example, if network slicing is used, the AMF 155 may decide if the registration request needs to be rerouted where the initial AMF 155 refers to the AMF 155. In an example, the AMF 155 may initiate NAS security functions. In an example, upon completion of NAS security function setup, the AMF 155 may initiate NGAP procedure to enable 5G-AN use it for securing procedures with the UE. In an example, the 5G-AN may store the security context and may acknowledge to the AMF 155. The 5G-AN may use the security context to protect the messages exchanged with the UE.

In an example, new AMF 155 may send to the old AMF 155 Namf_Communication_RegistrationCompleteNotify 835. If the AMF 155 has changed, the new AMF 155 may notify the old AMF 155 that the registration of the UE 100 in the new AMF 155 may be completed by invoking the Namf_Communication_RegistrationCompleteNotify service operation. If the authentication/security procedure fails, then the registration may be rejected, and the new AMF 155 may invoke the Namf_Communication_RegistrationCompleteNotify service operation with a reject indication reason code towards the old AMF 155. The old AMF 155 may continue as if the UE 100 context transfer service operation was never received. If one or more of the S-NSSAIs used in the old registration area may not be served in the target registration area, the new AMF 155 may determine which PDU session may not be supported in the new registration area. The new AMF 155 may invoke the Namf_Communication_RegistrationCompleteNotify service operation including the rejected PDU session ID and a reject cause (e.g. the S-NSSAI becomes no longer available) towards the old AMF 155. The new AMF 155 may modify the PDU session status correspondingly. The old AMF 155 may inform the corresponding SMF 160(s) to locally release the UE's SM context by invoking the Nsmf_PDUSession_ReleaseSMContext service operation.

In an example, the new AMF 155 may send to the UE 100 an identity request/response 840 (e.g., PEI). If the PEI was not provided by the UE 100 nor retrieved from the old AMF 155, the identity request procedure may be initiated by AMF 155 sending an identity request message to the UE 100 to retrieve the PEI. The PEI may be transferred encrypted unless the UE 100 performs emergency registration and may not be authenticated. For an emergency registration, the UE 100 may have included the PEI in the registration request.

In an example, the new AMF 155 may initiate ME identity check 845 by invoking the N5g-eir_EquipmentIdentityCheck_Get service operation 845.

In an example, the new AMF 155, based on the SUPI, may select 905 a UDM 140. The UDM 140 may select a UDR instance. In an example, the AMF 155 may select a UDM 140.

In an example, if the AMF 155 has changed since the last registration procedure, or if the UE 100 provides a SUPI which may not refer to a valid context in the AMF 155, or if the UE 100 registers to the same AMF 155 it has already registered to a non-3GPP access (e.g., the UE 100 is registered over a non-3GPP access and may initiate the registration procedure to add a 3GPP access), the new AMF 155 may register with the UDM 140 using Nudm_UECM_Registration 910 and may subscribe to be notified when the UDM 140 may deregister the AMF 155. The UDM 140 may store the AMF 155 identity associated to the access type and may not remove the AMF 155 identity associated to the other access type. The UDM 140 may store information provided at registration in UDR, by Nudr_UDM_Update. In an example, the AMF 155 may retrieve the access and mobility subscription data and SMF 160 selection subscription data using Nudm_SDM_Get 915. The UDM 140 may retrieve this information from UDR by Nudr_UDM_Query (access and mobility subscription data). After a successful response is received, the AMF 155 may subscribe to be notified using Nudm_SDM_Subscribe 920 when the data requested may be modified. The UDM 140 may subscribe to UDR by Nudr_UDM_Subscribe. The GPSI may be provided to the AMF 155 in the subscription data from the UDM 140 if the GPSI is available in the UE 100 subscription data. In an example, the new AMF 155 may provide the access type it serves for the UE 100 to the UDM 140 and the access type may be set to 3GPP access. The UDM 140 may store the associated access type together with the serving AMF 155 in UDR by Nudr_UDM_Update. The new AMF 155 may create an MM context for the UE 100 after getting the mobility subscription data from the UDM 140. In an example, when the UDM 140 stores the associated access type together with the serving AMF 155, the UDM 140 may initiate a Nudm_UECM_DeregistrationNotification 921 to the old AMF 155 corresponding to 3GPP access. The old AMF 155 may remove the MM context of the UE. If the serving NF removal reason indicated by the UDM 140 is initial registration, then the old AMF 155 may invoke the Namf_EventExposure_Notify service operation towards all the associated SMF 160s of the UE 100 to notify that the UE 100 is deregistered from old AMF 155. The SMF 160 may release the PDU session(s) on getting this notification. In an example, the old AMF 155 may unsubscribe with the UDM 140 for subscription data using Nudm_SDM_unsubscribe 922.

In an example, if the AMF 155 decides to initiate PCF 135 communication, e.g. the AMF 155 has not yet obtained access and mobility policy for the UE 100 or if the access and mobility policy in the AMF 155 are no longer valid, the AMF 155 may select 925 a PCF 135. If the new AMF 155 receives a PCF ID from the old AMF 155 and successfully contacts the PCF 135 identified by the PCF ID, the AMF 155 may select the (V-)PCF identified by the PCF ID. If the PCF 135 identified by the PCF ID may not be used (e.g. no response from the PCF 135) or if there is no PCF ID received from the old AMF 155, the AMF 155 may select 925 a PCF 135.

In an example, the new AMF 155 may perform a policy association establishment 930 during registration procedure. If the new AMF 155 contacts the PCF 135 identified by the (V-)PCF ID received during inter-AMF 155 mobility, the new AMF 155 may include the PCF-ID in the Npcf_AMPolicyControl Get operation. If the AMF 155 notifies the mobility restrictions (e.g. UE 100 location) to the PCF 135 for adjustment, or if the PCF 135 updates the mobility restrictions itself due to some conditions (e.g. application in use, time and date), the PCF 135 may provide the updated mobility restrictions to the AMF 155.

In an example, the PCF 135 may invoke Namf_EventExposure_Subscribe service operation 935 for UE 100 event subscription.

In an example, the AMF 155 may send to the SMF 160 an Nsmf_PDUSession_UpdateSMContext 936. In an example, the AMF 155 may invoke the Nsmf_PDUSession_UpdateSMContext if the PDU session(s) to be re-activated is included in the registration request. The AMF 155 may send Nsmf_PDUSession_UpdateSMContext request to SMF 160(*s*) associated with the PDU session(s) to activate user plane connections of the PDU session(s). The SMF 160 may decide to trigger e.g. the intermediate UPF 110 insertion, removal or change of PSA. In the case that the intermediate UPF 110 insertion, removal, or relocation is performed for the PDU session(s) not included in PDU session(s) to be re-activated, the procedure may be performed without N11 and N2 interactions to update the N3 user plane between (R)AN 105 and 5GC. The AMF 155 may invoke the Nsmf_PDUSession_ReleaseSMContext service operation towards the SMF 160 if any PDU session status indicates that it is released at the UE 100. The AMF 155 may invoke the Nsmf_PDUSession_ReleaseSMContext service operation towards the SMF 160 in order to release any network resources related to the PDU session.

In an example, the new AMF 155 may send to a N3IWF an N2 AMF 155 mobility request 940. If the AMF 155 has changed, the new AMF 155 may create an NGAP UE 100 association towards the N3IWF to which the UE 100 is connected. In an example, the N3IWF may respond to the new AMF 155 with an N2 AMF 155 mobility response 940.

In an example, the new AMF 155 may send to the UE 100 a registration accept 955 (comprising: 5G-GUTI, registration area, mobility restrictions, PDU session status, allowed NSSAI, [mapping of allowed NSSAI], periodic registration update timer, LADN information and accepted MICO mode, IMS voice over PS session supported indication, emergency service support indicator, and/or the like). In an example, the AMF 155 may send the registration accept message to the UE 100 indicating that the registration request has been accepted. 5G-GUTI may be included if the AMF 155 allocates a new 5G-GUTI. If the AMF 155 allocates a new registration area, it may send the registration area to the UE 100 via registration accept message 955. If there is no registration area included in the registration accept message, the UE 100 may consider the old registration area as valid. In an example, mobility restrictions may be included in case mobility restrictions may apply for the UE 100 and registration type may not be emergency registration. The AMF 155 may indicate the established PDU sessions to the UE 100 in the PDU session status. The UE 100 may remove locally any internal resources related to PDU sessions that are not marked as established in the received PDU session status. In an example, when the UE 100 is connected to the two AMF 155 belonging to different PLMN via 3GPP access and non-3GPP access then the UE 100 may remove locally any internal resources related to the PDU session of the current PLMN that are not marked as established in received PDU session status. If the PDU session status information was in the registration request, the AMF 155 may indicate the PDU session status to the UE. The mapping of allowed NSSAI may be the mapping of each S-NSSAI of the allowed NSSAI to the S-NSSAIs of the configured NSSAI for the HPLMN. The AMF 155 may include in the registration accept message 955 the LADN information for LADNs that are available within the registration area determined by the AMF 155 for the UE. If the UE 100 included MICO mode in the request, then AMF 155 may respond whether MICO mode may be used. The AMF 155 may set the IMS voice over PS session supported Indication. In an example, in order to set the IMS voice over PS session supported indication, the AMF 155 may perform a UE/RAN radio information and compatibility request procedure to check the compatibility of the UE 100 and RAN radio capabilities related to IMS voice over PS. In an example, the emergency service support indicator may inform the UE 100 that emergency services are supported, e.g., the UE 100 may request PDU session for emergency services. In an example, the handover restriction list and UE-AMBR may be provided to NG-RAN by the AMF 155.

In an example, the UE 100 may send to the new AMF 155 a registration complete 960 message. In an example, the UE 100 may send the registration complete message 960 to the AMF 155 to acknowledge that a new 5G-GUTI may be assigned. In an example, when information about the PDU session(s) to be re-activated is not included in the registration request, the AMF 155 may release the signaling connection with the UE 100. In an example, when the follow-on request is included in the registration request, the AMF 155 may not release the signaling connection after the completion of the registration procedure. In an example, if the AMF 155 is aware that some signaling is pending in the AMF 155 or between the UE 100 and the 5GC, the AMF 155 may not release the signaling connection after the completion of the registration procedure.

Figure 10:
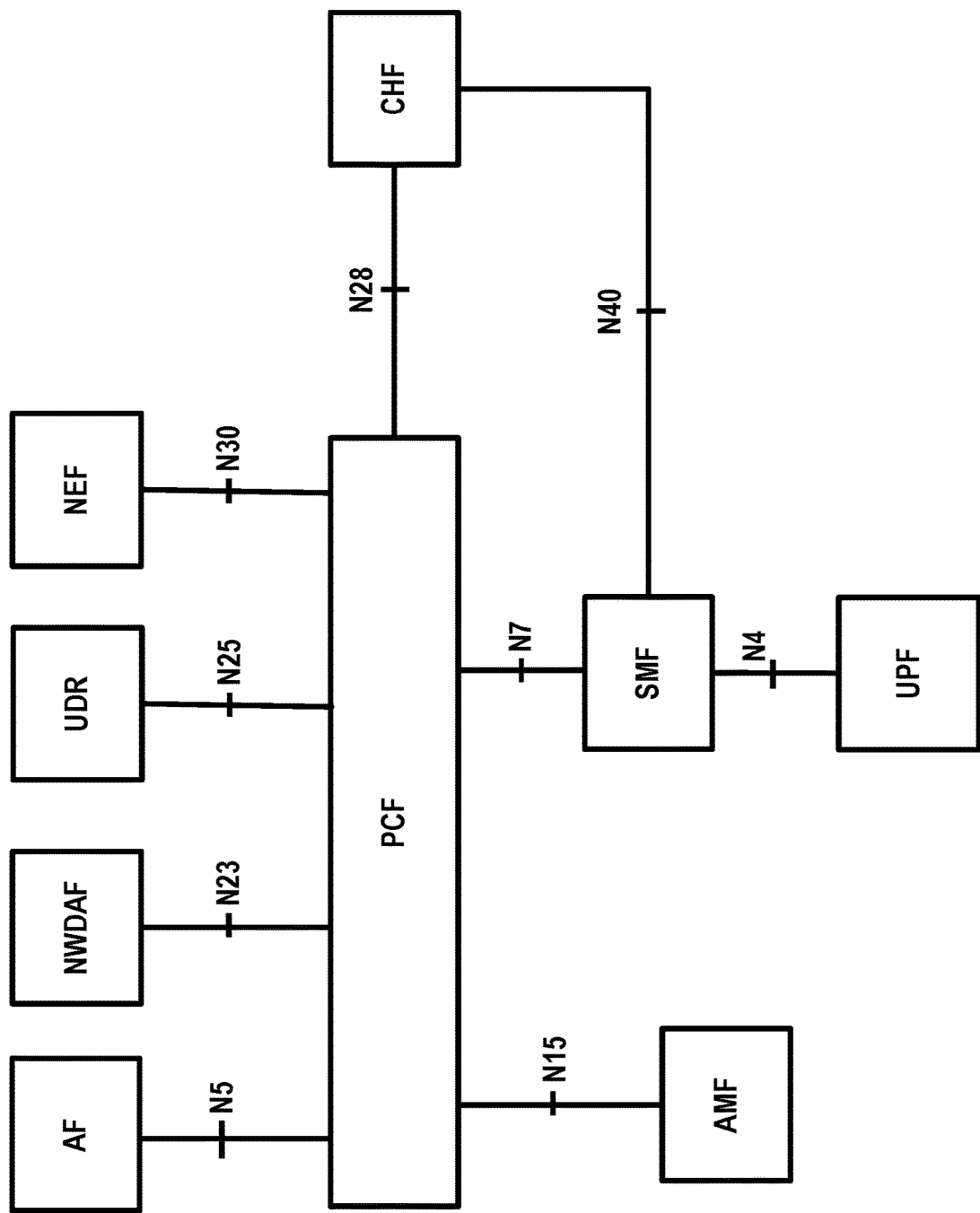
FIG. 10 is a diagram of an example 5G policy and charging control system architecture as per an aspect of an embodiment of the present disclosure.

In an example, FIG. 10 is a diagram of 5G policy and charging control system architecture. The reference architecture of policy and charging control framework for the 5G system may comprise one or more of the following network functions: policy control function (PCF), session management function (SMF), user plane function (UPF), access and mobility management function (AMF), network exposure functionality (NEF), network data analytics function (NWDAF), charging function (CHF), application function (AF) and unified data repository (UDR).

In an example, the CHF may support at least one charging method: offline charging, online charging, or converged charging.

In an example, the offline charging may be a process where charging information for network resource usage may be collected concurrently with that resource usage. At the end of the process, CDR files may be generated by the network, which may be transferred to a network operator's billing domain (BD) for the purpose of subscriber billing and/or inter-operator accounting (or additional functions, e.g. statistics, at the operator's discretion). The BD typically comprises post-processing systems such as the operator's billing system or billing mediation device. In an example conclusion, offline charging may be a mechanism where charging information does not affect, in real-time, the service rendered.

In an example, online charging may be a process where charging information for network resource usage may be collected concurrently with that resource usage in the same fashion as in offline charging. Authorization for the network resource usage may be obtained by the network prior to the actual resource usage to occur. In an example, the charging information utilized in online charging may be not necessarily identical to the charging information employed in offline charging. In an example conclusion, online charging may be a mechanism where charging information may affect, in real-time, the service rendered and therefore a direct interaction of the charging mechanism with the control of network resource usage may be required.

In an example, converged charging may be a process where online and offline charging may be combined.

Figure 11:
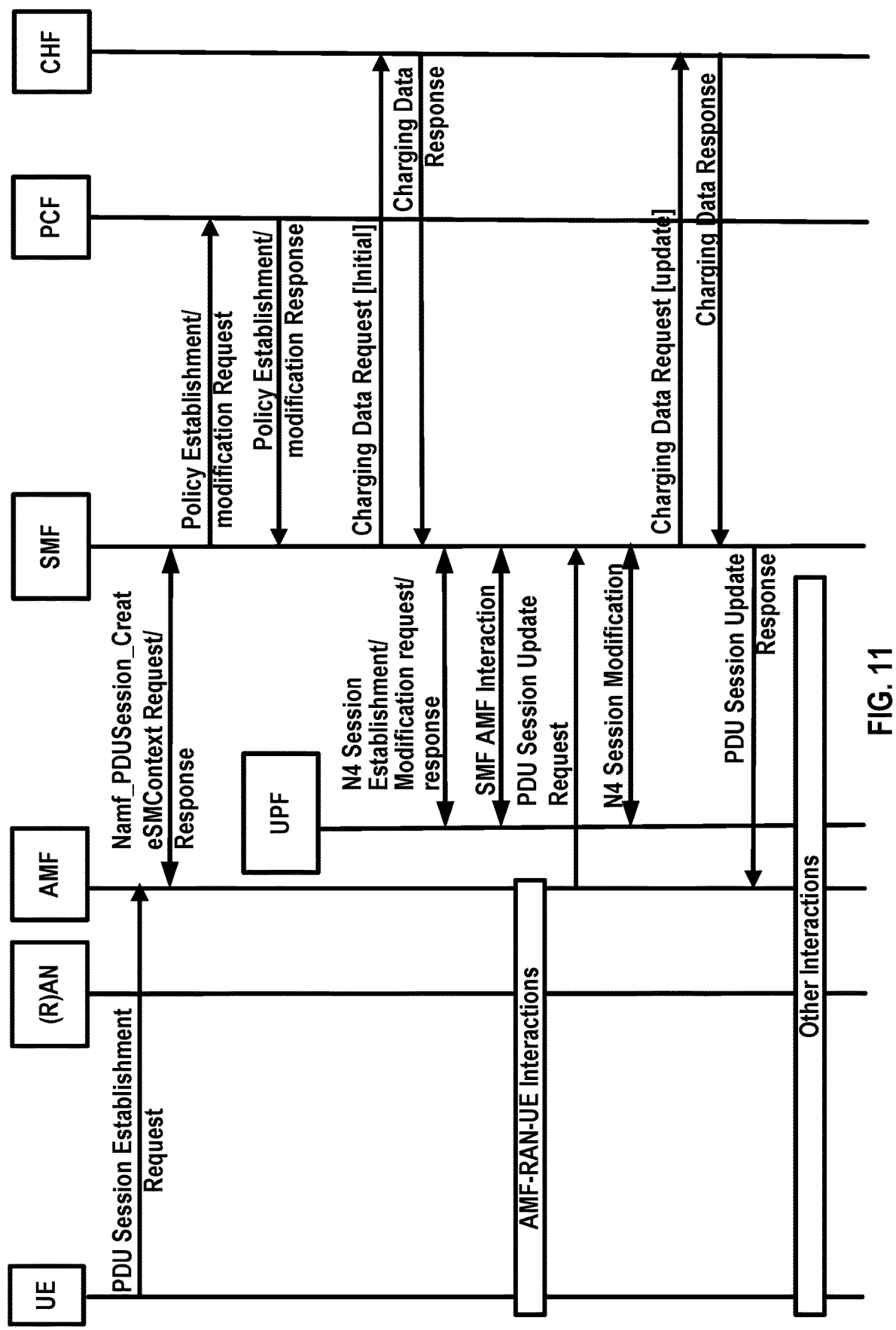
FIG. 11 is an example call flow for PDU session establishment charging as per an aspect of an embodiment of the present disclosure.

FIG. 11 is an example call flow for PDU session establishment charging as per an aspect of an embodiment of the present disclosure.

In an example, a UE may initiate a PDU Session establishment procedure by sending a PDU Session Establishment Request message to an AMF. The PDU Session Establishment Request message may comprise one or more of: PDU Session ID, PDU Type, SSC mode, User location information, and Access Technology Type Information.

In response to the message received from the UE, an AMF may select an SMF and send to the selected SMF a message (e.g. Namf_PDUSession_CreateSMContext Request). The message sent to the SMF may be used by the AMF to request establishing the PDU session. In response to receiving the message from the AMF, the SMF may send a response message (e.g. Namf_PDUSession_CreateSMContext Response) to the AMF to indicate whether the request from the AMF is accepted or not.

In an example, the SMF may select a PCF and send to the PCF a message (e.g. SM Policy Association Establishment Request) to request PCC rules. The PCF may provide PCC rules in a response message (e.g. SM Policy Association Establishment response) to the SMF.

In an example, the SMF may create a Charging Id for the PDU session and may send a Charging Data Request [initial] message to a CHF to verify authorization of a subscriber of the UE to start the PDU session which is triggered by start of PDU session charging event.

In an example, the CHF may open a charging data record (CDR) for the PDU session and may acknowledge the Charging Data Request message by sending Charging Data Response to the SMF.

In an example, the SMF selects a UPF and may initiate an N4 Session Establishment/Modification procedure with the selected UPF.

The SMF may interact with the AMF. For example, the SMF may send to the AMF a Namf_Communication_N1N2MessageTransfer message comprising one or more of: PDU Session ID, QoS Profile(s), CN Tunnel Info, and S-NSSAI from the Allowed NSSAI. This SMF/AMF interaction is labeled in FIG. 11 as SMF AMF Interaction.

In an example, the AMF may interact with the (R)AN and the UE. This interactions is labeled in FIG. 11 as AMF-RAN-UE Interactions. As part of the AMF-RAN-UE Interactions, the AMF may interact with the (R)AN and the UE by sending to the (R)AN a N2 PDU Session Request message comprising the information received from the SMF that indicates the PDU session establishment is accepted.

In an example, and as further part of the AMF-RAN-UE Interactions, the (R)AN may send to the AMF a N2 PDU Session Response message comprising one or more of: PDU Session ID, N2 SM information (PDU Session ID, AN Tunnel Info, List of accepted/rejected QFI(s)), wherein the AN Tunnel Info may correspond to the Access Network address of the N3 tunnel corresponding to the PDU Session.

In an example, the AMF may send to the SMF a PDU Session Update Request message (e.g. Nsmf_PDUSession_UpdateSMContext Request message) comprising the N2 SM information received from the (R)AN to the SMF.

In an example, the SMF may initiate an N4 Session Modification procedure with the UPF. As part of the N4 Session Modification procedure, the SMF may provide AN Tunnel Info to the UPF as well as the corresponding forwarding rules, and the UPF may send to the SMF a response message.

In an example, the SMF may request quota from CHF, e.g. "start of service data flow" event may need quota from CHF. The SMF may send a message to the CHF (e.g. Charging Data Request [update]). In an example, for online charging or converged charging, the SMF may request quota from CHF when allocated quota is consumed or a trigger is met to request a quota.

In an example, the UPF may report resource usage of a PDU session to the SMF. In an example, the UPF may report resource usage of a wireless device to the SMF. by enforcing the charging control rules, the SMF may send to the CHF a message (e.g. Charging Data Request [update]) comprising resource usage information received from the UPF.

In an example, the CHF may update CDR for this PDU session. The CHF may acknowledge the SMF by sending a Charging Data Response message.

In an example, the SMF may send to the AMF a Nsmf_PDUSession_UpdateSMContext Response message.

In an example, other interactions may be performed between SMF, AMF, (R)AN and UE for the PDU session establishment procedure.

In an example, 5GC may be able to provide policy information from a PCF to a UE, and such policy information may include Access Network Discovery & Selection Policy (ANDSP) and/or UE Route Selection Policy (URSP).

In an example, the ANDSP is used by the UE for selecting non-3GPP accesses and for selection of the N3IWF in a PLMN. In an example, the URSP is used by the UE to determine if a detected application may be associated to an established PDU Session, may be offloaded to non-3GPP access outside a PDU Session, or may trigger the establishment of a new PDU Session. In an example, the URSP rules may include traffic descriptors that specify the matching criteria and one or more of the following components: SSC Mode Selection Policy (SSCMSP), Network Slice Selection Policy (NSSP), DNN Selection Policy, PDU Session Type Policy, Non-seamless Offload Policy, and/or Access Type preference. In an example, the SSCMSP is used by the UE to associate the matching application with SSC modes. In an example, the NSSP is used by the UE to associate the matching application with S-NSSAI. In an example, the DNN Selection Policy is used by the UE to associate the matching application with DNN. In an example, the PDU Session Type Policy is used by the UE to associate the matching application with a PDU Session Type. In an example, the Non-seamless Offload Policy is used by the UE to determine that the matching application should be non-seamlessly offloaded to non-3GPP access (i.e. outside of a PDU Session). In an example, the Access Type preference may indicate the preferred Access Type (3GPP or non-3GPP) If the UE needs to establish a PDU Session for the matching application, this. In an example, the ANDSP and URSP may be pre-configured in the UE or may be provisioned to UE from PCF. The pre-configured policy may be applied by the UE when it has not received the same type of policy from PCF. In an example, the PCF may select the ANDSP and URSP applicable for a UE based on local configuration, Subscribed S-NSSAIs and operator policies taking into consideration e.g. accumulated usage, load level information per network slice instance, UE location. In an example, in the case of a roaming UE, the V-PCF may retrieve ANDSP and URSP from the H-PCF over N24/Npcf. When the UE is roaming and the UE has valid rules from both HPLMN and VPLMN the UE may give priority to the valid ANDSP rules from the VPLMN.

In an example, the ANDSP and URSP may be provided from the PCF to an AMF via N15/Namf interface and then from AMF to the UE via the N1 interface. The AMF may not change the ANDSP and the URSP provided by PCF.

In an example, the PCF may be responsible for delivery of UE policy. If the PCF is notified UE Policy delivery failure (e.g. because of UE unreachable), the PCF may subscribe the "Connectivity state changes (IDLE or CONNECTED)" event. After reception of the Notify message indicating that the UE enters the CM-Connected state, the PCF may retry to deliver the UE Policy.

In an example, an always-on PDU session may be a PDU Session for which user plane resources are activated during transition from CM-IDLE mode to CM-CONNECTED state. In an example, always-on PDU session may be used for the delay sensitive applications (e.g. mission critical applications, URLLC, voice call).

In an example, based on an indication from upper layers (e.g., application layer), a UE may request to establish a PDU Session as an always-on PDU Session. The SMF may decide whether the PDU Session can be established as an always-on PDU session. In home routed roaming case, based on local policies, the V-SMF (visiting SMF) may be involved to determine whether the PDU Session can be established as an always-on PDU Session.

In an example, if the UE requests the 5GC to modify a PDU Session, which was established in EPS, to an always-on PDU Session after the first inter-system change from EPS to 5GS, the SMF may decide whether the PDU Session can be established as an always-on PDU Session based on the procedure described above.

Figure 12:
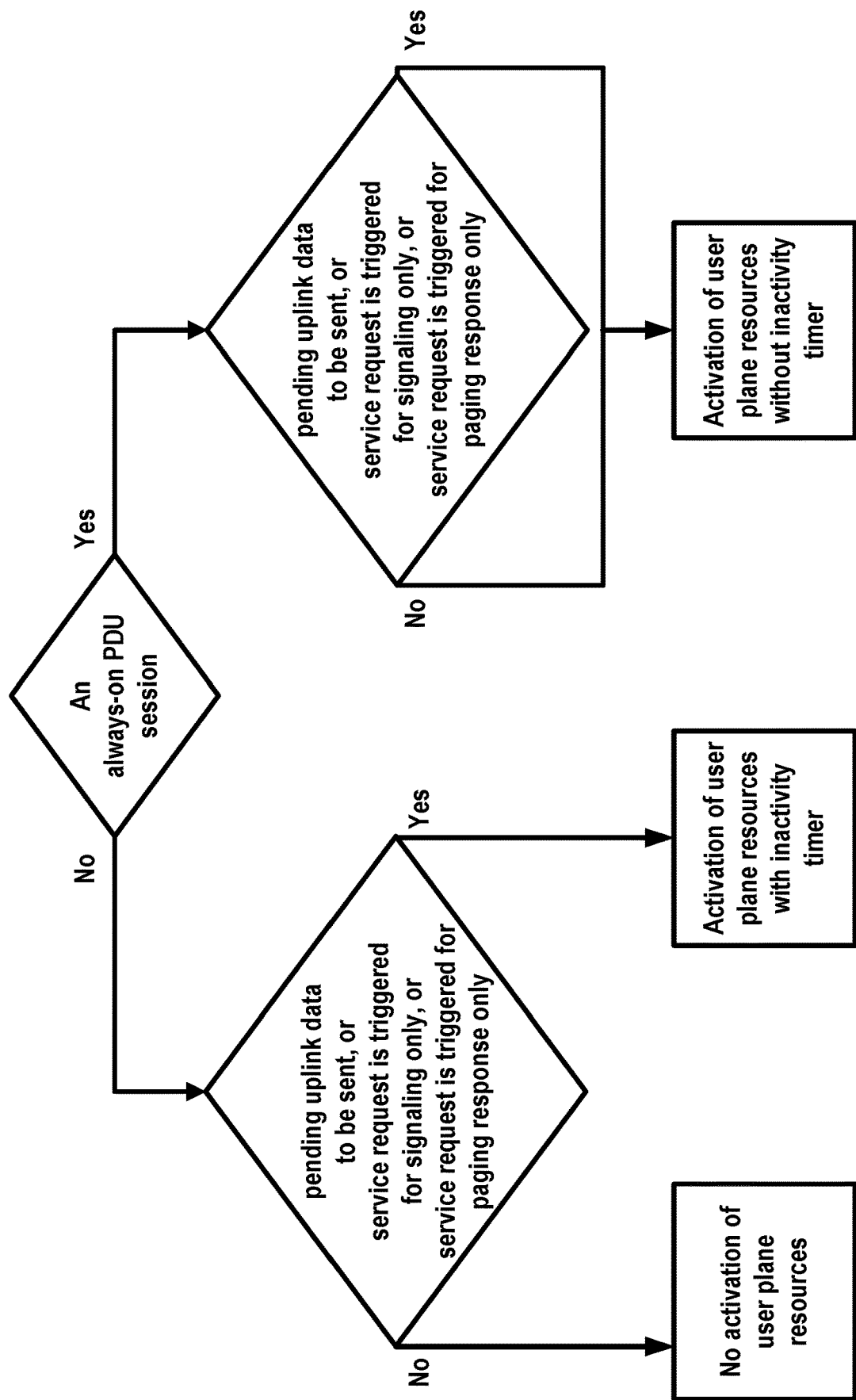
FIG. 12 is an example diagram depicting the differences between an always-on PDU session and a normal PDU session (e.g. a non-always-on PDU session) as per an aspect of an embodiment of the present disclosure.

In an example, the UE may request activation of user plane resources for always-on PDU sessions even if there are no pending uplink data for this always-on PDU session or when the service request is triggered for signaling only or when the service request is triggered for paging response only. In an example, an SMF may not provide an inactivity timer to a UPF for an always-on PDU Sessions, and the SMF may not deactivate a UP connection of the always-on PDU Session due to inactivity. FIG. 12 is an example diagram depicting the differences between an always-on PDU session and a normal PDU session (e.g. a non-always-on PDU session) as per an aspect of an embodiment of the present disclosure.

In an example, if the UE has one or more established PDU sessions which are not accepted by the network as always-on PDU sessions and/or the UE has no uplink user data pending to be sent for those PDU Sessions, the UE may not request for activating user plane resources for those PDU sessions.

For an always-on PDU session, the user plane resources may be activated during transition from CM-IDLE mode to CM-CONNECTED state regardless of whether the UE transmits data packets or not. This may use additional network resources for an always-on PDU sessions. In existing technologies, a UE may employ an always-on PDU session for any kind of service. This may result in increasing network resource usage and reducing network resource efficiency. Existing technologies increases inefficient resource utilization by allowing UEs to use an always-on PDU session for any kind of services. An implementation of existing technologies increases resource outage and decreases service reliability for wireless devices.

Example embodiments provide enhanced mechanisms (or effective mechanisms) to inform a UE which services may use an always-on PDU session and which services may not use the always-on PDU session. Embodiments of the present disclosure provide enhanced mechanisms to implement a limited number of services for an always-on PDU session. Embodiments of the present disclosure provide enhanced mechanisms to prevent UE sending unintended services on an always-on PDU session. Embodiments of the present disclosure provide enhanced mechanisms to inform a UE of allowed service(s) on an always-on PDU session. These enhanced mechanisms may improve network resource usage for an always-on PDU session.

Figure 13:
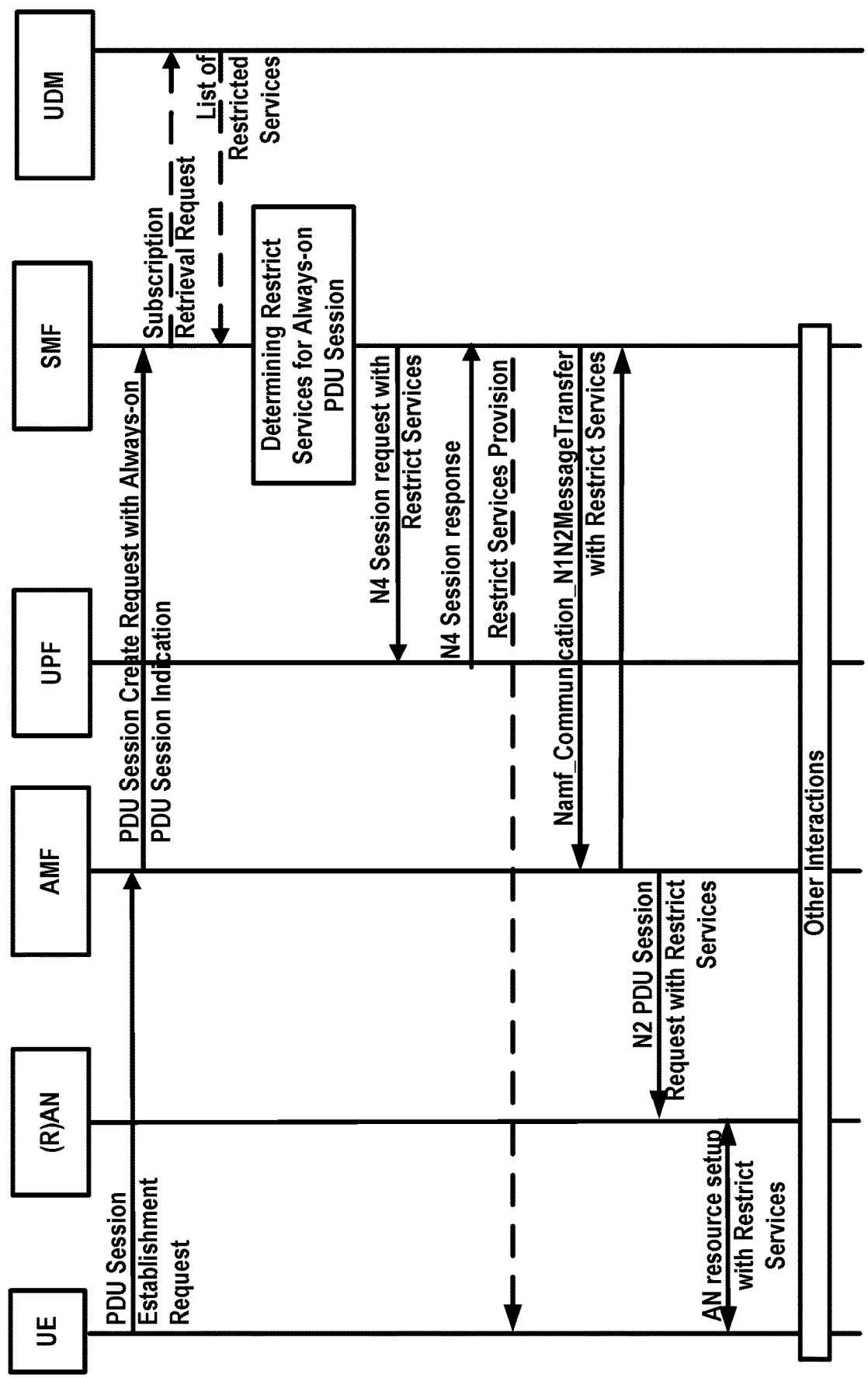
FIG. 13 is an example call flow as per an aspect of an embodiment of the present disclosure.

In an example, a UE may initiate a PDU session establishment procedure and ask for an always-on PDU session. A SMF may grant the PDU session to be the always-on PDU session. Based on user subscription information and/or local operator policy, the SMF may determine a list of restricted service for the always-on PDU session for the wireless device. The SMF may send to the wireless device the list of restricted service, and the wireless device may send traffic based on the list of restricted service. FIG. 13 shows an example call flow which may comprise one or more of these actions.

A UE may send to an AMF a NAS message comprising at least one of: S-NSSAI(s), DNN, PDU Session ID, Request type, or N1 SM container (PDU session establishment request). The UE may initiate a UE requested PDU session establishment procedure by transmitting a PDU session establishment request message within the N1 SM container of the NAS message. The PDU session establishment request message may comprise at least one of: a PDU session ID, Requested PDU Session Type, or a Requested SSC mode, etc. In an example, the UE may request to establish an always-on PDU session for the PDU session ID by including a first always-on PDU session indication (e.g. always-on PDU session requested indication) in the PDU session establishment request message. In an example, the UE may transmit the NAS message via a RAN node (e.g. gNB, eNB, base station). The UE may transmit, to the RAN node, a radio resource control (RRC) message (e.g. uplink (UL) information transfer message, RRC setup complete message, RRC resume complete message, RRC reconfiguration complete message, and/or the like) comprising the NAS message. The RAN node may transmit, to the AMF, a N2 message (e.g. NG message, initial UE message, uplink NAS transport message, reroute NAS request message, handover request message, initial context setup request message, PDU session resource setup/modify response message, PDU session resource modify required message, and/or the like) comprising the NAS message.

In response to the NAS message received from the UE, the AMF may select an SMF and send to the selected SMF a message (e.g. PDUSession_CreateSMContext Request) comprising at least one of: SUPI, DNN, S-NSSAI(s) and/or network slice instance identifier(s), PDU Session ID, AMF ID, Request Type, Priority Access, N1 SM container (PDU Session Establishment Request), User location information, Access Type, PEI). The message sent to the SMF may be used by the AMF to request establishing the PDU session. In response to receiving the message from the AMF, the SMF may send a response message (e.g. Namf_PDUSession_CreateSMContext Response) to the AMF to indicate whether the request from the AMF and/or the UE is accepted or not.

In response to the PDUSession_CreateSMContext Request message received from the AMF, the SMF may send to the AMF a response message (e.g. PDUSession_CreateSMContext Response) comprising at least one of: Cause, SM Context ID or N1 SM container (PDU Session Reject (Cause)).

In response to the PDUSession_CreateSMContext Request message received from the AMF, the SMF may send to a UDM a message (e.g. subscription retrieval request) requesting user subscription information. The subscription retrieval request message sent to the UDM may comprise at least one of: at least one UE identity (e.g. SUPI, PEI, and/or GPSI), at least one UE IP address (e.g. UE IPv4 address and/or UE IPv6 network prefix), Default 5QI and default ARP, Type of PDU Session (e.g. IPv4, IPv6, IPv4v6, Ethernet, Unstructured); Access Type (e.g. 3GPP access); RAT Type (e.g. 3GPP-NR-FDD); a PLMN identifier; an application identifier; an allocated application instance identifier; DNN, S-NSSAI(s) and/or network slice instance identifier(s), PDU Session ID, user location information, or information of the SMF for the PDU session (e.g. SMF identifier, IP address or FQDN of the SMF). In an example, the subscription retrieval request message sent to the UDM may comprise the first always-on PDU session indication (e.g. always-on PDU session requested indication).

In response to the subscription retrieval request message received from the SMF, the UDM may take one or more actions. In an example action, the UDM may determine/grant whether the requested PDU session to be an always-on PDU session based on the user subscription information and/or the information received from the SMF and/or the local operator policies. In an example, an always-on PDU session is allowed for a wireless device based on user subscription information, the UDM may determine/grant the requested PDU session to be an always-on PDU session based on the user subscription information. In an example, the user subscription information may comprise an indication that an always-on PDU session is allowed for a Type of PDU Session (e.g. IPv4, IPv6, IPv4v6, Ethernet, Unstructured) for a wireless device, the UDM may determine/grant the requested PDU session to be an always-on PDU session based on the user subscription information and the Type of PDU Session received from the SMF. In an example, the user subscription information may comprise an indication that an always-on PDU session is allowed for an Access Type and/or a RAT Type for a wireless device, the UDM may determine/grant the requested PDU session to be an always-on PDU session based on the user subscription information and the Access Type and/or the RAT Type received from the SMF. In an example, the user subscription information may comprise an indication that an always-on PDU session is allowed for a network slice with a URLLC Slice/Service type for a wireless device, the UDM may determine/grant the requested PDU session to be an always-on PDU session based on the user subscription information and the S-NSSAI(s) and/or network slice instance identifier(s) received from the SMF.

In an example action, based on the user subscription information and/or the information received from the SMF and/or the local operator policies, the UDM may determine a subscription always-on PDU session indication indicating that the PDU session identified by the PDU session ID is to be an always-on PDU session.

In an example action, based on the user subscription information and/or the information received from the SMF and/or the local operator policies, the UDM may determine a first list of restricted services for the always-on PDU session for the wireless device. In an example, the first list of restricted services for the always-on PDU session may be a list of services allowed for the always-on PDU session for the wireless device, e.g. emergency service, URLLC, V2X, IoT, and/or VoLTE. In an example, the first list of restricted services for the always-on PDU session may be a list of services not allowed for the always-on PDU session for the wireless device, e.g. eMBB, web browsing.

In an example, the first list of restricted services may comprise at least one of: an information element indicating a service type (e.g. URLLC, V2X), an information element indicating an application identifier, or an information element indicating the restricted service is allowed or not (e.g. the restricted service is allowed, or the restricted service is not allowed).

Figure 14:
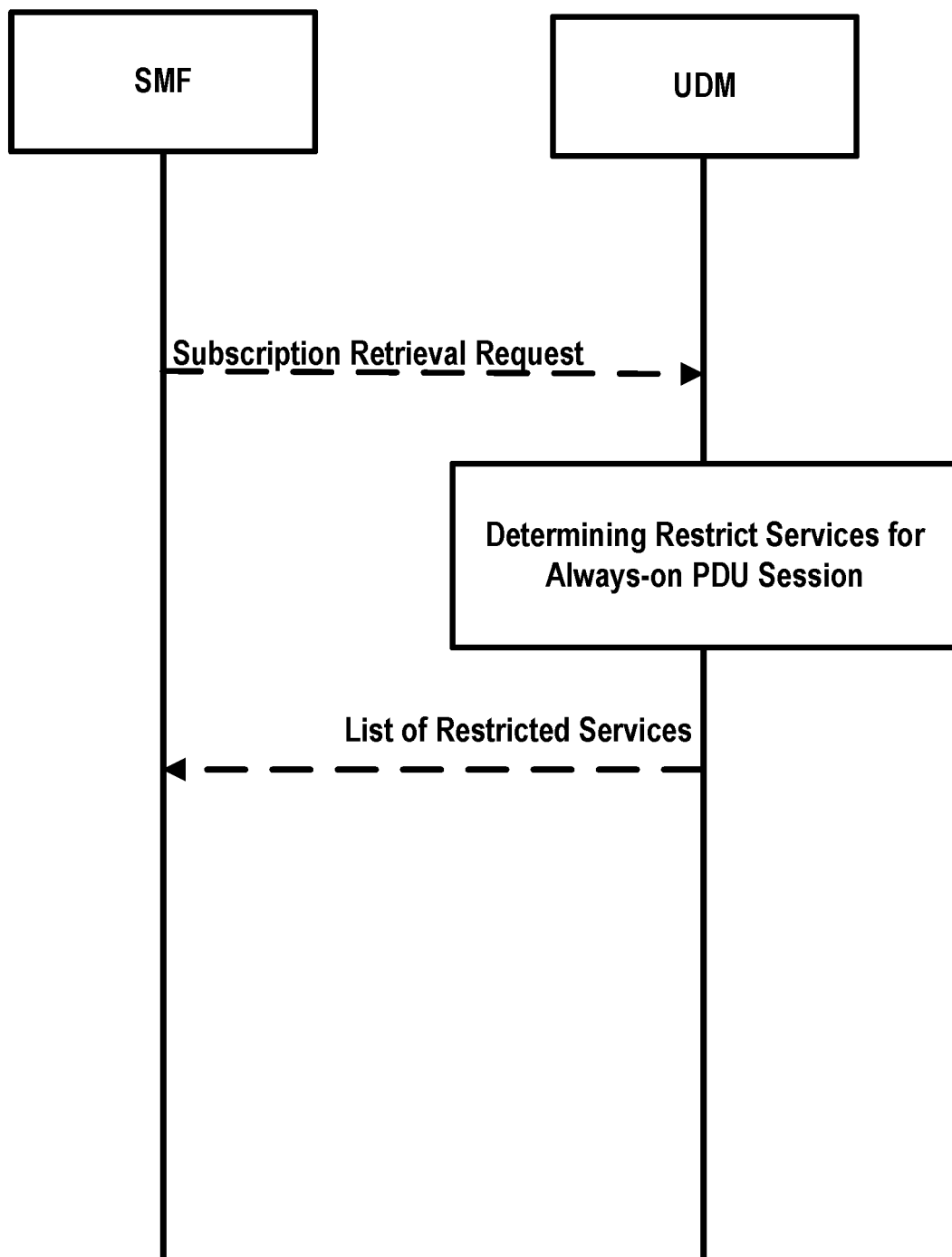
FIG. 14 is an example call flow as per an aspect of an embodiment of the present disclosure.

In an example action, the UDM may send to the SMF a response message (e.g. subscription retrieval response) comprising the subscription always-on PDU session indication and/or the first list of restricted services for the always-on PDU session. FIG. 14 is an example call flow related to the UDM as per an aspect of an embodiment of the present disclosure.

In response to the subscription retrieval response message received from the UDM, the SMF may take one or more actions. In an example, based on the subscription information received from the UDM and/or local operator policy and/or the information received from the AMF, the SMF may determine whether the requested PDU session to be an always-on PDU session and/or a second list of restricted service for the always-on PDU session for the wireless device. In an example, the SMF may determine an always-on PDU session granted indication indicating that the requested PDU session identified by the PDU session ID to be an always-on PDU session.

In an example, the SMF may determine the second list of restricted service based on the first list of restricted service and/or the Type of PDU Session (e.g. IPv4, IPv6, IPv4v6, Ethernet, Unstructured). In an example, the SMF may determine the second list of restricted service based on the first list of restricted service and/or the Access Type (e.g. 3GPP access) and/or the RAT Type (e.g. 3GPP-NR-FDD). In an example, the SMF may determine the second list of restricted service based on the first list of restricted service and/or the S-NSSAI(s) and/or network slice instance identifier(s).

In an example, the second list of restricted services for the always-on PDU session may be a list of services allowed for the always-on PDU session for the wireless device, e.g. emergency service, URLLC, V2X, IoT, and/or VoLTE. In an example, the second list of restricted services for the always-on PDU session may be a list of services not allowed for the always-on PDU session for the wireless device, e.g. eMBB, web browsing. In an example, the second list of restricted services may be the same as the first list of restricted services. In an example, the second list of restricted services may be different from the first list of restricted services.

In an example, the second list of restricted services may comprise at least one of: an information element indicating a service type (e.g. URLLC, V2X), an information element indicating an application identifier, or an information element indicating the restricted service is allowed or not (e.g. the restricted service is allowed, or the restricted service is not allowed).

In an example, the SMF may determine at least one of the user plane rules based on the second list of restricted services for the always-on PDU session. The user plane rules may comprise at least one of: at least one packet detection rule; at least one forwarding action rule; at least one QoS enforcement rule; or at least one usage reporting rule. The at least one user plane rule determined by the SMF may be applied to the always-on PDU session.

In an example, the at least one packet detection rule may comprise data/traffic packet detection information, e.g. one or more match fields against which incoming packets are matched and may apply other user plane rules (e.g. forwarding action rule, QoS enforcement rule, and usage reporting rule) to the data/traffic packets matching the packet detection rule. In an example, the at least one forwarding action rule may comprise an apply action parameter, which may indicate whether a UP function may forward, duplicate, drop or buffer the data/traffic packet respectively. In an example, the at least one usage reporting rule may be used to measure the network resources usage in terms of traffic data volume, duration (e.g. time) and/or events, according to a measurement method in the usage reporting rule. In an example, the QoS enforcement rule contains instructions to request the UP function to perform QoS enforcement of the user plane traffic.

In an example, the SMF may determine a packet detection rule based on the second list of restricted services for the always-on PDU session, e.g. the packet detection rule may comprise an application identifier, where the application identifier may indicate at least one of the second list of restricted services. In an example, the SMF may determine a forwarding action rule based on the second list of restricted services for the always-on PDU session, e.g. the forwarding action rule may comprise an apply action parameter, which may indicate whether a UP function may forward, duplicate, drop or buffer the data/traffic packet respectively when the UP function detects the at least one of the second list of restricted services. In an example, the SMF may determine a QoS enforcement rule based on the second list of restricted services for the always-on PDU session, e.g. the QoS enforcement rule may comprise a specific 5QI, ARP and/or bandwidth for the at least one of the second list of restricted services. In an example, the SMF may determine a usage reporting rule based on the second list of restricted services for the always-on PDU session.

In an example action, the SMF may select a UPF based on the second list of restricted services for the always-on PDU session, e.g. the UPF have the capability to detect the second list of restricted services for the always-on PDU session. In an example action, the SMF may send to the UPF a message (e.g. N4 session establishment/modification request) comprising the at least one of the following user plane rules for the always-on PDU session: at least one packet detection rule; at least one forwarding action rule; at least one QoS enforcement rule; or at least one usage reporting rule.

In response to receiving the message from the SMF, the UPF may install the user plane rules received from the SMF, send to the SMF a response message (e.g. N4 session establishment/modification response), and enforce the user plane rules for the always-on PDU session. In an example, the UPF may determine to forward or drop the user plane packet for the always-on PDU session based on the user plane rules.

Figure 15:
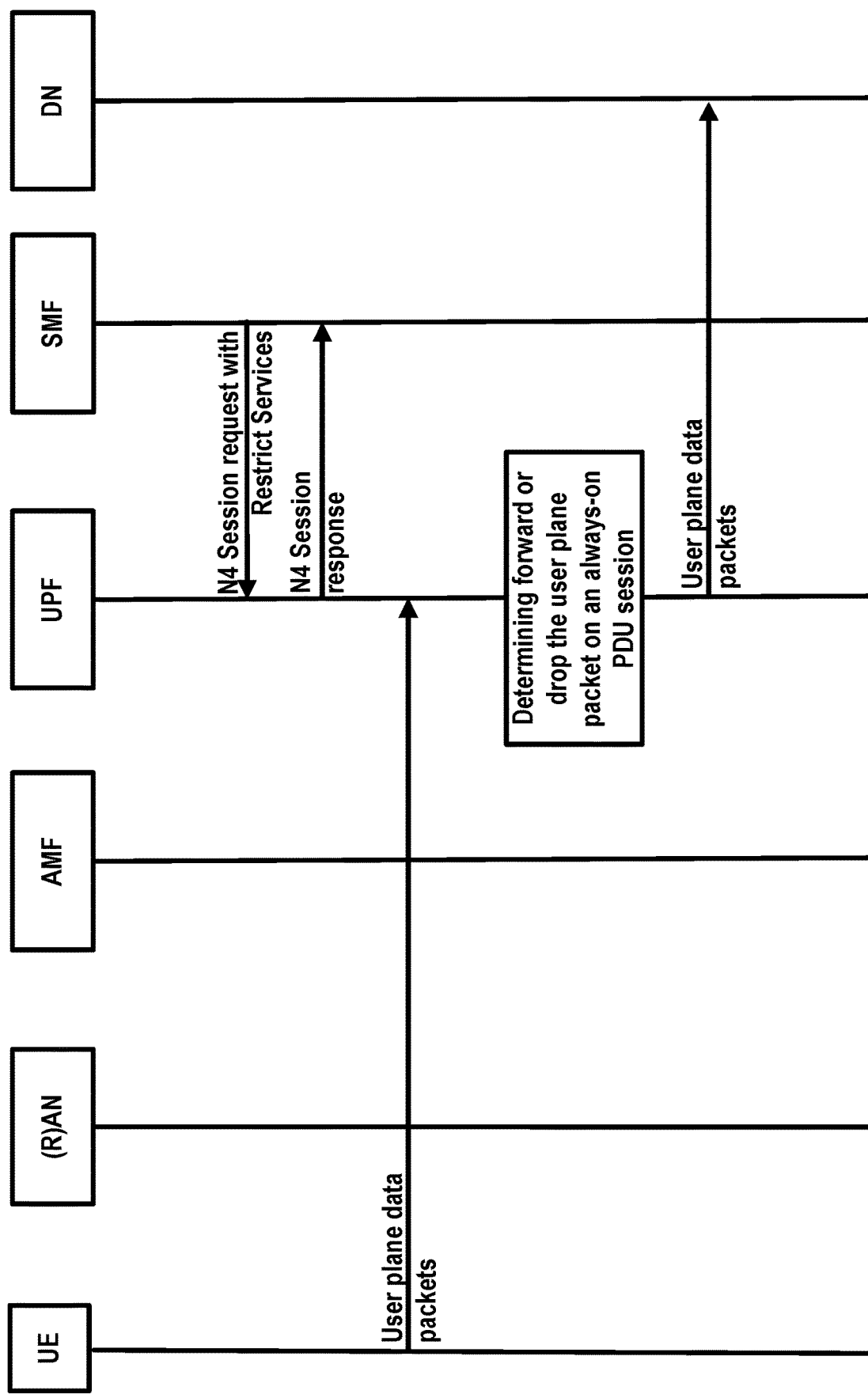
FIG. 15 is an example call flow as per an aspect of an embodiment of the present disclosure.

In an example, the UPF may enforce the at least one packet detection rule by matching a user data/traffic packet with service data flow template (e.g. service data flow filter(s) and/or application identifier(s)) and may apply other user plane rules (e.g. forwarding action rule, QoS enforcement rule, and usage reporting rule) to the data/traffic packets matched the packet detection rule. In an example, the UPF may detect a restricted service for the always-on PDU session by the packet detection rule and enforce the at least one forwarding action rule by forwarding, duplicating, dropping or buffering a data/traffic packet respectively. In an example, the UPF may forward a packet which is an allowed service for the always-on PDU session for the wireless device. In an example, the UPF may drop a packet which is a not allowed service for the always-on PDU session. In an example, the UPF may enforce the at least one QoS enforcement rule by applying session AMBR and default 5QI/ARP combination for the always-on PDU session. In an example, the UPF may enforce the at least one QoS enforcement rule by applying at least one of QoS parameters: Session AMBR and default 5QI/ARP combination to a PDU session. FIG. 15 is an example call flow related to the UPF as per an aspect of an embodiment of the present disclosure.

In an example, the SMF may send to the UE a message (e.g. restricted service provision request) comprising at least one of: the second list of restricted services for the always-on PDU session, the always-on PDU session granted indication, or the PDU session ID identifies the always-on PDU session.

Figure 16:
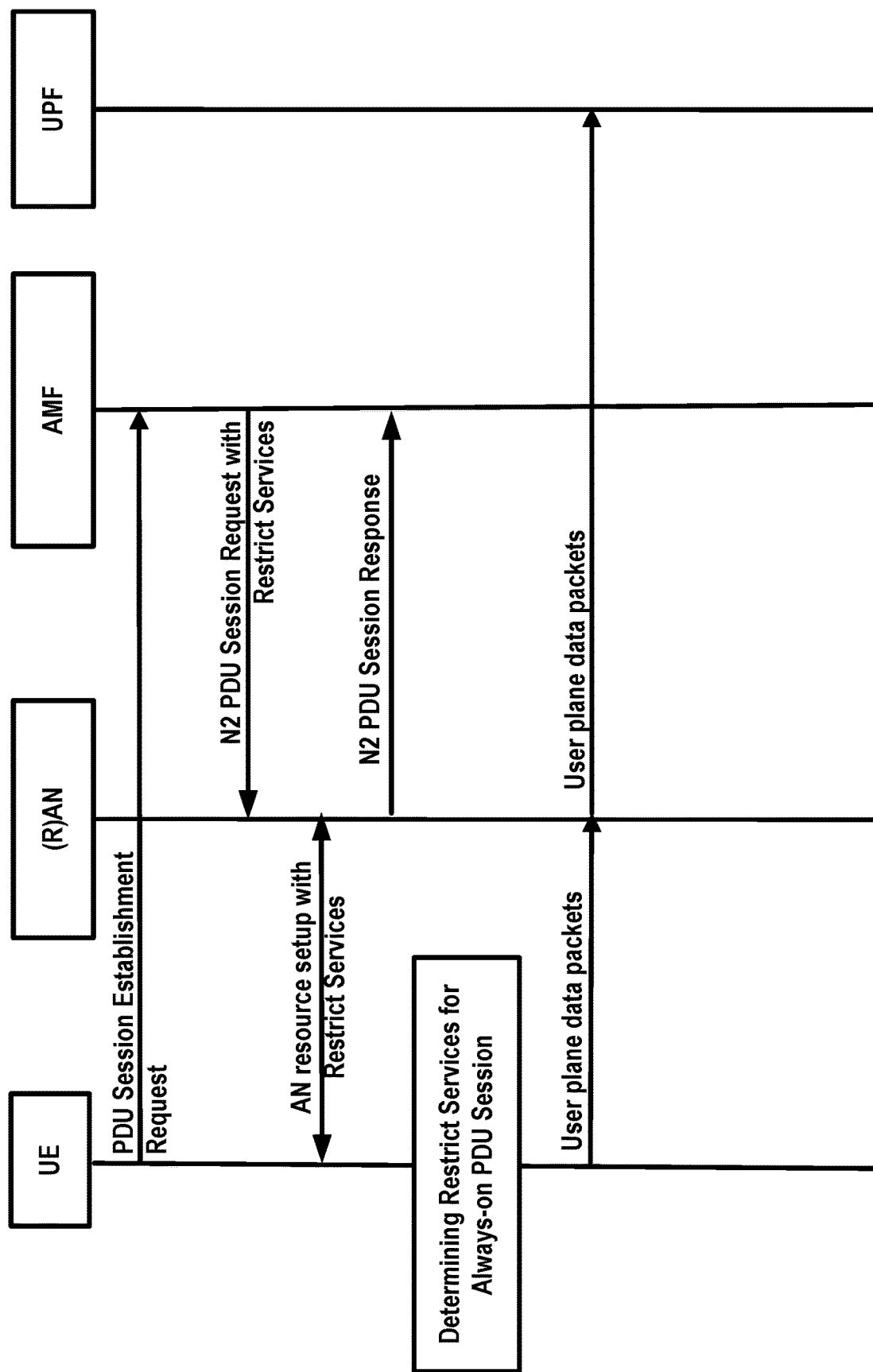
FIG. 16 is an example call flow as per an aspect of an embodiment of the present disclosure.

In an example, the SMF may send to the AMF a message (e.g. Namf_Communication_N1N2MessageTransfer) comprising at least one of: the second list of restricted services for the always-on PDU session, the always-on PDU session granted indication, or the PDU session ID identifies the always-on PDU session. The AMF may send to the SMF a response message. In an example, in response to the Namf_Communication_N1N2MessageTransfer message received from the SMF, the AMF may send to a (R)AN a message (e.g. N2 PDU Session Request) comprising at least one of: the second list of restricted services for the always-on PDU session, the always-on PDU session granted indication, or the PDU session ID identifies the always-on PDU session. The (R)AN may send to the UE a message (e.g. RRC Connection Reconfiguration) comprising at least one of: the second list of restricted services for the always-on PDU session, the always-on PDU session granted indication, or the PDU session ID identifies the always-on PDU session. Based on the information received from the (R)AN (e.g. the second list of restricted services for the always-on PDU session), the UE may determine at least one allowed service from the second list of restricted services for the always-on PDU session. In an example, the UE may send to the base station at least one packet of the at least one allowed service on the always-on PDU session. FIG. 16 is an example call flow related to the UE as per an aspect of an embodiment of the present disclosure.

Figure 17:
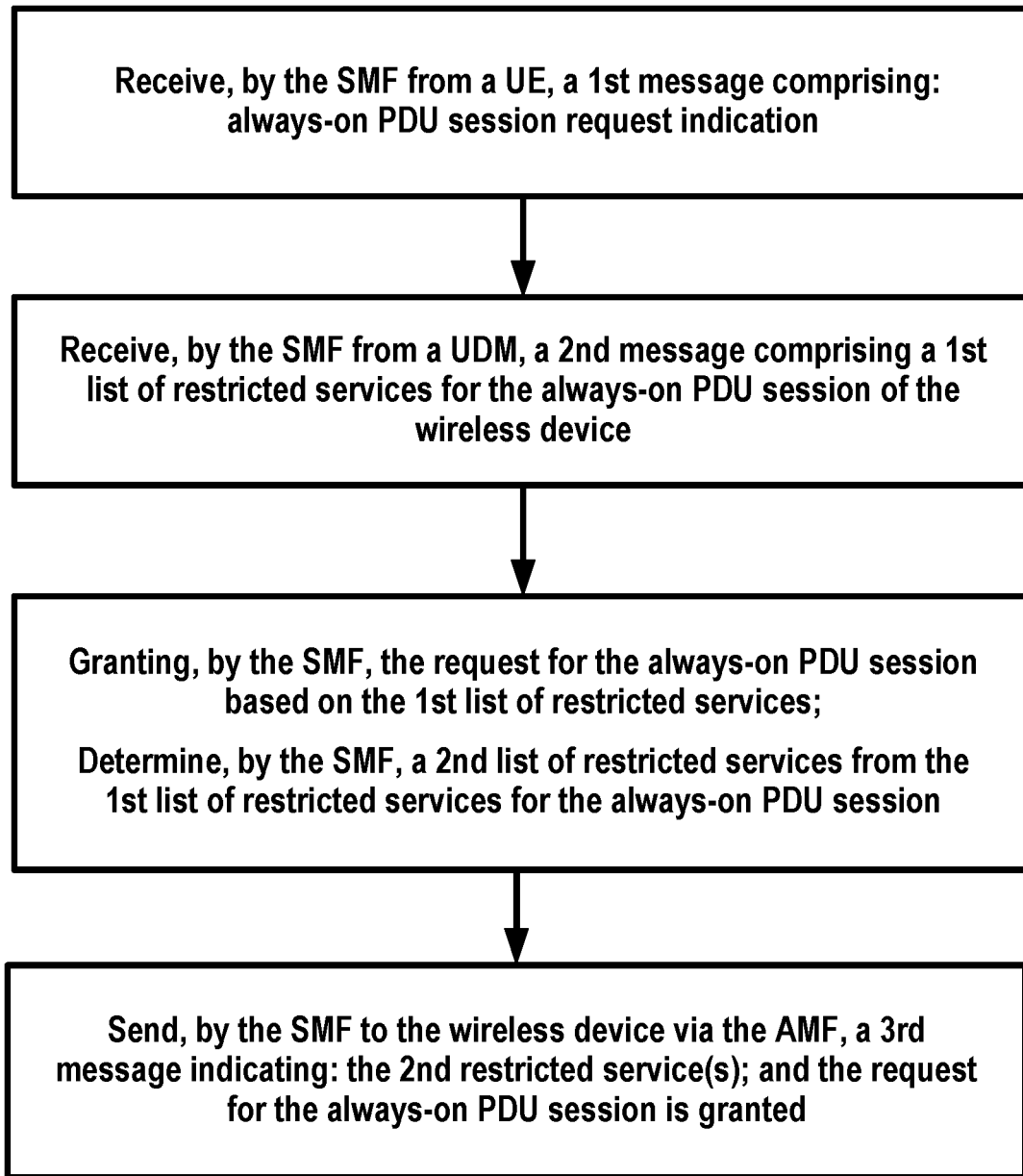
FIG. 17 is an example diagram depicting the procedures of SMF as per an aspect of an embodiment of the present disclosure.

In an example, other interactions may be performed between SMF, AMF, (R)AN and UE for the PDU session establishment procedure. FIG. 17 is an example diagram depicting the procedures of SMF as per an aspect of an embodiment of the present disclosure.

Figure 18:
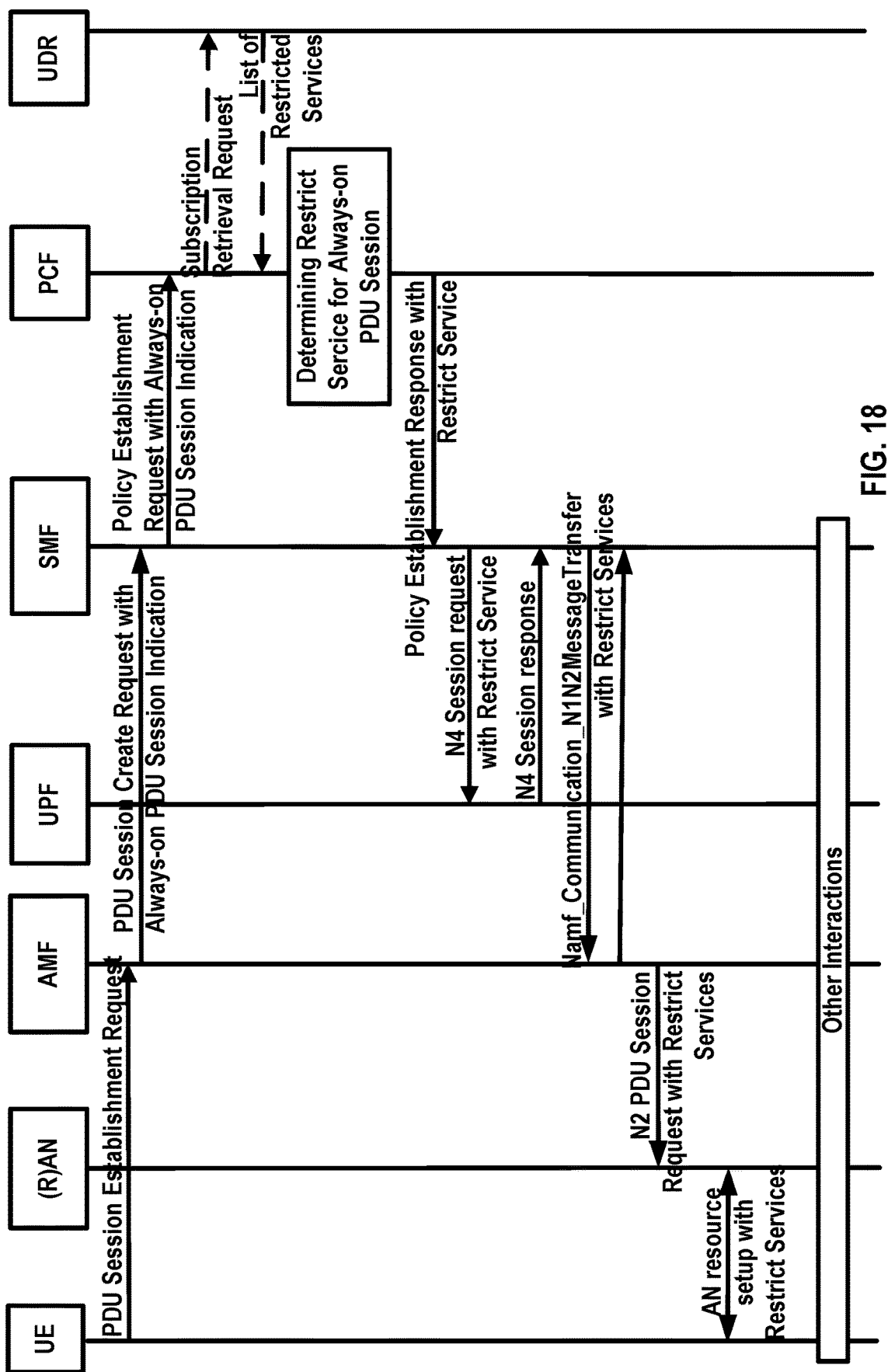
FIG. 18 is an example call flow as per an aspect of an embodiment of the present disclosure.

In an example, a UE may initiate a PDU session establishment procedure, a SMF may send a first always-on PDU session indication to a PCF, the PCF may query subscription information from a UDR, and the PCF may determine a list of restricted service for the always-on PDU session for the wireless device based on the subscription information from the UDR. The PCF may send the list of restricted service to the SMF, and the SMF may send the list of restricted service to the UE. FIG. 18 shows an example call flow which may comprise one or more actions.

A UE may send to an AMF a NAS message comprising at least one of: S-NSSAI(s), DNN, PDU Session ID, Request type, or N1 SM container (PDU session establishment request). The UE may initiate a UE requested PDU session establishment procedure by transmitting a PDU session establishment request message within the N1 SM container of the NAS message. The PDU session establishment request message may comprise at least one of: a PDU session ID, Requested PDU Session Type, or a Requested SSC mode, etc. In an example, the UE may request to establish an always-on PDU session for the PDU session ID by including a first always-on PDU session indication (e.g. always-on PDU session requested indication) in the PDU session establishment request message. In an example, the UE may transmit the NAS message via a RAN node (e.g. gNB, eNB, base station). The UE may transmit, to the RAN node, a radio resource control (RRC) message (e.g. uplink (UL) information transfer message, RRC setup complete message, RRC resume complete message, RRC reconfiguration complete message, and/or the like) comprising the NAS message. The RAN node may transmit, to the AMF, a N2 message (e.g. NG message, initial UE message, uplink NAS transport message, reroute NAS request message, handover request message, initial context setup request message, PDU session resource setup/modify response message, PDU session resource modify required message, and/or the like) comprising the NAS message.

In response to the NAS message received from the UE, the AMF may select an SMF and send to the selected SMF a message (e.g. PDUSession_CreateSMContext Request) comprising at least one of: SUPI, DNN, S-NSSAI(s) and/or network slice instance identifier(s), PDU Session ID, AMF ID, Request Type, PCF identifier, Priority Access, N1 SM container (PDU Session Establishment Request), User location information, Access Type, PEI). The message sent to the SMF may be used by the AMF to request establishing the PDU session. In response to receiving the message from the AMF, the SMF may send a response message (e.g. Namf_P-DUSession_CreateSMContext Response) to the AMF to indicate whether the request from the AMF and/or the UE is accepted or not.

In an example, the PCF identifier may be an IP address or FQDN that identifies the PCF. In an example, the message sent to the SMF by the AMF may comprise the first always-on PDU session indication (e.g. always-on PDU session requested indication) requesting establishment of the always-on PDU session.

In an example, in response to the PDUSession_CreateSMContext Request message received from the AMF, the SMF may send to the AMF a response message (e.g. PDUSession_CreateSMContext Response) comprising at least one of: Cause, SM Context ID or N1 SM container (PDU Session Reject (Cause)).

If dynamic PCC is deployed and a PCF ID is provided by the AMF, the SMF may perform a PCF selection procedure by selecting a PCF based on the PCF ID.

The SMF may perform an SM Policy Association Establishment procedure to establish a PDU Session with the selected PCF and get default PCC Rules for the PDU Session. The PDU session may be identified by the PDU Session ID. The SM Policy Association Establishment request message sent to the PCF by the SMF may comprise at least one UE identity (e.g. SUPI, PEI, and/or GPSI) and/or at least one UE IP address (e.g. UE IPv4 address and/or UE IPv6 network prefix) for the UE. The SM Policy Association Establishment request message sent to the PCF by the SMF may comprise at least one of the following information elements for the PDU session and/or the UE: Default 5QI and default ARP, Type of the PDU Session (e.g. IPv4, IPv6, IPv4v6, Ethernet, Unstructured); Access Type (e.g. 3GPP access); RAT Type (e.g. 3GPP-NR-FDD); a PLMN identifier; an application identifier; an allocated application instance identifier; DNN, S-NSSAI(s) and/or network slice instance identifier(s), PDU Session ID, user location information, or information of the SMF for the PDU session (e.g. SMF identifier, IP address or FQDN of the SMF). In an example, the message sent to the PCF may comprise the first always-on PDU session indication (e.g. always-on PDU session requested indication). In an example, the first always-on PDU session indication (e.g. always-on PDU session requested indication) may be used by the SMF to ask for granting a requested PDU session to be an always-on PDU session, and the requested PDU session may be identified by the PDU Session ID. In an example, the first always-on PDU session indication (e.g. always-on PDU session requested indication) may be used by the SMF to ask for PCC rule(s) for the always-on PDU session. In an example, the first always-on PDU session indication (e.g. always-on PDU session requested indication) may be used by the SMF to ask for list of restricted service for the always-on PDU session.

In response to the SM Policy Association Establishment request message received from the SMF, the PCF may send to a UDR a message (e.g. subscription retrieval request) requesting user subscription information. In an example, the subscription retrieval request message sent to the UDR may comprise at least one of: at least one UE identity (e.g. SUPI, PEI, and/or GPSI), at least one UE IP address (e.g. UE IPv4 address and/or UE IPv6 network prefix), Default 5QI and default ARP, Type of PDU Session (e.g. IPv4, IPv6, IPv4v6, Ethernet, Unstructured); Access Type (e.g. 3GPP access); RAT Type (e.g. 3GPP-NR-FDD); a PLMN identifier; an application identifier; an allocated application instance identifier; DNN, S-NSSAI(s) and/or network slice instance identifier(s), PDU Session ID, user location information, or information of the SMF for the PDU session (e.g. SMF identifier, IP address or FQDN of the SMF). In an example, the subscription retrieval request message sent to the UDR may comprise the first always-on PDU session indication (e.g. always-on PDU session requested indication).

In an example, in response to the subscription retrieval request message received from the PCF, the UDR may take one or more actions. In an example action, the UDR may determine/grant whether the requested PDU session to be an always-on PDU session based on the user subscription information and/or the information received from the PCF and/or the local operator policies. In an example, an always-on PDU session is allowed for a wireless device based on user subscription information, the UDR may determine/ grant the requested PDU session to be an always-on PDU session based on the user subscription information.

In an example action, based on the user subscription information and/or the information received from the PCF and/or the local operator policies, the UDR may determine a subscription always-on PDU session indication indicating that the PDU session identified by the PDU session ID is to be an always-on PDU session.

In an example action, based on the user subscription information and/or the information received from the PCF and/or the local operator policies, the UDR may determine a first list of restricted services for the always-on PDU session for the wireless device. In an example, the first list of restricted services for the always-on PDU session may be a list of services allowed for the always-on PDU session for the wireless device, e.g. emergency service, URLLC, V2X, IoT, and/or VoLTE. In an example, the first list of restricted services for the always-on PDU session may be a list of services not allowed for the always-on PDU session for the wireless device, e.g. eMBB, web browsing.

In an example, the first list of restricted services may comprise at least one of: an information element indicating a service type (e.g. URLLC, V2X), an information element indicating an application identifier, or an information element indicating the restricted service is allowed or not (e.g. the restricted service is allowed, or the restricted service is not allowed).

Figure 19:
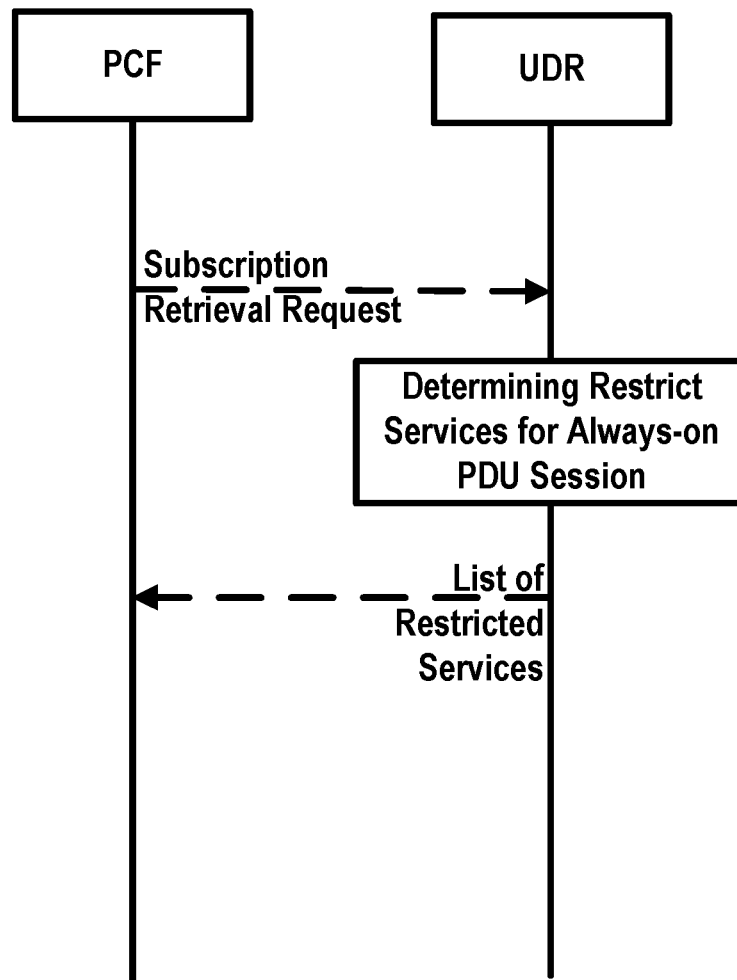
FIG. 19 is an example call flow as per an aspect of an embodiment of the present disclosure.

In an example action, the UDR may send to the PCF a response message (e.g. subscription retrieval response) comprising the subscription always-on PDU session indication and/or the first list of restricted services for the always-on PDU session. FIG. 19 is an example call flow related to the UDR as per an aspect of an embodiment of the present disclosure.

In response to the message received from the UDR, the PCF may take one or more actions.

In an example action, the PCF may determine/grant whether the requested PDU session to be an always-on PDU session based on the information received from the UDR, and/or the information received from the SMF, and/or the local operator policies. In an example, the PCF may determine/grant the requested PDU session to be an always-on PDU session based on one or more the following information: the subscription always-on PDU session indication, the first always-on PDU session indication (e.g. always-on PDU session requested indication), the at least one UE identity (e.g. SUPI, PEI, and/or GPSI), the at least one UE IP address (e.g. UE IPv4 address and/or UE IPv6 network prefix), the Default 5QI and default ARP, the Type of PDU Session (e.g. IPv4, IPv6, IPv4v6, Ethernet, Unstructured); the Access Type (e.g. 3GPP access); the RAT Type (e.g. 3GPP-NR-FDD); the PLMN identifier; the application identifier; the allocated application instance identifier; the DNN, the S-NSSAI(s) and/or network slice instance identifier(s), the PDU Session ID, user location information, information of the SMF for the PDU session (e.g. SMF identifier, IP address or FQDN of the SMF), and/or time duration information.

In an example action, the PCF may make policy decision based on the information received from the SMF (e.g. always-on PDU session requested indication), and/or the information received from the UDR (e.g. subscription policies) and may determine/generate/create/derive one or more PCC rules comprising one or more charging control rules, the one or more PCC rules and/or the one or more charging control rules may apply to the always-on PDU session identified by a PDU session identifier. The one or more PCC rules and/or the one or more charging control rules may apply to at least one service data flow identified by at least one service data flow filter. The one or more PCC rules and/or the one or more charging control rules may apply to at least one application identified by an application identifier. The one or more PCC rules and/or the one or more charging control rules may apply to a wireless device identified by a UE identity. The one or more PCC rules and/or the one or more charging control rules may apply to a data network identified by a DNN. The one or more PCC rules and/or the one or more charging control rules may apply to a network slice identified by an S-NSSAI and/or a network slice instance identifier.

The one or more PCC rules determined by the PCF may comprise at least one of: at least one charging control rule; at least one policy control rule comprising at least one QoS control rule and/or at least one gating control rule; at least one usage monitoring control rule; at least one application detection and control rule; at least one traffic steering control rule; or at least one service data flow detection information (e.g. service data flow template). In an example, the charging control rule may be used for charging control and may comprise at least one of: an information element indicating a charging method/charging type, wherein the charging method/charging type may comprise at least one of: online charging, offline charging, or converged charging; an information element indicating at least one charging rate; or an information element indicating at least one identifier or address of a CHF.

In an example, the policy control rule may be used for policy control, wherein the at least one QoS control rule may be used for QoS control and the at least one gating control rule may be used for gating control. In an example, the QoS control rule may be used to authorize QoS on a service data flow. In an example, the gating control rule may be used to discard packets that don't match any service data flow of the gating control rule and/or associated PCC rules. In an example, the usage monitoring control rule may be used to monitor, both volume and time usage, and report the accumulated usage of network resources. In an example, the application detection and control rule may comprise a request to detect a specified application traffic, report to a PCF on a start or stop of application traffic and to apply a specified enforcement and charging actions. In an example, the traffic steering control rule may be used to activate/deactivate traffic steering policies for steering a subscriber's traffic to appropriate operator or 3rd party service functions (e.g. NAT, antimalware, parental control, DDoS protection) in an (S)Gi-LAN. In an example, the service data flow detection information (e.g. service data flow template) may comprise a list of service data flow filters or an application identifier that references the corresponding application detection filter for the detection of the service data flow. In an example, the service data flow detection information (e.g. service data flow template) may comprise combination of traffic patterns of the Ethernet PDU traffic.

In an example action, the PCF may determine a second list of restricted service based on the information received from the SMF (e.g. always-on PDU session requested indication), and/or the information received from the UDR (e.g. the first list of restricted service). In an example, the PCF may determine the second list of restricted service based on the first list of restricted service and/or the Type of PDU Session (e.g. IPv4, IPv6, IPv4v6, Ethernet, Unstructured). In an example, the PCF may determine the second list of restricted service based on the first list of restricted service and/or the Access Type (e.g. 3GPP access) and/or the RAT Type (e.g. 3GPP-NR-FDD). In an example, the PCF may determine the second list of restricted service based on the first list of restricted service and/or the S-NSSAI(s) and/or network slice instance identifier(s).

In an example, the second list of restricted services for the always-on PDU session may be a list of services allowed for the always-on PDU session for the wireless device, e.g. emergency service, URLLC, V2X, IoT, and/or VoLTE. In an example, the second list of restricted services for the always-on PDU session may be a list of services not allowed for the always-on PDU session for the wireless device, e.g. eMBB, web browsing. In an example, the second list of restricted services may be the same as the first list of restricted services. In an example, the second list of restricted services may be different from the first list of restricted services.

In an example, the second list of restricted services may comprise at least one of: an information element indicating a service type (e.g. URLLC, V2X), an information element indicating an application identifier, or an information element indicating the restricted service is allowed or not (e.g. the restricted service is allowed, or the restricted service is not allowed).

In an example action, the PCF may send to the SMF a response message (e.g. SM policy association establishment response) comprising the one or more PCC rules comprising one or more charging control rules determined by the PCF. The SM policy association establishment response message sent to the SMF may comprise at least one of the following information which the one or more PCC rules applied to: the at least one UE identity (e.g. SUPI, PEI, and/or GPSI), the at least one UE IP address (e.g. UE IPv4 address and/or UE IPv6 network prefix), the Default 5QI and default ARP, the Type of PDU Session (e.g. IPv4, IPv6, IPv4v6, Ethernet, Unstructured); the Access Type (e.g. 3GPP access); the RAT Type (e.g. 3GPP-NR-FDD); the PLMN identifier; the application identifier; the DNN, the S-NSSAI(s) and/or network slice instance identifier(s), or the PDU Session ID. In an example, the SM policy association establishment response message sent to the SMF may comprise the second always-on PDU session indication (e.g. always-on PDU session granted indication) and the PDU Session ID indicating that the PDU session identified by the PDU session ID is to be an always-on PDU session. In an example, the SM policy association establishment response message sent to the SMF may comprise the second list of restricted services for the always-on PDU session. In an example, the PCF may send the second list of restricted services to the SMF in the one or more PCC rules. In an example, the PCF may send to the SMF the second list of restricted services along with the one or more PCC rules.

In an example, the SMF may determine at least one of the user plane rules based on the second list of restricted services for the always-on PDU session. The user plane rules may comprise at least one of: at least one packet detection rule; at least one forwarding action rule; at least one QoS enforcement rule; or at least one usage reporting rule. The at least one user plane rule determined by the SMF may be applied to the always-on PDU session.

In an example, the at least one packet detection rule may comprise data/traffic packet detection information, e.g. one or more match fields against which incoming packets are matched and may apply other user plane rules (e.g. forwarding action rule, QoS enforcement rule, and usage reporting rule) to the data/traffic packets matching the packet detection rule. In an example, the at least one forwarding action rule may comprise an apply action parameter, which may indicate whether a UP function may forward, duplicate, drop or buffer the data/traffic packet respectively. In an example, the at least one usage reporting rule may be used to measure the network resources usage in terms of traffic data volume, duration (e.g. time) and/or events, according to a measurement method in the usage reporting rule. In an example, the QoS enforcement rule contains instructions to request the UP function to perform QoS enforcement of the user plane traffic.

In an example, the SMF may determine a packet detection rule based on the second list of restricted services for the always-on PDU session, e.g. the packet detection rule may comprise an application identifier, where the application identifier may indicate at least one of the second list of restricted services. In an example, the SMF may determine a forwarding action rule based on the second list of restricted services for the always-on PDU session, e.g. the forwarding action rule may comprise an apply action parameter, which may indicate whether a UP function may forward, duplicate, drop or buffer the data/traffic packet respectively when the UP function detects the at least one of the second list of restricted services. In an example, the SMF may determine a QoS enforcement rule based on the second list of restricted services for the always-on PDU session, e.g. the QoS enforcement rule may comprise a specific 5QI, ARP and/or bandwidth for the at least one of the second list of restricted services. In an example, the SMF may determine a usage reporting rule based on the second list of restricted services for the always-on PDU session.

In an example action, the SMF may select a UPF based on the second list of restricted services for the always-on PDU session, e.g. the UPF have the capability to detect the second list of restricted services for the always-on PDU session. In an example action, the SMF may send to the UPF a message (e.g. N4 session establishment/modification request) comprising the at least one of the following user plane rules for the always-on PDU session: at least one packet detection rule; at least one forwarding action rule; at least one QoS enforcement rule; or at least one usage reporting rule.

In response to receiving the message from the SMF, the UPF may install the user plane rules received from the SMF, send to the SMF a response message (e.g. N4 session establishment/modification response), and enforce the user plane rules for the always-on PDU session. In an example, the UPF may determine to forward or drop the user plane packet for the always-on PDU session based on the user plane rules.

In an example, the UPF may enforce the at least one packet detection rule by matching a user data/traffic packet with service data flow template (e.g. service data flow filter(s) and/or application identifier(s)) and may apply other user plane rules (e.g. forwarding action rule, QoS enforcement rule, and usage reporting rule) to the data/traffic packets matched the packet detection rule. In an example, the UPF may detect a restricted service for the always-on PDU session by the packet detection rule and enforce the at least one forwarding action rule by forwarding, duplicating, dropping or buffering a data/traffic packet respectively. In an example, the UPF may forward a packet which is an allowed service for the always-on PDU session for the wireless device. In an example, the UPF may drop a packet which is a not allowed service for the always-on PDU session. In an example, the UPF may enforce the at least one QoS enforcement rule by applying session AMBR and default 5QI/ARP combination for the always-on PDU session. In an example, the UPF may enforce the at least one QoS enforcement rule by applying at least one of QoS parameters: Session AMBR and default 5QI/ARP combination to a PDU session. FIG. 15 is an example call flow related to the UPF as per an aspect of an embodiment of the present disclosure.

In an example, the SMF may send to the UE a message (e.g. restricted service provision request) comprising at least one of: the second list of restricted services for the always-on PDU session, the always-on PDU session granted indication, or the PDU session ID identifies the always-on PDU session.

In an example, the SMF may send to the AMF a message (e.g. Namf_Communication_N1N2MessageTransfer) comprising at least one of: the second list of restricted services for the always-on PDU session, the always-on PDU session granted indication, or the PDU session ID identifies the always-on PDU session. The AMF may send to the SMF a response message. In an example, in response to the Namf_Communication_N1N2MessageTransfer message received from the SMF, the AMF may send to a (R)AN a message (e.g. N2 PDU Session Request) comprising at least one of: the second list of restricted services for the always-on PDU session, the always-on PDU session granted indication, or the PDU session ID identifies the always-on PDU session. The (R)AN may send to the UE a message (e.g. RRC Connection Reconfiguration) comprising at least one of: the second list of restricted services for the always-on PDU session, the always-on PDU session granted indication, or the PDU session ID identifies the always-on PDU session. Based on the information received from the (R)AN (e.g. the second list of restricted services for the always-on PDU session), the UE may determine at least one allowed service from the second list of restricted services for the always-on PDU session. In an example, the UE may send to the base station at least one packet of the at least one allowed service on the always-on PDU session. FIG. 16 is an example call flow related to the UE as per an aspect of an embodiment of the present disclosure.

In an example, other interactions may be performed between SMF, AMF, (R)AN and UE for the PDU session establishment procedure.

Figure 20:
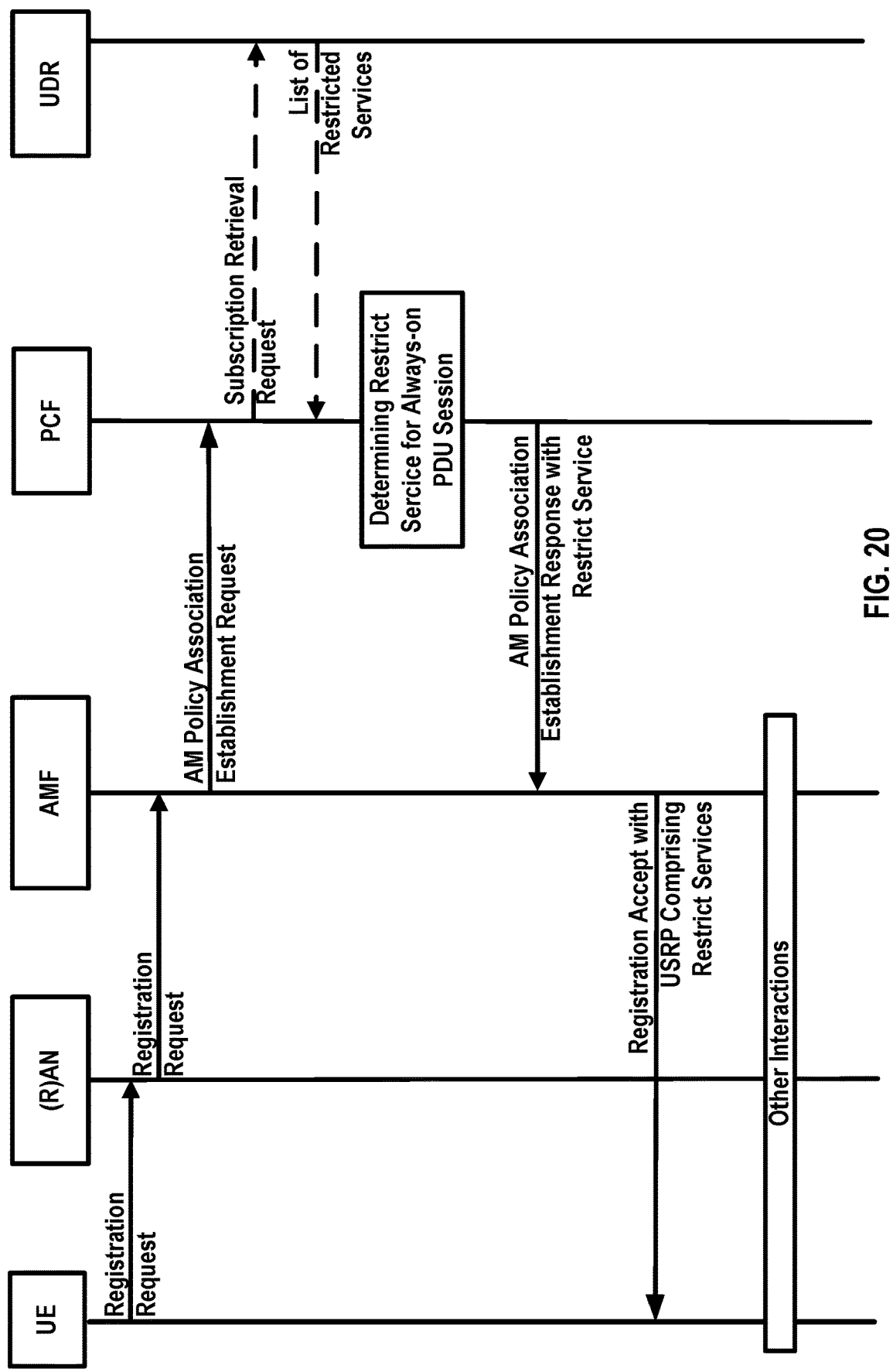
FIG. 20 is an example call flow as per an aspect of an embodiment of the present disclosure.

In an example, a UE may initiate a registration procedure to an AMF, the AMF may ask for access policy to a PCF, the PCF may query subscription information from a UDR, and the PCF may determine a list of restricted service for the always-on PDU session for the wireless device based on the subscription information from the UDR. The PCF may send the list of restricted service to the AMF, and the AMF may send the list of restricted service to the UE. FIG. 20 shows an example call flow which may comprise one or more actions.

In an example, a UE may send to the (R)AN a first radio resource control (RRC) message (e.g. an RRC connection complete message and/or an RRC connection request message) comprising a registration request message. The registration request message may comprise at least one UE identity (e.g. SUPI, PEI, and/or GPSI), and/or UE policy container (the list of PSIs, indication of UE support for ANDSP). The registration request message may comprise always-on PDU Sessions which are accepted by the network in the List Of PDU Sessions To Be Activated even if there are no pending uplink data for those PDU Sessions. The registration request message may comprise an indication parameter indicating that a registration of the registration request message is for the at least one restricted local operator service. In response to the message received from the UE, the (R)AN may forward to an AMF the received registration request message comprising the one or more information elements received from the UE.

In response to the message received from the (R)AN, the AMF may select/determine a PCF based on the information received from the (R)AN send to the PCF a message (e.g. policy association establishment request) comprising one or more of the information received from the UE (e.g. the at least one identity of the UE, and/or the indication parameter). In an example, the policy association establishment request message may comprise at least one of: Access Type (e.g. 3GPP access); RAT Type (e.g. 3GPP-NR-FDD); a PLMN identifier; S-NSSAI(s) and/or network slice instance identifier(s).

In an example, in response to the policy association establishment request message received from the AMF, the PCF may send to a UDR a message (e.g. subscription retrieval request) requesting user subscription information. In an example, the subscription retrieval request message sent to the UDR may comprise at least one of: at least one UE identity (e.g. SUPI, PEI, and/or GPSI); Access Type (e.g. 3GPP access); RAT Type (e.g. 3GPP-NR-FDD); a PLMN identifier; S-NSSAI(s) and/or network slice instance identifier(s). In an example, the subscription retrieval request message sent to the UDR may comprise a first always-on PDU session indication (e.g. always-on PDU session requested indication).

In an example, in response to the subscription retrieval request message received from the PCF, the UDR may take one or more actions. In an example action, the UDR may determine/grant whether at least one always-on PDU session is allowed for the wireless device based on the user subscription information and/or the information received from the PCF and/or the local operator policies. In an example, an always-on PDU session is allowed for the wireless device based on user subscription information.

In an example action, based on the user subscription information and/or the information received from the PCF and/or the local operator policies, the UDR may determine a subscription always-on PDU session indication indicating that the an always-on PDU session is allowed for the wireless device.

In an example action, based on the user subscription information and/or the information received from the PCF and/or the local operator policies, the UDR may determine a first list of restricted services for the always-on PDU session for the wireless device. In an example, the first list of restricted services for the always-on PDU session may be a list of services allowed for the always-on PDU session for the wireless device, e.g. emergency service, URLLC, V2X, IoT, and/or VoLTE. In an example, the first list of restricted services for the always-on PDU session may be a list of services not allowed for the always-on PDU session for the wireless device, e.g. eMBB, web browsing.

In an example, the first list of restricted services may comprise at least one of: an information element indicating a service type (e.g. URLLC, V2X), an information element indicating an application identifier, or an information element indicating the restricted service is allowed or not (e.g. the restricted service is allowed, or the restricted service is not allowed).

In an example action, the UDR may send to the PCF a response message (e.g. subscription retrieval response) comprising the subscription always-on PDU session indication and/or the first list of restricted services for the always-on PDU session. FIG. 19 is an example call flow related to the UDR as per an aspect of an embodiment of the present disclosure.

In response to the message received from the UDR, the PCF may take one or more actions. In an example action, the PCF may determine/grant whether at least one always-on PDU session is allowed for the wireless device based on the information received from the UDR, and/or the information received from the AMF, and/or the local operator policies. In an example, the PCF may determine/grant the at least one always-on PDU session is allowed for the wireless device based on one or more the following information: the subscription always-on PDU session indication, the first list of restricted services for the always-on PDU session, the at least one UE identity (e.g. SUPI, PEI, and/or GPSI), the Access Type (e.g. 3GPP access); the RAT Type (e.g. 3GPP-NR-FDD); the PLMN identifier; and/or the S-NSSAI(s) and/or network slice instance identifier(s).

In an example action, the PCF may determine a second list of restricted service based on the information received from the AMF (e.g. Access Type), and/or the information received from the UDR (e.g. the first list of restricted service). In an example, the PCF may determine the second list of restricted service based on the first list of restricted service and/or the Access Type (e.g. 3GPP access) and/or the RAT Type (e.g. 3GPP-NR-FDD). In an example, the PCF may determine the second list of restricted service based on the first list of restricted service and/or the S-NSSAI(s) and/or network slice instance identifier(s).

In an example, the second list of restricted services for the always-on PDU session may be a list of services allowed for the always-on PDU session for the wireless device, e.g. emergency service, URLLC, V2X, IoT, and/or VoLTE. In an example, the second list of restricted services for the always-on PDU session may be a list of services not allowed for the always-on PDU session for the wireless device, e.g. eMBB, web browsing. In an example, the second list of restricted services may be the same as the first list of restricted services. In an example, the second list of restricted services may be different from the first list of restricted services.

In an example, the second list of restricted services may comprise at least one of: an information element indicating a service type (e.g. URLLC, V2X), an information element indicating an application identifier, or an information element indicating the restricted service is allowed or not (e.g. the restricted service is allowed, or the restricted service is not allowed).

In an example action, the PCF may determine one or more UE Route Selection Policies (URSP), and the one or more URSP may comprise the second list of restricted services. FIG. 21 is an example diagram depicting the UE route selection policy (rule) as per an aspect of an embodiment of the present disclosure.

The PCF may send to the AMF a message (e.g. policy association establishment response) comprising one or more of: the one or more URSP, and the URSP may comprise the second list of restricted services.

In response to the message received from the PCF, the AMF may send to UE a registration accept message indicating that the registration request has been accepted. The registration accept message may comprise the one or more URSP, and the URSP may comprise the second list of restricted services.

In response to the registration accept message received from the AMF, the UE may take one or more actions. In an example action, the UE may send to the AMF a registration complete message. In an example action, the UE may determine at least one restricted service for the always-on PDU session based on the one or more URSP and/or the second list of restricted services. In an example, the UE may send to the (R)AN the at least one restricted service for the always-on PDU session. In an example, the UE may select an access network (e.g. 3GPP 5G) for the always-on PDU session based on the second list of restricted services.

In an example, the UE may enforce the URSP rule by determining how to route the traffic for the always-on PDU session based on the second list of restricted services. In an example, the UE may determine a PDU session type (e.g. Ethernet PDU session type) for the always-on PDU session, and the UE may send to an SMF a PDU session establishment request message, wherein the PDU session establishment request message may comprise an always-on PDU session request indication and/or the determined PDU session type and a PDU session ID for the always-on PDU session.

In an example, a session management function (SMF) may receive from a wireless device via an access and mobility management function (AMF), a first message requesting establishment of a packet data unit (PDU) session of the wireless device, the first message may comprise a parameter indicating a request for an always-on PDU session. In an example, the SMF may receive from a unified data management (UDM), a second message comprising a first list of restricted services for the always-on PDU session of the wireless device. In an example, the SMF may grant the request for the always-on PDU session based on the first list of restricted services. In an example, the SMF may determine a second list of restricted services from the first list of restricted services for the always-on PDU session. In an example, the SMF may send to the wireless device via the AMF, a third message indicating: the second at least one restricted service; and the request for the always-on PDU session is granted.

In an example, the SMF may send to the UDM, a subscription request message requesting subscription information of the wireless device, the subscription request message may comprise an identity of the wireless device. In an example, the UDM may determine, the first list of restricted services based on user subscription information. In an example, the wireless device may send to a base station the at least one restricted service on the always-on PDU Session. In an example, wherein the first list of restricted services may comprise at least one of: an information element indicating a service type; an information element indicating an application identifier; or an information element indicating the restricted service is allowed or not. In an example, the service type may comprise an information element indicating ultra-reliable low-latency communications (URLLC). In an example, the service type may comprise an information element indicating Vehicle-to-X communications (V2X). In an example, the service type may comprise an information element indicating Internet of Things (IoT). In an example, the second list of restricted services may comprise at least one of: an information element indicating a service type; an information element indicating an application identifier; or an information element indicating the restricted service is allowed or not. In an example, the service type may comprise an information element indicating ultra-reliable low-latency communications (URLLC). In an example, the service type may comprise an information element indicating Vehicle-to-X communications (V2X). In an example, the service type may comprise an information element indicating Internet of Things (IoT). In an example, the SMF may determine at least one of the user plane rules based on the second list of restricted services. In an example, the SMF may select a user plane function (UPF) based on the second list of restricted services. In an example, the SMF may send to the UPF the at least one of the user plane rules. In an example, the UPF may determine forward or drop the user plane packet on an always-on PDU session based on the at least one of the user plane rules. In an example, the UE may determine forward or drop the user plane packet on an always-on PDU session based on the at least one restricted service based on the second list of restricted services. In an example, the wireless device may send to a base station the at least one restricted service on the always-on PDU Session. In an example, the third message is a restrict service provision message. In an example, the third message is a Namf_Communication_N1N2MessageTransfer with Restrict Services message.

In an example, a session management function (SMF) may receive from a wireless device, a first message requesting establishment of a packet data unit (PDU) session of the wireless device, the first message may comprise a parameter indicating a request for an always-on PDU session. In an example, the SMF may grant the request for the always-on PDU session based on a list of restricted services for the always-on PDU session of the wireless device. In an example, the SMF may determine at least one restricted service from the list of restricted services for the always-on PDU session. In an example, the SMF may send to the wireless device a third message indicating: the at least one restricted service; and the request for the always-on PDU session is granted.

In an example, a wireless device may send to an access and mobility management function (AMF), a PDU session establishment request message requesting establishment of a packet data unit (PDU) session of the wireless device, the first message may comprise a parameter indicating a request for an always-on PDU session. In an example, the wireless device may receive from the AMF via a base station, a first message indicating: at least one restricted service; and the request for the always-on PDU session is granted. In an example, the wireless device may determine at least one allowed service from the at least one restricted service for the always on PDU session. In an example, the wireless device may send to the base station, at least one packet of the at least one allowed service on the always-on PDU session.

In an example, a user plane function (UPF) may receive from a session management function (SMF), a first message comprising at least one user plane rule for an always-on PDU session for a wireless device. In an example, the UPF may receive from the wireless device via a base station, a user plane data packet on the always-on PDU session. In an example, the UPF may determine based on the at least one user plane rule, forwarding the user plane data packet. In an example, the UPF may send to a data network (DN), the user plane data packet.

In an example, the at least one user plane rule may indicate at least one restricted service. In an example, the UPF determining is based on whether the user plane data packet is associated with the at least one restricted service. In an example, the UPF may drop a second user plane data packet based on the user plane rule.

In an example, a unified data management (UDM) may receive from a session management function (SMF), a first message comprising: an always-on packet date unit (PDU) session requested indication; and an identity of a wireless device. In an example, based on the first message and subscription information of the wireless device, the UDM may determine a list of restricted services for an always-on PDU session of the wireless device. In an example, the UDM may send to the SMF, a second message comprising the list of restricted services.

In an example, a policy control function (PCF) may receive from a session management function (SMF), a first message comprising a parameter indicating a request for an always-on packet data unit (PDU) session for at least one PDU session of a wireless device. In an example, the PCF may transmit to a user data convergence (UDR), a subscription retrieval request for the wireless device. In an example, the PCF may receive from the UDR, a second message comprising a list of restricted services for an always-on PDU session for the wireless device. In an example, the PCF may grant the request for the always-on PDU session based on the list of restricted services for the always-on PDU session of the wireless device. In an example, the PCF may determine at least one restricted service from the list of restricted services for the always-on PDU session. In an example, the PCF may send to the SMF, a third message comprising the at least one restricted service and a parameter indicating the request for the always-on PDU session is granted. In an example, the SMF may send to the wireless device, a fourth message indicating: the at least one restricted service; and the request for the always-on PDU session is granted.

In an example, a user data convergence (UDR) may receive from a policy control function (PCF), a first message comprising: an Always-on PDU Session Requested indication; and an identity of a wireless device. In an example, based on first message and the user subscription information, the UDR may determine a list of restricted services for an always-on PDU session of the wireless device. In an example, the UDR may send to the PCF, a second message comprising the list of restricted services.

In an example, a policy control function (PCF) may receive from an access and mobility management function (AMF), a first message requesting a UE policy, the first message comprising an identity of a wireless device. In an example, the PCF may transmit to a user data convergence (UDR), a subscription retrieval request for the wireless device. In an example, the PCF may receive from the UDR, a second message comprising a list of restricted services for an always-on PDU session for the wireless device. In an example, the PCF may determine based on the list of restricted services, at least one restricted service for the always-on PDU session for the wireless device; In an example, the PCF may send to the AMF, a third message comprising a UE route selection policy (URSP), wherein the URSP comprising the at least one restricted service. In an example, the AMF may send to the wireless device through a base station, a fourth message comprising the URSP and the at least one restricted service. In an example, the wireless device may send to the base station the at least one restricted service on the always-on PDU Session. In an example, the at least one restricted service comprising an information element may indicate ultra-reliable low-latency communications (URLLC).

For an always-on PDU session, the user plane resources may be activated during transition from an CM-IDLE mode to a CM-CONNECTED state regardless of whether the UE transmits data packets or not. This may use additional network resources for an always-on PDU session. In existing technologies, there may not be a specific policy and/or charging control for an always-on PDU session. This may result in inefficiently using the network resources. This may also result in inefficient charging for the always-on PDU session. To have policy and charging control on an always-on PDU session may help an operator save network resources and have an effective charging on the used network resource. Embodiments of the present disclosure provide enhanced mechanisms to implement policy control for an always-on PDU session. Embodiments of the present disclosure provide enhanced mechanisms to implement charging control for an always-on PDU session. These enhanced mechanisms may improve network resource usage for an always-on PDU session.

Figure 22:
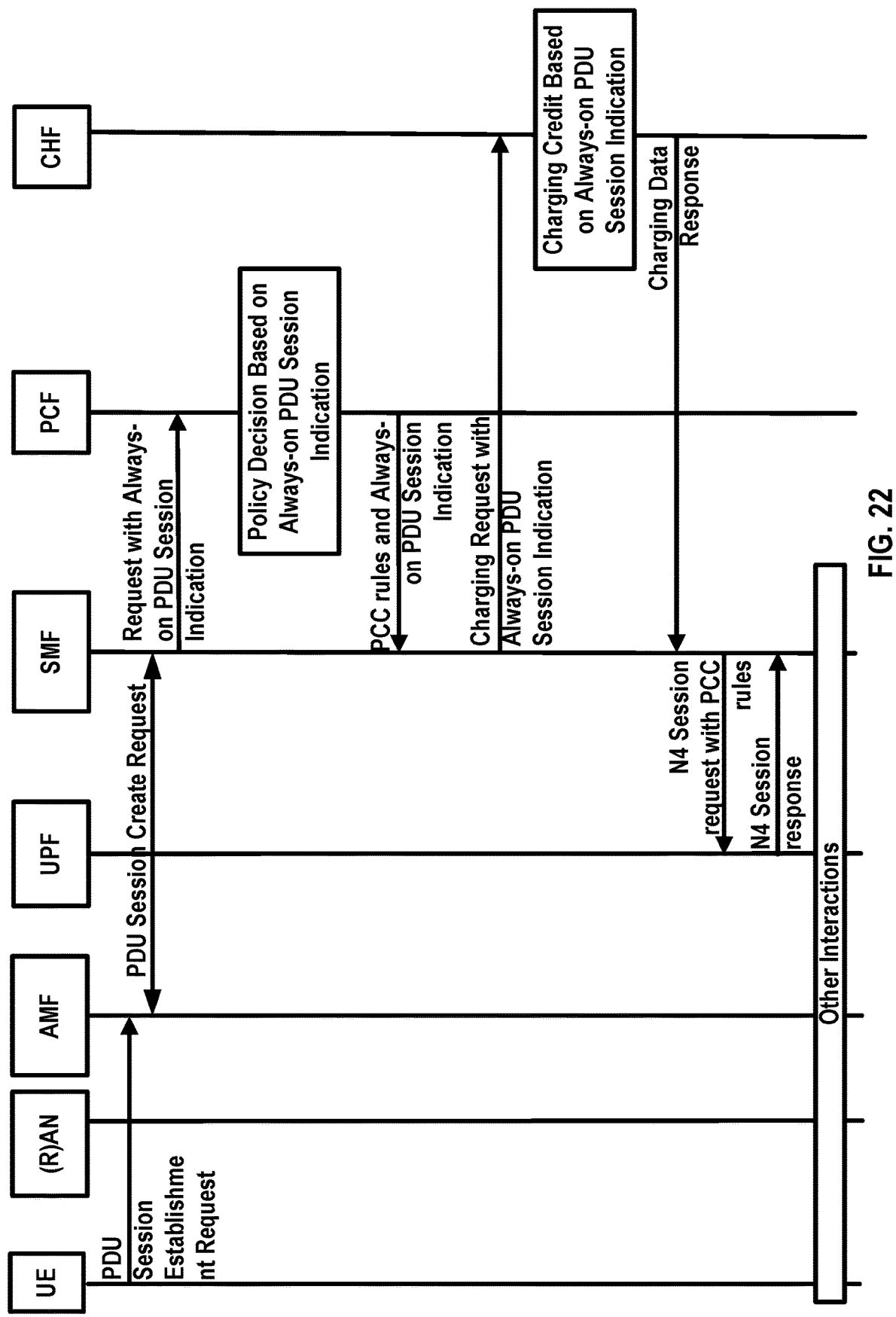
FIG. 22 is an example call flow as per an aspect of an embodiment of the present disclosure.

In an example, a UE may initiate a PDU session establishment procedure. As part of the PDU session establishment procedure, a SMF may send a first always-on PDU session indication to a PCF. The PCF may make a policy and charging decision based on the first always-on PDU session indication. FIG. 22 shows an example call flow which may comprise one or more of these actions.

A UE may send to an AMF, a NAS message. The NAS message may comprise an S-NSSAI(s). The NAS message may comprise a DNN. The NAS message may comprise a PDU Session ID. The NAS message may comprise a Request type. The NAS message may comprise an N1 SM container (PDU session establishment request). The UE may initiate a UE requested PDU session establishment procedure by transmitting a PDU session establishment request message within the N1 SM container of the NAS message. The PDU session establishment request message may comprise at least one of: a PDU session ID, Requested PDU Session Type, or a Requested SSC mode, etc. In an example, the UE may request to establish an always-on PDU session for the PDU session ID by including a first always-on PDU session indication (e.g. always-on PDU session requested indication) in the PDU session establishment request message. In an example, the UE may transmit the NAS message via a RAN node (e.g. gNB, eNB, base station). The UE may transmit, to the RAN node, a radio resource control (RRC) message (e.g. uplink (UL) information transfer message, RRC setup complete message, RRC resume complete message, RRC reconfiguration complete message, and/or the like) comprising the NAS message. The RAN node may transmit, to the AMF, a N2 message (e.g. NG message, initial UE message, uplink NAS transport message, reroute NAS request message, handover request message, initial context setup request message, PDU session resource setup/modify response message, PDU session resource modify required message, and/or the like) comprising the NAS message.

In response to the NAS message received from the UE, the AMF may select an SMF and send to the selected SMF a message (e.g. PDUSession_CreateSMContext Request) comprising at least one of: SUPI, DNN, S-NSSAI(s) and/or network slice instance identifier(s), PDU Session ID, AMF ID, Request Type, PCF identifier, Priority Access, N1 SM container (PDU Session Establishment Request), User location information, Access Type, PEI). The message sent to the SMF may be used by the AMF to request establishing the PDU session. In response to receiving the message from the AMF, the SMF may send a response message (e.g. Namf_P-DUSession_CreateSMContext Response) to the AMF to indicate whether the request from the AMF and/or the UE is accepted or not.

In an example, the PCF identifier may be an IP address or FQDN that identifies the PCF. In an example, the message sent to the SMF by the AMF may comprise the first always-on PDU session indication (e.g. always-on PDU session requested indication) requesting establishment of the always-on PDU session.

In response to the message received from the AMF, the SMF may send to the AMF a response message (e.g. PDUSession_CreateSMContext Response) comprising at least one of: Cause, SM Context ID or N1 SM container (PDU Session Reject (Cause)).

If dynamic PCC is deployed and a PCF ID is provided by the AMF, the SMF may perform a PCF selection procedure by selecting a PCF based on the PCF ID.

The SMF may perform an SM Policy Association Establishment procedure to establish a PDU Session with the selected PCF and get default PCC Rules for the PDU Session. The PDU session may be identified by the PDU Session ID. The message sent to the PCF by the SMF may comprise at least one UE identity (e.g. SUPI, PEI, and/or GPSI) and/or at least one UE IP address (e.g. UE IPv4 address and/or UE IPv6 network prefix) for the UE. The message sent to the PCF by the SMF may comprise at least one of the following information elements for the PDU session and/or the UE: Default 5QI and default ARP, Type of the PDU Session (e.g. IPv4, IPv6, IPv4v6, Ethernet, Unstructured); Access Type (e.g. 3GPP access); RAT Type (e.g. 3GPP-NR-FDD); a PLMN identifier; an application identifier; an allocated application instance identifier; DNN, S-NSSAI(s) and/or network slice instance identifier(s), PDU Session ID, user location information, or information of the SMF for the PDU session (e.g. SMF identifier, IP address or FQDN of the SMF). In an example, the message sent to the PCF may comprise the first always-on PDU session indication (e.g. always-on PDU session requested indication). In an example, the first always-on PDU session indication (e.g. always-on PDU session requested indication) may be used by the SMF to ask for granting a requested PDU session to be an always-on PDU session, and the requested PDU session may be identified by the PDU Session ID. In an example, the first always-on PDU session indication (e.g. always-on PDU session requested indication) may be used by the SMF to ask for PCC rule(s) for the always-on PDU session.

In response to the message received from the SMF, the PCF may take one or more actions. For example, the PCF may determine/grant the requested PDU session to be an always-on PDU session based on the information received from the SMF and/or the local operator policies. In an example, if subscription information of the UE (e.g. based on the UE identity) indicates the UE is allowed to employ an always-on PDU session, the PCF may determine the requested PDU session to be an always-on PDU session.

In an example, the PCF may determine/grant the requested PDU session to be an always-on PDU session based on one or more the following: the first always-on PDU session indication (e.g. always-on PDU session requested indication), the at least one UE identity (e.g. SUPI, PEI, and/or GPSI), the at least one UE IP address (e.g. UE IPv4 address and/or UE IPv6 network prefix), the Default 5QI and default ARP, the Type of PDU Session (e.g. IPv4, IPv6, IPv4v6, Ethernet, Unstructured); the Access Type (e.g. 3GPP access); the RAT Type (e.g. 3GPP-NR-FDD); the PLMN identifier; the application identifier; the allocated application instance identifier; the DNN, the S-NSSAI(s) and/or network slice instance identifier(s), the PDU Session ID, user location information, information of the SMF for the PDU session (e.g. SMF identifier, IP address or FQDN of the SMF), and/or time duration information. In an example, the PCF may determine/grant the requested PDU session to be an always-on PDU session based on network slice information (e.g. the S-NSSAI(s) and/or network slice instance identifier(s)). In an example, if a network slice indicated by the S-NSSI(s) associated with the PDU session is allowed to be configured as an always-on PDU session, the PCF may determine the requested PDU session to be an always-on PDU session. In an example, a network slice with a URLLC Slice/Service type may require low latency for a service. The PCF may determine/grant a PDU session to be an always-on PDU session where the PDU session corresponds to a network slice with a URLLC Slice/Service type. In an example, based on the access type, the PCF may determine/grant a PDU session with non-3GPP access to be an always-on PDU session. In an example, the PCF may determine/grant a PDU session to be an always-on PDU session for a specific duration of time, e.g. the PCF may determine/grant a PDU session with 3GPP access to be an always-on PDU session between the times of 12 AM and 7 AM, which may avoid service rush hour congestion problems and more fully utilize network resources.

In an example, the PCF determines/grants the requested PDU session to be an always-on PDU session, where the always-on PDU session may be identified by the PDU Session ID. and determines a second always-on PDU session indication (e.g. always-on PDU session granted indication) indicating that the PDU session identified by the PDU session ID is to be an always-on PDU session. In another example, the PCF does not grant the requested PDU session (e.g. a first PDU session) to be an always-on PDU session, and determines/grants a second PDU session to be an always-on PDU session, where the first PDU session may be identified by the first PDU Session ID, and the second PDU session may be identified by the second PDU Session ID.

In an example action, the PCF may make a policy decision based on the information received from the SMF (e.g. always-on PDU session requested indication) and may determine/generate/create/derive one or more PCC rules comprising one or more charging control rules. The one or more PCC rules and/or the one or more charging control rules may be applied to the always-on PDU session identified by a PDU session identifier. The one or more PCC rules and/or the one or more charging control rules may be applied to at least one service data flow identified by at least one service data flow filter. The one or more PCC rules and/or the one or more charging control rules may be applied to at least one application identified by an application identifier. The one or more PCC rules and/or the one or more charging control rules may be applied to a wireless device identified by a UE identity. The one or more PCC rules and/or the one or more charging control rules may apply to a data network identified by a DNN. The one or more PCC rules and/or the one or more charging control rules may be applied to a network slice identified by an S-NSSAI and/or a network slice instance identifier.

The PCC rules determined by the PCF may comprise at least one of: at least one charging control rule; at least one policy control rule comprising at least one QoS control rule and/or at least one gating control rule; at least one usage monitoring control rule; at least one application detection and control rule; at least one traffic steering control rule; or at least one service data flow detection information (e.g. service data flow template). In an example, the charging control rule may be used for charging control and may comprise at least one of: an information element indicating a charging method/charging type, wherein the charging method/charging type may comprise at least one of: online charging, offline charging, or converged charging; an information element indicating at least one charging rate; or an information element indicating at least one identifier or address of a CHF.

In an example, the policy control rule may be used for policy control, where the at least one QoS control rule may be used for QoS control and the at least one gating control rule may be used for gating control. In an example, the QoS control rule may be used to authorize QoS on a service data flow. In an example, the gating control rule may be used to discard packets that don't match service data flow of the gating control rule and/or associated PCC rules. In an example, the usage monitoring control rule may be used to monitor, both volume and time usage, and report the accumulated usage of network resources. In an example, the application detection and control rule may comprise a request to detect a specified application traffic, report to a PCF on a start or stop of application traffic and to apply a specified enforcement and charging actions. In an example, the traffic steering control rule may be used to activate/deactivate traffic steering policies for steering a subscriber's traffic to appropriate operator or 3rd party service functions (e.g. NAT, antimalware, parental control, DDoS protection) in an (S)Gi-LAN. In an example, the service data flow detection information (e.g. service data flow template) may comprise a list of service data flow filters or an application identifier that references the corresponding application detection filter for the detection of the service data flow. In an example, the service data flow detection information (e.g. service data flow template) may comprise combination of traffic patterns of the Ethernet PDU traffic.

In an example, the PCF may determine/generate/create/derive the one or more PCC rules applied to an always-on PDU session based on one or more the following: the requesting for an always-on PDU session and/or the first always-on PDU session indication (e.g. always-on PDU session requested indication), the granting for an always-on PDU session and/or the second always-on PDU session indication (e.g. always-on PDU session granted indication), the at least one UE identity (e.g. SUPI, PEI, and/or GPSI), the at least one UE IP address (e.g. UE IPv4 address and/or UE IPv6 network prefix), the Default 5QI and default ARP, the Type of PDU Session (e.g. IPv4, IPv6, IPv4v6, Ethernet, Unstructured); the Access Type (e.g. 3GPP access); the RAT Type (e.g. 3GPP-NR-FDD); the PLMN identifier; the application identifier; the allocated application instance identifier; the DNN, the S-NSSAI(s) and/or network slice instance identifier(s), the PDU Session ID, user location information, or information of the SMF for the PDU session (e.g. SMF identifier, IP address or FQDN of the SMF), and/or time duration information. In an example, based on the first always-on PDU session indication (e.g. always-on PDU session requested indication), and/or the second always-on PDU session indication (e.g. always-on PDU session granted indication), and/or the Default 5QI and default ARP, the PCF may determine a QoS rule for an always-on PDU session, and the QoS rule may comprise a QoS class identifier (e.g. QCI, 5QI) and/or a ARP, and/or at least one bandwidth value which may be applied to an always-on PDU session with low latency service, e.g. the PCF may determine a value of 80 for 5QI applied to an always-on PDU session with low latency service. In an example, the PCF may determine a value of 1 for ARP applied to an always-on PDU session with low latency service. In an example, to limit the bandwidth resource of an always-on PDU session, the PCF may determine a value of 1 Mbit for maximum flow bit rate (MFBR) applied to a QoS flow and/or a service flow on an always-on PDU session with low latency service. In an example, based on the first always-on PDU session indication (e.g. always-on PDU session requested indication), and/or the second always-on PDU session indication (e.g. always-on PDU session granted indication), and/or the S-NSSAI(s) and/or network slice instance identifier(s), the PCF may determine a charging control rule comprising a higher charging rate (e.g. rating group) considering the always-on PDU session may take lots of network resource. In an example, the charging control rule determined by the PCF may comprise a charging method (e.g. online charging, offline charging, or a converged charging) applied to an always-on PDU session. In an example, the charging control rule determined by the PCF may comprise an address of a CHF applied to an always-on PDU session. In an example, based on the first always-on PDU session indication (e.g. always-on PDU session requested indication), and/or the second always-on PDU session indication (e.g. always-on PDU session granted indication), and/or the application identifier, the PCF may determine a traffic steering control rule for steering a subscriber's traffic identified by the application identifier to an appropriate operator or 3rd party service functions (e.g. NAT, antimalware, parental control, DDoS protection) in an (S)Gi-LAN, where the subscriber's traffic is on an always-on PDU session. In an example, based on the first always-on PDU session indication (e.g. always-on PDU session requested indication), and/or the second always-on PDU session indication (e.g. always-on PDU session granted indication), and/or the user location information, the PCF may determine a usage monitoring control rule, which may be used to monitor, both volume and time usage, and report the accumulated usage of network resources to the PCF.

In an example action, the PCF may send to the SMF a response message (e.g. SM Policy Association Establishment Response) comprising the one or more PCC rules. The one or more PCC rules may comprise one or more charging control rules determined by the PCF. The response message sent to the SMF may comprise at least one of the following information which the one or more PCC rules applied to: the at least one UE identity (e.g. SUPI, PEI, and/or GPSI), the at least one UE IP address (e.g. UE IPv4 address and/or UE IPv6 network prefix), the Default 5QI and default ARP, the Type of PDU Session (e.g. IPv4, IPv6, IPv4v6, Ethernet, Unstructured); the Access Type (e.g. 3GPP access); the RAT Type (e.g. 3GPP-NR-FDD); the PLMN identifier; the application identifier; the DNN, the S-NSSAI(s) and/or network slice instance identifier(s), or the PDU Session ID. The response message sent to the SMF may comprise the second always-on PDU session indication (e.g. always-on PDU session granted indication) and the PDU Session ID indicating that the PDU session identified by the PDU session ID is to be an always-on PDU session.

In response to receiving the message from the PCF, based on the charging control rules and other information elements, the SMF may select a CHF, and may construct a message (e.g. charging data request [initial]). The SMF may send the constructed message to the CHF to establish a charging session. The identifier and/or address of the CHF in the charging control rule may be used by the SMF to establish a charging session. The message sent to the CHF may comprise the first always-on PDU session indication (e.g. always-on PDU session requested indication), and/or the second always-on PDU session indication (e.g. always-on PDU session granted indication), and/or the associated PDU Session ID. The message sent to the CHF may comprise an information element indicating a requested charging method/charging type. The charging method/charging type may comprise at least one of: online charging, offline charging, or converged charging. The message sent to the CHF may comprise an information element indicating a requested charging rate, where the requested charging rate may be determined by the SMF, or the requested charging rate may be the charging rate received from the PCF in the charging control rule. The message sent to the CHF may comprise one or more of the following information: the at least one UE identity (e.g. SUPI, PEI, and/or GPSI), the at least one UE IP address (e.g. UE IPv4 address and/or UE IPv6 network prefix), the Default 5QI and default ARP, the Type of PDU Session (e.g. IPv4, IPv6, IPv4v6, Ethernet, Unstructured), the Access Type (e.g. 3GPP access), the RAT Type (e.g. 3GPP-NR-FDD), the PLMN identifier, the application identifier, the allocated application instance identifier, the DNN, the S-NSSAI(s) and/or network slice instance identifier(s), the PDU Session ID, user location information, or information of the SMF for the PDU session (e.g. SMF identifier, IP address or FQDN of the SMF), and/or time duration information.

In response to receiving the message from the SMF, the CHF may take one or more actions. In an example action, the CHF may determine quota information/charging credit for the always-on PDU session based on one or more of the following information: the first always-on PDU session indication (e.g. always-on PDU session requested indication), the second always-on PDU session indication (e.g. always-on PDU session granted indication), the PDU Session ID, the requested charging method/charging type, the requested charging rate, the at least one UE identity (e.g. SUPI, PEI, and/or GPSI), the at least one UE IP address (e.g. UE IPv4 address and/or UE IPv6 network prefix), the Default 5QI and default ARP, the Type of PDU Session (e.g. IPv4, IPv6, IPv4v6, Ethernet, Unstructured), the Access Type (e.g. 3GPP access), the RAT Type (e.g. 3GPP-NR-FDD), the PLMN identifier, the application identifier, the allocated application instance identifier, the DNN, the S-NSSAI(s) and/or network slice instance identifier(s), the user location information, or information of the SMF for the PDU session (e.g. SMF identifier, IP address or FQDN of the SMF), and/or the time duration information. In an example, based on the first always-on PDU session indication (e.g. always-on PDU session requested indication), and/or the second always-on PDU session indication (e.g. always-on PDU session granted indication), and/or the Type of PDU Session, and/or the Access Type, the CHF may determine quota information/charging credit for the always-on PDU session. To limit the resource of the always-on PDU session, the CHF may determine a smaller granted unit, and/or a smaller time quota threshold and/or a smaller volume quota threshold. In an example, based on the first always-on PDU session indication (e.g. always-on PDU session requested indication), and/or the second always-on PDU session indication (e.g. always-on PDU session granted indication), and/or the S-NSSAI(s) and/or network slice instance identifier(s), and/or the PDU session ID, the CHF may determine a higher charging rate considering the always-on PDU session may take lots of network resource. In an example, based on the first always-on PDU session indication (e.g. always-on PDU session requested indication), and/or the second always-on PDU session indication (e.g. always-on PDU session granted indication), and/or the user location, and/or the time duration information, the CHF may determine quota information/charging credit (e.g. granted unit, final granted unit) for the always-on PDU session for specific time duration and/or specific location for a wireless device. In an example, based on the first always-on PDU session indication (e.g. always-on PDU session requested indication), and/or the second always-on PDU session indication (e.g. always-on PDU session granted indication), and/or the Access Type (e.g. Wi-Fi access), the CHF may determine a lower charging rate for the always-on PDU session for a wireless device.

In an example action, the CHF may send to the SMF a response message (e.g. charging data response). The response message sent to the SMF may comprise at least one of the following determined by the CHF for the always-on PDU session: an information element indicating a charging method/charging type (e.g. online charging, offline charging, or converged charging); an information element indicating at least one charging rate (e.g. rating group); an information element indicating at least one granted unit (e.g. granted volume and/or granted time for online charging or converged charging); or an information element indicating final unit action (e.g. redirect the traffic to a web portal when the final granted unit has been consumed by the wireless device). The response message sent to the SMF may comprise one or more of the following: the first always-on PDU session indication (e.g. always-on PDU session request indication), the second always-on PDU session indication (e.g. always-on PDU session granted indication), the PDU session ID; the at least one service data flow filter; the application identifier; the at least one user identity (e.g. SUPI, PEI, and/or GPSI); the DNN; the S-NSSAI and/or a network slice instance identifier.

In response to the message received from the CHF, the SMF may take one or more actions. For example, after receiving response message from the CHF, the SMF may enforce the PCC rules and/or charging control rules required by the PCF and/or charging function required by the CHF by determining/generating/creating/deriving at least one of the user plane rules based on the received PCC rules and/or charging control rules from the PCF and/or the information (e.g. charging rate) received from the CHF. The user plane rules may comprise at least one of: at least one packet detection rule; at least one forwarding action rule; at least one QoS enforcement rule; or at least one usage reporting rule. The at least one user plane rule determined by the SMF may be applied to the always-on PDU session.

In an example, the at least one packet detection rule may comprise data/traffic packet detection information, e.g. one or more match fields against which incoming packets are matched and may apply other user plane rules (e.g. forwarding action rule, QoS enforcement rule, and usage reporting rule) to the data/traffic packets matching the packet detection rule. In an example, the at least one forwarding action rule may comprise an apply action parameter, which may indicate whether a UP function may forward, duplicate, drop or buffer the data/traffic packet respectively. In an example, the at least one usage reporting rule may be used to measure the network resources usage in terms of traffic data volume, duration (e.g. time) and/or events, according to a measurement method in the usage reporting rule. In an example, the QoS enforcement rule contains instructions to request the UP function to perform QoS enforcement of the user plane traffic.

In an example, the SMF may determine a packet detection rule based on the service data flow detection information (e.g. service data flow template) received from the PCF. In an example, the SMF may determine a forwarding action rule based on the policy control rule and/or usage monitoring control rule received from the PCF and/or the final unit action received from the CHF. In an example, the SMF may determine a QoS enforcement rule based on the policy control rule (e.g. QoS control rule) received from the PCF. In an example, the SMF may determine a usage reporting rule based on the usage monitoring control rule received from the PCF and/or the at least one granted unit (e.g. granted volume and/or granted time for online charging or converged charging) received from the CHF.

In an example action, the SMF may select a UPF based on the information received from the PCF (e.g. via the SM Policy Association Establishment Response message), and/or the information received from the CHF (e.g. via the charging data response message), and/or the information received from the AMF (e.g. via the Nsmf_PDUSession_UpdateSMContext Request message). In an example, the SMF may select a UPF for an always-on PDU session, the selection of the UPF may be based on the first always-on PDU session indication (e.g. always-on PDU session request indication), and/or the second always-on PDU session indication (e.g. always-on PDU session granted indication), and/or the PDU session ID. In an example, considering the always-on PDU session may take lots of network resource, the SMF may select a UPF which may have the capability supporting an always-on PDU session.

In an example action, the SMF may send to the UPF a message (e.g. N4 session establishment/modification request) comprising the at least one of the following user plane rules for the always-on PDU session: at least one packet detection rule; at least one forwarding action rule; at least one QoS enforcement rule; or at least one usage reporting rule.

In response to receiving the message from the SMF, the UPF may install the user plane rules received from the SMF, send to the SMF a response message (e.g. N4 session establishment/modification response), and enforce the user plane rules for the always-on PDU session.

In an example, the UPF may enforce the at least one packet detection rule by matching a user data/traffic packet with service data flow template (e.g. service data flow filters and/or application identifiers) and may apply other user plane rules (e.g. forwarding action rule, QoS enforcement rule, and usage reporting rule) to the data/traffic packets matched the packet detection rule. In an example, the UPF may enforce the at least one forwarding action rule by forwarding, duplicating, dropping or buffering a data/traffic packet respectively. In an example, the UPF may redirect the traffic to a web portal of the operator. In an example, the UPF may enforce the at least one usage reporting rule by measuring network resources usage in terms of traffic data volume, duration (i.e. time) and/or events, according to a measurement method in the usage reporting rule; the UPF may report the network resources usage to the SMF when the quota/threshold reached, and/or event and/or another trigger is (are) met. In an example, the UPF may enforce the at least one QoS enforcement rule by applying at least one of QoS parameters: 5QI, ARP, MBR, GBR to a service data flow; In an example, the UPF may enforce the at least one QoS enforcement rule by applying at least one of QoS parameters: Session AMBR and default 5QI/ARP combination to a PDU session. In an example, the usage report information may comprise network resources usage in terms of traffic data volume, duration (i.e. time) applied to the always-on PDU session.

In an example, other interactions may be performed between SMF, AMF, (R)AN and UE for the PDU session establishment procedure.

Figure 23:
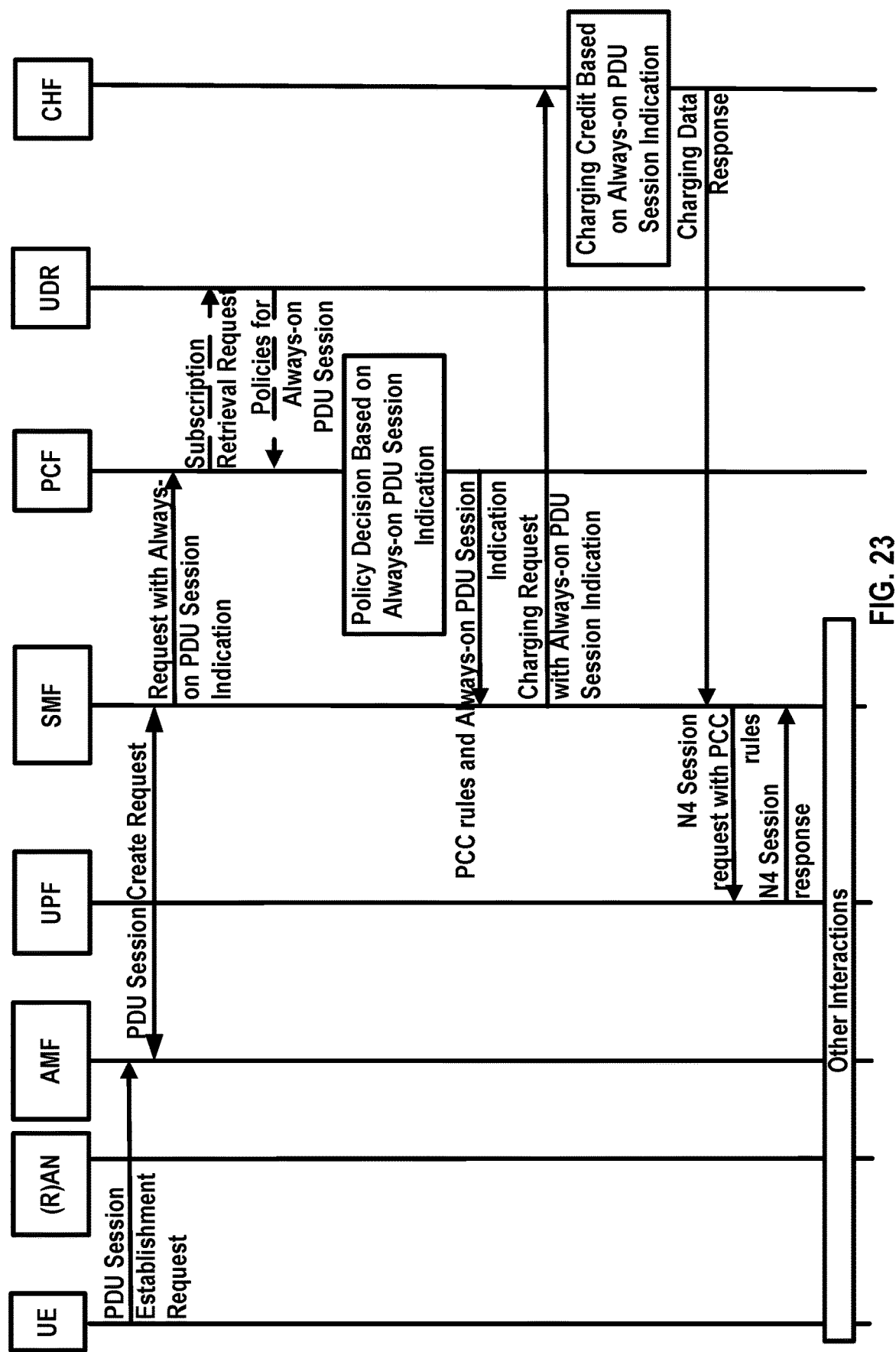
FIG. 23 is an example call flow as per an aspect of an embodiment of the present disclosure.

In an example, a UE may initiate a PDU session establishment procedure, a SMF may send a first always-on PDU session indication to a PCF, the PCF may query subscription information from a UDR, and the PCF may make policy and charging decision based on the information received from the UDR. FIG. 23 shows an example call flow which may comprise one or more actions.

A UE may send to an AMF a NAS message comprising at least one of: S-NSSAI(s), DNN, PDU Session ID, Request type, or N1 SM container (PDU session establishment request). The UE may initiate a UE requested PDU session establishment procedure by transmitting a PDU session establishment request message within the N1 SM container of the NAS message. The PDU session establishment request message may comprise at least one of: a PDU session ID, Requested PDU Session Type, or a Requested SSC mode, etc. In an example, the UE may request to establish an always-on PDU session for the PDU session ID by including a first always-on PDU session indication (e.g. always-on PDU session requested indication) in the PDU session establishment request message. In an example, the UE may transmit the NAS message via a RAN node (e.g. gNB, eNB, base station). The UE may transmit, to the RAN node, a radio resource control (RRC) message (e.g. uplink (UL) information transfer message, RRC setup complete message, RRC resume complete message, RRC reconfiguration complete message, and/or the like) comprising the NAS message. The RAN node may transmit, to the AMF, a N2 message (e.g. NG message, initial UE message, uplink NAS transport message, reroute NAS request message, handover request message, initial context setup request message, PDU session resource setup/modify response message, PDU session resource modify required message, and/or the like) comprising the NAS message.

In response to the NAS message received from the UE, the AMF may select an SMF and send to the selected SMF a message (e.g. PDUSession_CreateSMContext Request) comprising at least one of: SUPI, DNN, S-NSSAI(s) and/or network slice instance identifier(s), PDU Session ID, AMF ID, Request Type, PCF identifier, Priority Access, N1 SM container (PDU Session Establishment Request), User location information, Access Type, PEI). The message sent to the SMF may be used by the AMF to request establishing the PDU session. In response to receiving the message from the AMF, the SMF may send a response message (e.g. Namf_PDUSession_CreateSMContext Response) to the AMF to indicate whether the request from the AMF and/or the UE is accepted or not.

In an example, the PCF identifier may be an IP address or FQDN that identifies the PCF. In an example, the message sent to the SMF by the AMF may comprise the first always-on PDU session indication (e.g. always-on PDU session requested indication) requesting establishment of the always-on PDU session.

In response to the message received from the AMF, the SMF may send to the AMF a response message (e.g. PDUSession_CreateSMContext Response) comprising at least one of: Cause, SM Context ID or N1 SM container (PDU Session Reject (Cause)).

If dynamic PCC is deployed and a PCF ID is provided by the AMF, the SMF may perform a PCF selection procedure by selecting a PCF based on the PCF ID.

The SMF may perform an SM Policy Association Establishment procedure to establish a PDU Session with the selected PCF and get default PCC Rules for the PDU Session. The PDU session may be identified by the PDU Session ID. The message sent to the PCF by the SMF may comprise at least one UE identity (e.g. SUPI, PEI, and/or GPSI) and/or at least one UE IP address (e.g. UE IPv4 address and/or UE IPv6 network prefix) for the UE. The message sent to the PCF by the SMF may comprise at least one of the following information elements for the PDU session and/or the UE: Default 5QI and default ARP, Type of the PDU Session (e.g. IPv4, IPv6, IPv4v6, Ethernet, Unstructured); Access Type (e.g. 3GPP access); RAT Type (e.g. 3GPP-NR-FDD); a PLMN identifier; an application identifier; an allocated application instance identifier; DNN, S-NSSAI(s) and/or network slice instance identifier(s), PDU Session ID, user location information, or information of the SMF for the PDU session (e.g. SMF identifier, IP address or FQDN of the SMF). In an example, the message sent to the PCF may comprise the first always-on PDU session indication (e.g. always-on PDU session requested indication). In an example, the first always-on PDU session indication (e.g. always-on PDU session requested indication) may be used by the SMF to ask for granting a requested PDU session to be an always-on PDU session, and the requested PDU session may be identified by the PDU Session ID. In an example, the first always-on PDU session indication (e.g. always-on PDU session requested indication) may be used by the SMF to ask for PCC rule(s) for the always-on PDU session.

In response to the message received from the SMF, the PCF may send to a UDR a message (e.g. subscription retrieval request) requesting user subscription information. The message sent to the UDR may comprise at least one of: at least one UE identity (e.g. SUPI, PEI, and/or GPSI), at least one UE IP address (e.g. UE IPv4 address and/or UE IPv6 network prefix), Default 5QI and default ARP, Type of PDU Session (e.g. IPv4, IPv6, IPv4v6, Ethernet, Unstructured); Access Type (e.g. 3GPP access); RAT Type (e.g. 3GPP-NR-FDD); a PLMN identifier; an application identifier; an allocated application instance identifier; DNN, S-NSSAI(s) and/or network slice instance identifier(s), PDU Session ID, user location information, or information of the SMF for the PDU session (e.g. SMF identifier, IP address or FQDN of the SMF). In an example, the message sent to the UDR may comprise the first always-on PDU session indication (e.g. always-on PDU session requested indication).

In response to the message received from the PCF, the UDR may take one or more actions. In an example action, the UDR may determine/grant whether the requested PDU session to be an always-on PDU session based on the user subscription information and/or the information received from the PCF and/or the local operator policies. In an example, an always-on PDU session is allowed for a wireless device based on user subscription information, the UDR may determine/grant the requested PDU session to be an always-on PDU session based on the user subscription information. In an example, the user subscription information may comprise an indication that an always-on PDU session is allowed for a Type of PDU Session (e.g. IPv4, IPv6, IPv4v6, Ethernet, Unstructured) for a wireless device, the UDR may determine/grant the requested PDU session to be an always-on PDU session based on the user subscription information and the Type of PDU Session received from the PCF. In an example, the user subscription information may comprise an indication that an always-on PDU session is allowed for an Access Type and/or a RAT Type for a wireless device, the UDR may determine/grant the requested PDU session to be an always-on PDU session based on the user subscription information and the Access Type and/or the RAT Type received from the PCF. In an example, the user subscription information may comprise an indication that an always-on PDU session is allowed for a network slice with a URLLC Slice/Service type for a wireless device, the UDR may determine/grant the requested PDU session to be an always-on PDU session based on the user subscription information and the S-NSSAI(s) and/or network slice instance identifier(s) received from the PCF.

In an example action, based on the user subscription information and/or the information received from the PCF and/or the local operator policies, the UDR may determine a subscription always-on PDU session indication indicating that the PDU session identified by the PDU session ID is to be an always-on PDU session.

In an example action, based on the user subscription information and/or the information received from the PCF and/or the local operator policies, the UDR may determine subscription policies for the always-on PDU session. The subscription policies for the always-on PDU session may comprise QoS policies (e.g. 5QI, ARP), and/or charging policies (e.g. charging rate).

Figure 24:
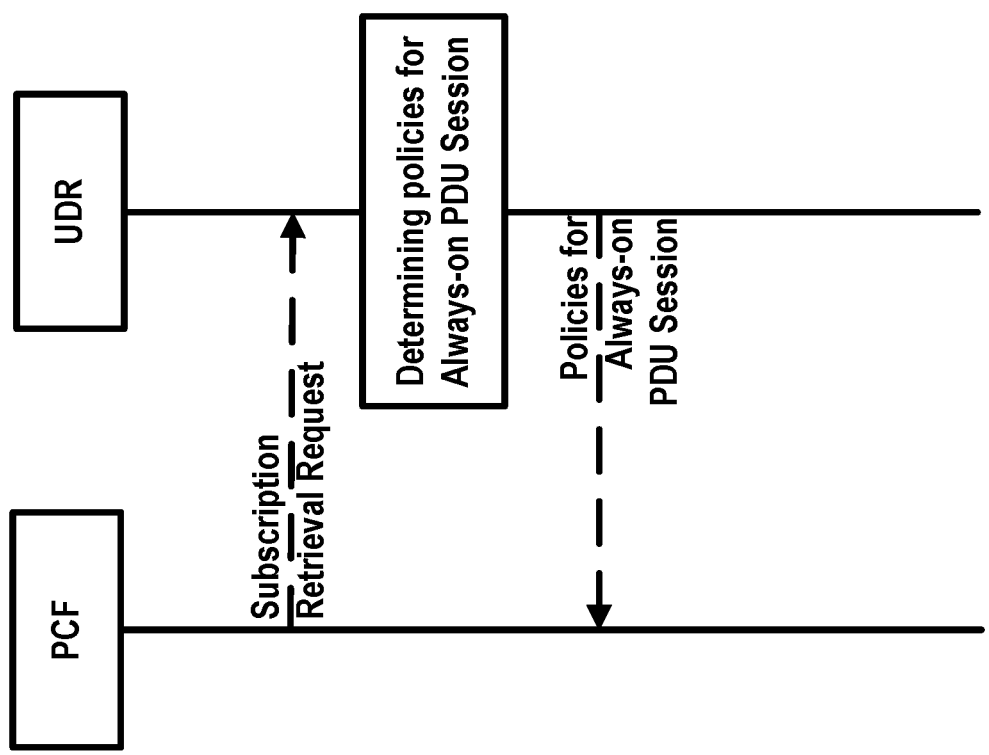
FIG. 24 is an example call flow as per an aspect of an embodiment of the present disclosure.

In an example action, the UDR may send to the PCF a response message (e.g. subscription retrieval response) comprising the subscription always-on PDU session indication and/or the subscription policies for the always-on PDU session. FIG. 24 is an example call flow associated with the UDR as per an aspect of an embodiment of the present disclosure.

In response to the message received from the UDR, the PCF may take one or more actions. In an example action, the PCF may determine/grant whether the requested PDU session to be an always-on PDU session based on the information received from the UDR, and/or the information received from the SMF, and/or the local operator policies. In an example, the PCF may determine/grant the requested PDU session to be an always-on PDU session based on one or more the following information: the subscription always-on PDU session indication, the first always-on PDU session indication (e.g. always-on PDU session requested indication), the at least one UE identity (e.g. SUPI, PEI, and/or GPSI), the at least one UE IP address (e.g. UE IPv4 address and/or UE IPv6 network prefix), the Default 5QI and default ARP, the Type of PDU Session (e.g. IPv4, IPv6, IPv4v6, Ethernet, Unstructured); the Access Type (e.g. 3GPP access); the RAT Type (e.g. 3GPP-NR-FDD); the PLMN identifier; the application identifier; the allocated application instance identifier; the DNN, the S-NSSAI(s) and/or network slice instance identifier(s), the PDU Session ID, user location information, information of the SMF for the PDU session (e.g. SMF identifier, IP address or FQDN of the SMF), and/or time duration information. In an example, the PCF may determine/grant the requested PDU session to be an always-on PDU session based on the first always-on PDU session indication (e.g. always-on PDU session requested indication) received from the SMF and/or the subscription always-on PDU session indication received from the UDR, e.g. the PCF grants the requested PDU session to be an always-on PDU session based on the subscription always-on PDU session indication, wherein the subscription always-on PDU session indication is supporting always-on PDU session.

In an example, the PCF may determine/grant the requested PDU session to be an always-on PDU session based on network slice information (e.g. the S-NSSAI(s) and/or network slice instance identifier(s)). In an example, a network slice with a URLLC Slice/Service type may require low latency for a service, the PCF may determine/grant a PDU session to be an always-on PDU session where the PDU session is corresponding to a network slice with a URLLC Slice/Service type. In an example, based on the access type, the PCF may determine/grant a PDU session with non-3GPP access to be an always-on PDU session. In an example, the PCF may determine/grant a PDU session to be an always-on PDU session for a specific duration time, e.g. the PCF may determine/grant a PDU session with 3GPP access to be an always-on PDU session between 12 AM and 7 AM, which may avoid service rush hour congestion problem and fully utilize the network resource.

In an example, the PCF determines/grants the requested PDU session to be an always-on PDU session, the always-on PDU session may be identified by the PDU Session ID, and the PCF may determine a second always-on PDU session indication (e.g. always-on PDU session granted indication) indicating the PDU session identified by the PDU session ID is to be an always-on PDU session. In an example, the PCF does not grant the requested PDU session (e.g. a first PDU session) to be an always-on PDU session, and the PCF may determine/grant a second PDU session to be an always-on PDU session, wherein the first PDU session may be identified by the first PDU Session ID, and the second PDU session may be identified by the second PDU Session ID.

In an example action, the PCF may make policy decision based on the information received from the SMF (e.g. always-on PDU session requested indication), and/or the information received from the UDR (e.g. subscription policies) and may determine/generate/create/derive one or more PCC rules comprising one or more charging control rules, the one or more PCC rules and/or the one or more charging control rules may apply to the always-on PDU session identified by a PDU session identifier. The one or more PCC rules and/or the one or more charging control rules may apply to at least one service data flow identified by at least one service data flow filter. The one or more PCC rules and/or the one or more charging control rules may apply to at least one application identified by an application identifier. The one or more PCC rules and/or the one or more charging control rules may apply to a wireless device identified by a UE identity. The one or more PCC rules and/or the one or more charging control rules may apply to a data network identified by a DNN. The one or more PCC rules and/or the one or more charging control rules may apply to a network slice identified by an S-NSSAI and/or a network slice instance identifier.

Each of the PCC rule determined by the PCF may comprise at least one of: at least one charging control rule; at least one policy control rule comprising at least one QoS control rule and/or at least one gating control rule; at least one usage monitoring control rule; at least one application detection and control rule; at least one traffic steering control rule; or at least one service data flow detection information (e.g. service data flow template). In an example, the charging control rule may be used for charging control and may comprise at least one of: an information element indicating a charging method/charging type, wherein the charging method/charging type may comprise at least one of: online charging, offline charging, or converged charging; an information element indicating at least one charging rate; or an information element indicating at least one identifier or address of a CHF.

In an example, the policy control rule may be used for policy control, wherein the at least one QoS control rule may be used for QoS control and the at least one gating control rule may be used for gating control. In an example, the QoS control rule may be used to authorize QoS on a service data flow. In an example, the gating control rule may be used to discard packets that don't match any service data flow of the gating control rule and/or associated PCC rules. In an example, the usage monitoring control rule may be used to monitor, both volume and time usage, and report the accumulated usage of network resources. In an example, the application detection and control rule may comprise a request to detect a specified application traffic, report to a PCF on a start or stop of application traffic and to apply a specified enforcement and charging actions. In an example, the traffic steering control rule may be used to activate/ deactivate traffic steering policies for steering a subscriber's traffic to appropriate operator or 3rd party service functions (e.g. NAT, antimalware, parental control, DDoS protection) in an (S)Gi-LAN. In an example, the service data flow detection information (e.g. service data flow template) may comprise a list of service data flow filters or an application identifier that references the corresponding application detection filter for the detection of the service data flow. In an example, the service data flow detection information (e.g. service data flow template) may comprise combination of traffic patterns of the Ethernet PDU traffic.

In an example, the PCF may determine/generate/create/derive the one or more PCC rules applied to an always-on PDU session based on one or more the following information: the requesting for an always-on PDU session and/or the first always-on PDU session indication (e.g. always-on PDU session requested indication), the granting for an always-on PDU session and/or the second always-on PDU session indication (e.g. always-on PDU session granted indication), the at least one UE identity (e.g. SUPI, PEI, and/or GPSI), the at least one UE IP address (e.g. UE IPv4 address and/or UE IPv6 network prefix), the Default 5QI and default ARP, the Type of PDU Session (e.g. IPv4, IPv6, IPv4v6, Ethernet, Unstructured); the Access Type (e.g. 3GPP access); the RAT Type (e.g. 3GPP-NR-FDD); the PLMN identifier; the application identifier; the allocated application instance identifier; the DNN, the S-NSSAI(s) and/or network slice instance identifier(s), the PDU Session ID, user location information, or information of the SMF for the PDU session (e.g. SMF identifier, IP address or FQDN of the SMF), and/or time duration information. In an example, based on the first always-on PDU session indication (e.g. always-on PDU session requested indication), and/or the subscription always-on PDU session indication and/or the subscription policies, the PCF may determine a QoS rule and/or a charging control rule for an always-on PDU session, wherein the QoS rule may comprise a QoS class identifier (e.g. QCI, 5QI) and/or a ARP, and/or at least one bandwidth value which may be applied to an always-on PDU session with IoT service; and the charging control rule may comprise a charging rate applied to the IoT service.

In an example, based on the first always-on PDU session indication (e.g. always-on PDU session requested indication), and/or the second always-on PDU session indication (e.g. always-on PDU session granted indication), and/or the Default 5QI and default ARP, the PCF may determine a QoS rule for an always-on PDU session, and the QoS rule may comprise a QoS class identifier (e.g. QCI, 5QI) and/or a ARP, and/or at least one bandwidth value which may be applied to an always-on PDU session with low latency service, e.g. the PCF may determine a value of 80 for 5QI applied to an always-on PDU session with low latency service. In an example, the PCF may determine a value of 1 for ARP applied to an always-on PDU session with low latency service. In an example, to limit the bandwidth resource of an always-on PDU session, the PCF may determine a value of 1 Mbit for maximum flow bit rate (MFBR) applied to a QoS flow and/or a service flow on an always-on PDU session with low latency service. In an example, based on the first always-on PDU session indication (e.g. always-on PDU session requested indication), and/or the second always-on PDU session indication (e.g. always-on PDU session granted indication), and/or the S-NSSAI(s) and/or network slice instance identifier(s), the PCF may determine a charging control rule comprising a higher charging rate considering the always-on PDU session may take lots of network resource. In an example, the charging control rule determined by the PCF may comprise a charging method (e.g. online charging, offline charging, or a converged charging) applied to an always-on PDU session. In an example, the charging control rule determined by the PCF may comprise an address of a CHF applied to an always-on PDU session. In an example, based on the first always-on PDU session indication (e.g. always-on PDU session requested indication), and/or the second always-on PDU session indication (e.g. always-on PDU session granted indication), and/or the application identifier, the PCF may determine a traffic steering control rule for steering a subscriber's traffic identified by the application identifier to an appropriate operator or 3rd party service functions (e.g. NAT, antimalware, parental control, DDoS protection) in an (S)Gi-LAN, where the subscriber's traffic is on an always-on PDU session. In an example, based on the first always-on PDU session indication (e.g. always-on PDU session requested indication), and/or the second always-on PDU session indication (e.g. always-on PDU session granted indication), and/or the user location information, the PCF may determine a usage monitoring control rule, which may be used to monitor, both volume and time usage, and report the accumulated usage of network resources to the PCF.

In an example action, the PCF may send to the SMF a response message (e.g. SM Policy Association Establishment Response) comprising the one or more PCC rules comprising one or more charging control rules determined by the PCF. The response message sent to the SMF may comprise at least one of the following information which the one or more PCC rules applied to: the at least one UE identity (e.g. SUPI, PEI, and/or GPSI), the at least one UE IP address (e.g. UE IPv4 address and/or UE IPv6 network prefix), the Default 5QI and default ARP, the Type of PDU Session (e.g. IPv4, IPv6, IPv4v6, Ethernet, Unstructured); the Access Type (e.g. 3GPP access); the RAT Type (e.g. 3GPP-NR-FDD); the PLMN identifier; the application identifier; the DNN, the S-NSSAI(s) and/or network slice instance identifier(s), or the PDU Session ID. The response message sent to the SMF may comprise the second always-on PDU session indication (e.g. always-on PDU session granted indication) and the PDU Session ID indicating that the PDU session identified by the PDU session ID is to be an always-on PDU session.

In response to the message received from the PCF, based on the charging control rules and other information elements (e.g. always-on PDU session granted indication), the SMF may select a CHF, and may construct a message (e.g. charging data request [initial]) and send the constructed message to the CHF to establish a charging session. The identifier or address of the CHF in the charging control rule may be used by the SMF to establish a charging session. The message sent to the CHF may comprise the first always-on PDU session indication (e.g. always-on PDU session requested indication), and/or the second always-on PDU session indication (e.g. always-on PDU session granted indication), and/or the associated PDU Session ID. The message sent to the CHF may comprise an information element indicating a requested charging method/charging type, wherein the charging method/charging type may comprise at least one of: online charging, offline charging, or converged charging. The message sent to the CHF may comprise an information element indicating a requested charging rate, where the requested charging rate may be determined by the SMF, or the requested charging rate may be the charging rate received from the PCF in the charging control rule. The message sent to the CHF may comprise one or more of the following information: the at least one UE identity (e.g. SUPI, PEI, and/or GPSI), the at least one UE IP address (e.g. UE IPv4 address and/or UE IPv6 network prefix), the Default 5QI and default ARP, the Type of PDU Session (e.g. IPv4, IPv6, IPv4v6, Ethernet, Unstructured), the Access Type (e.g. 3GPP access), the RAT Type (e.g. 3GPP-NR-FDD), the PLMN identifier, the application identifier, the allocated application instance identifier, the DNN, the S-NSSAI(s) and/or network slice instance identifier(s), the PDU Session ID, user location information, or information of the SMF for the PDU session (e.g. SMF identifier, IP address or FQDN of the SMF), and/or time duration information.

In response to the message received from the SMF, the CHF may take one or more actions. In an example action, the CHF may determine quota information/charging credit for the always-on PDU session based on one or more of the following information: the first always-on PDU session indication (e.g. always-on PDU session requested indication), the second always-on PDU session indication (e.g. always-on PDU session granted indication), the PDU Session ID, the requested charging method/charging type, the requested charging rate, the at least one UE identity (e.g. SUPI, PEI, and/or GPSI), the at least one UE IP address (e.g. UE IPv4 address and/or UE IPv6 network prefix), the Default 5QI and default ARP, the Type of PDU Session (e.g. IPv4, IPv6, IPv4v6, Ethernet, Unstructured), the Access Type (e.g. 3GPP access), the RAT Type (e.g. 3GPP-NR-FDD), the PLMN identifier, the application identifier, the allocated application instance identifier, the DNN, the S-NSSAI(s) and/or network slice instance identifier(s), the user location information, or information of the SMF for the PDU session (e.g. SMF identifier, IP address or FQDN of the SMF), and/or the time duration information. In an example, based on the first always-on PDU session indication (e.g. always-on PDU session requested indication), and/or the second always-on PDU session indication (e.g. always-on PDU session granted indication), and/or the Type of PDU Session, and/or the Access Type, the CHF may determine quota information/charging credit for the always-on PDU session. To limit the resource of the always-on PDU session, the CHF may determine a smaller granted unit, and/or a smaller time quota threshold and/or a smaller volume quota threshold. In an example, based on the first always-on PDU session indication (e.g. always-on PDU session requested indication), and/or the second always-on PDU session indication (e.g. always-on PDU session granted indication), and/or the requested charging rate, and/or the S-NSSAI(s) and/or network slice instance identifier(s), and/or the PDU session ID, the CHF may determine a higher charging rate considering the always-on PDU session may take lots of network resource. In an example, based on the first always-on PDU session indication (e.g. always-on PDU session requested indication), and/or the second always-on PDU session indication (e.g. always-on PDU session granted indication), and/or the user location, and/or the time duration information, the CHF may determine quota information/ charging credit (e.g. granted unit, final granted unit) for the always-on PDU session for specific time duration and/or specific location for a wireless device.

In an example action, the CHF may send to the SMF a response message (e.g. charging data response). The response message sent to the SMF may comprise at least one of the following information determined by the CHF: an information element indicating a charging method/charging type (e.g. online charging, offline charging, or converged charging); an information element indicating at least one charging rate (e.g. rating group); an information element indicating at least one granted unit (e.g. granted volume and/or granted time for online charging or converged charging); or an information element indicating final unit action (e.g. redirect the traffic to a web portal when the final granted unit has been consumed by the wireless device). The response message sent to the SMF may comprise one or more of the following information: the first always-on PDU session indication (e.g. always-on PDU session request indication), the second always-on PDU session indication (e.g. always-on PDU session granted indication), the PDU session ID; the at least one service data flow filter; the application identifier; the at least one user identity (e.g. SUPI, PEI, and/or GPSI); the DNN; the S-NSSAI and/or a network slice instance identifier.

In response to the message received from the CHF, the SMF may take one or more actions. In an example action, after receiving response message from the CHF, the SMF may enforce the PCC rules and/or charging control rules required by the PCF and/or charging function required by the CHF by determining/generating/creating/deriving at least one of the following user plane rules based on the received PCC rules and/or charging control rules from the PCF and/or the information (e.g. charging rate) received from the CHF: at least one packet detection rule; at least one forwarding action rule; at least one QoS enforcement rule; or at least one usage reporting rule. The at least one user plane rule determined by the SMF may be applied to the always-on PDU session.

In an example, the packet detection rule may comprise data/traffic packet detection information, e.g. one or more match fields against which incoming packets are matched and may apply other user plane rules (e.g. forwarding action rule, QoS enforcement rule, and usage reporting rule) to the data/traffic packets matching the packet detection rule. In an example, the forwarding action rule may comprise an apply action parameter, which may indicate whether a UP function may forward, duplicate, drop or buffer the data/traffic packet respectively. In an example, the usage reporting rule may be used to measure the network resources usage in terms of traffic data volume, duration (i.e. time) and/or events, according to a measurement method in the usage reporting rule. In an example, the QoS enforcement rule contains instructions to request the UP function to perform QoS enforcement of the user plane traffic.

In an example, the SMF may determine a packet detection rule based on the service data flow detection information (e.g. service data flow template) received from the PCF. In an example, the SMF may determine a forwarding action rule based on the policy control rule and/or usage monitoring control rule received from the PCF and/or the final unit action received from the CHF. In an example, the SMF may determine a QoS enforcement rule based on the policy control rule (e.g. QoS control rule) received from the PCF. In an example, the SMF may determine a usage reporting rule based on the usage monitoring control rule received from the PCF and/or the at least one granted unit (e.g. granted volume and/or granted time for online charging or converged charging) received from the CHF.

In an example action, the SMF may select a UPF based on the information received from the PCF, and/or the information received from the CHF, and/or the information received from the AMF. In an example, the SMF may select a UPF for an always-on PDU session, the selection of the UPF may be based on the first always-on PDU session indication (e.g. always-on PDU session request indication), and/or the second always-on PDU session indication (e.g. always-on PDU session granted indication), and/or the PDU session ID. In an example, considering the always-on PDU session may take lots of network resource, the SMF may select a UPF which may have the capability supporting an always-on PDU session.

In an example action, the SMF may send to the UPF a message (e.g. N4 session establishment/modification request) comprising the at least one of the following user plane rules for the always-on PDU session: at least one packet detection rule; at least one forwarding action rule; at least one QoS enforcement rule; or at least one usage reporting rule.

In response to the message received from the SMF, the UPF may install the user plane rules received from the SMF, send to the SMF a response message (e.g. N4 session establishment/modification response), and enforce the user plane rules for the always-on PDU session.

In an example, the UPF may enforce the at least one packet detection rule by matching a user data/traffic packet with service data flow template (e.g. service data flow filters and/or application identifiers) and may apply other user plane rules (e.g. forwarding action rule, QoS enforcement rule, and usage reporting rule) to the data/traffic packets matched the packet detection rule. In an example, the UPF may enforce the at least one forwarding action rule by forwarding, duplicating, dropping or buffering a data/traffic packet respectively. In an example, the UPF may redirect the traffic to a web portal of the operator. In an example, the UPF may enforce the at least one usage reporting rule by measuring network resources usage in terms of traffic data volume, duration (i.e. time) and/or events, according to a measurement method in the usage reporting rule; the UPF may report the network resources usage to the SMF when the quota/threshold reached, and/or event and/or another trigger is (are) met. In an example, the UPF may enforce the at least one QoS enforcement rule by applying at least one of QoS parameters: 5QI, ARP, MBR, GBR to a service data flow; In an example, the UPF may enforce the at least one QoS enforcement rule by applying at least one of QoS parameters: Session AMBR and default 5QI/ARP combination to a PDU session. In an example, the usage report information may comprise network resources usage in terms of traffic data volume, duration (i.e. time) applied to the always-on PDU session.

Figure 26:
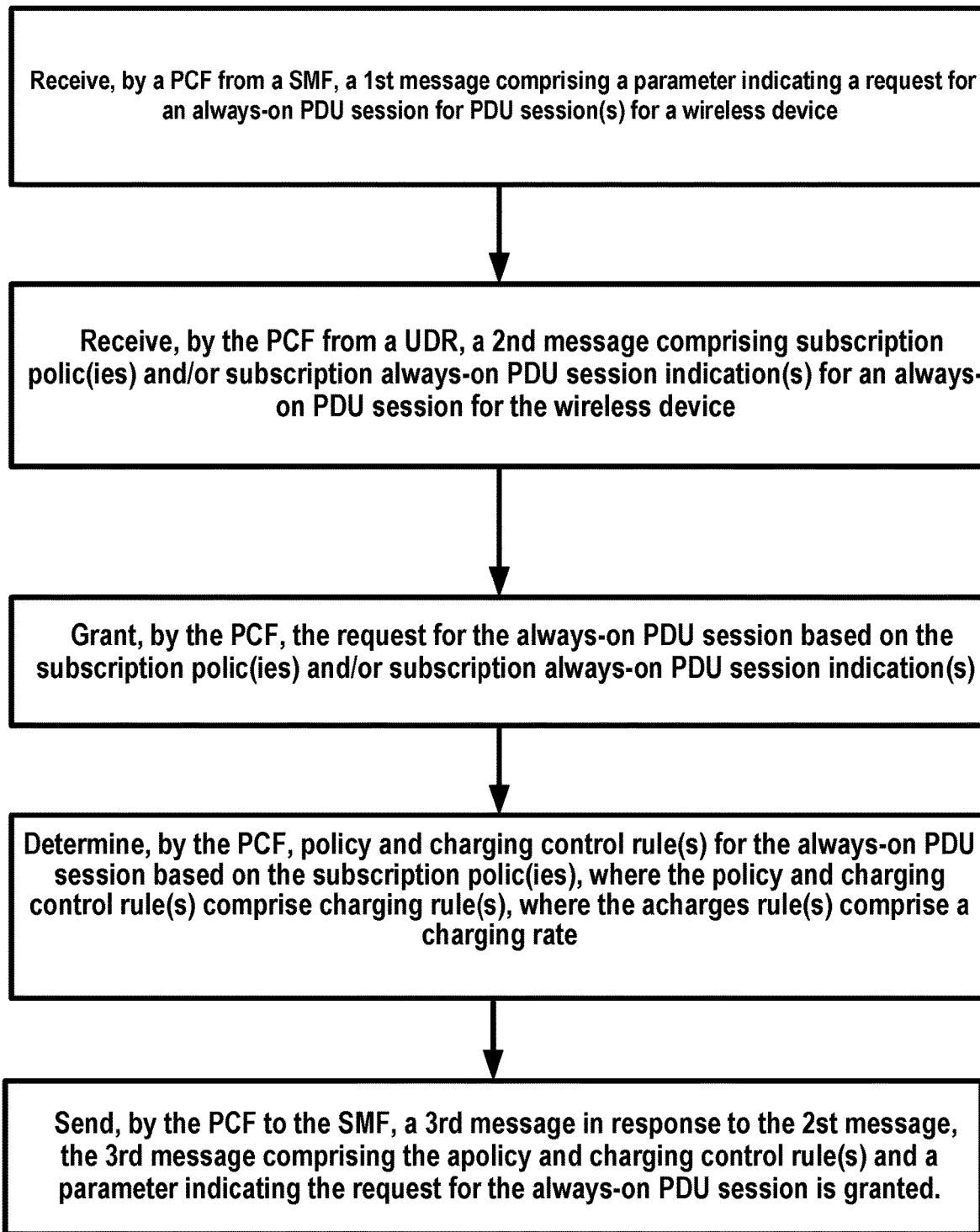
FIG. 26 is an example diagram depicting the procedures of PCF as per an aspect of an embodiment of the present disclosure.
Figure 27:
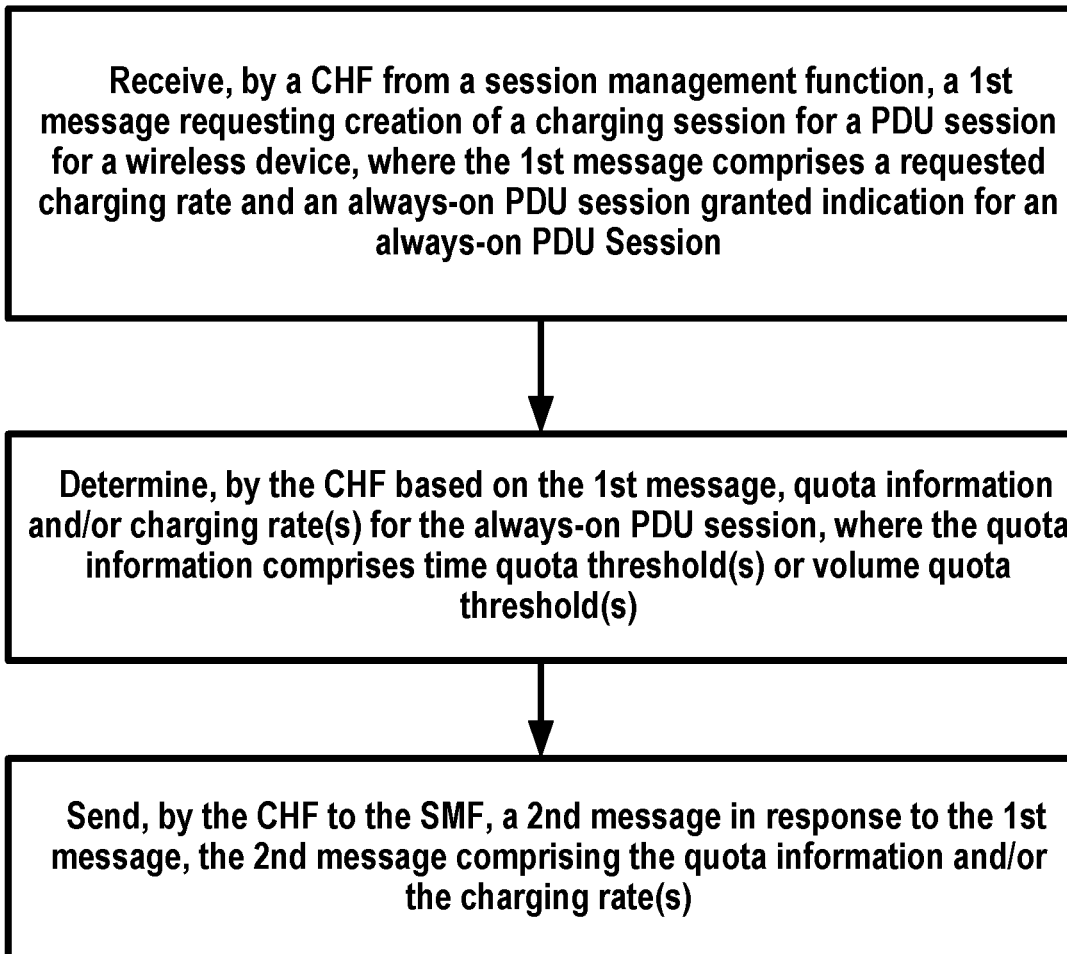
FIG. 27 is an example diagram depicting the procedures of CHF as per an aspect of an embodiment of the present disclosure.

In an example, other interactions may be performed between SMF, AMF, (R)AN and UE for the PDU session establishment procedure. FIG. 25, FIG. 26 and FIG. 27 illustrate example flowcharts for procedures performed by an SMF, a PCF and a CHF, respectively, as per an aspect of an embodiment of the present disclosure.

According to various embodiments, a device such as, for example, a wireless device, core network node (e.g. SMF, PCF, UPF, CHF), a base station, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

According to an example embodiment, a session management function (SMF) may receive from a wireless device, a first message requesting establishment of a packet data unit (PDU) session of the wireless device, the first message may comprise a parameter indicating a request for an always-on PDU session. According to an example embodiment, the SMF may send to a policy control function (PCF), a second message comprising the parameter indicating a request for an always-on PDU session for the wireless device. According to an example embodiment, the SMF may receive from the PCF, a third message comprising: at least one policy and charging control rule, wherein the at least one policy and charging control rule comprising a charging rate for the always-on PDU session; and an always-on PDU session granted indication indicating the request for an always-on PDU session is granted. According to an example embodiment, the SMF may determine a requested charging rate based on the charging rate. According to an example embodiment, the SMF may select a charging function (CHF) based on the at least one policy and charging control rule and the always-on PDU session granted indication. According to an example embodiment, the SMF may send to the CHF, a charging request message comprising the requested charging rate and the always-on PDU session granted indication.

According to an example embodiment, the PCF may receive from a UDR, a subscription response message comprising at least one subscription policy for the always-on PDU session for the wireless device. According to an example embodiment, the subscription response message may further comprise a subscription always-on PDU session indication for the wireless device. According to an example embodiment, the at least one subscription policy may further comprise at least one of: a QoS policy; or a charging control policy. According to an example embodiment, the PCF may send to the UDR, a subscription request message comprising at least one of: the parameter indicating a request for an always-on PDU session; the identity of the wireless device; or a PDU session identity. According to an example embodiment, the PCF may grant the request for the always-on PDU session based on the at least one subscription policy for the always-on PDU session of the wireless device. According to an example embodiment, the PCF may determine the always-on PDU session granted indication.

According to an example embodiment, the PCF may determine at least one policy and charging control rule for the always-on PDU session based on the at least one subscription policy and/or the always-on PDU session granted indication. According to an example embodiment, the at least one policy and charging control rule may comprise at least one of: a charging rule; a QoS rule; or a traffic steering control rule. According to an example embodiment, the charging rule further comprises a charging rate. According to an example embodiment, based on the requested charging rate and the always-on PDU session granted indication, the CHF may determine, at least one charging rate for the always-on PDU session. According to an example embodiment, the SMF may receive from the CHF, a charging response message comprising the at least one charging rate.

According to an example embodiment, based on the requested charging rate and the always-on PDU session granted indication, the CHF may determine quota information for the always-on PDU session. According to an example embodiment, the SMF may receive from the CHF, a charging response message comprising the quota information. According to an example embodiment, the quota information comprises at least one time quota threshold. According to an example embodiment, the quota information comprises at least one volume quota threshold. According to an example embodiment, the SMF may select a UPF based on the parameter indicating a request for an always-on PDU session.

According to an example embodiment, the SMF may select a UPF based on the always-on PDU session granted indication. According to an example embodiment, the second message further comprises a time duration information. According to an example embodiment, based the on time duration information, the PCF may determine the PDU session to be an always-on PDU session for a specific duration time.

According to an example embodiment, a charging function (CHF) may receive from a session management function, a first message requesting creation of a charging session for a packet data unit (PDU) session for a wireless device, wherein the first message comprises a requested charging rate and an always-on PDU session granted indication for an always-on PDU Session. According to an example embodiment, based on the first message, the CHF may determine quota information and/or at least one charging rate for the always-on PDU session, wherein the quota information comprises at least one time quota threshold or at least one volume quota threshold. According to an example embodiment, the CHF may send to the SMF, a second message in response to the first message, the second message comprising the quota information and/or the at least one charging rate.

According to an example embodiment, a policy control function (PCF) may receive from a session management function (SMF), a first message comprising a parameter indicating a request for an always-on PDU session for at least one packet data unit (PDU) session for a wireless device. According to an example embodiment, the PCF may receive from a user data convergence (UDR), a second message may comprise at least one subscription policy and/or subscription always-on PDU session indication for an always-on PDU session for the wireless device. According to an example embodiment, the PCF may grant the request for the always-on PDU session based on the at least one subscription policy and/or subscription always-on PDU session indication. According to an example embodiment, the PCF may determine at least one policy and charging control rule for the always-on PDU session based on the at least one subscription policy, wherein the at least one policy and charging control rule comprises at least one charging rule, wherein the at least one charges rule comprising a charging rate. According to an example embodiment, the PCF may send to the SMF a third message in response to the first message, the third message may comprise the at least one policy and charging control rule and a parameter indicating the request for the always-on PDU session is granted.

An always-on PDU session may be needed to support an application service with a short delay (e.g. an emergency service, a low latency service). There may be lots of application functions (AFs) in a network and it may be hard to standardize the application signaling between the AF and a wireless device (UE). For example, the AF may ask the UE to initiate an always-on PDU session for the application service with short delay. In existing technology, the AF may not be able to request/initiate an always-on PDU session. This may result in the application service with short delay (e.g. an emergency service, a low latency service) not being supported (e.g. in an always-on PDU session) efficiently. Embodiments of the present disclosure provide enhanced mechanisms to enable an AF to request an always-on PDU session. Embodiments of the present disclosure provide enhanced mechanisms to enable an SMF to map application/service information to an always-on PDU session. Embodiments of the present disclosure provide enhanced mechanisms to enable an PCF to map application/service information to an always-on PDU session. These enhanced mechanisms may support an application service on an always-on PDU session and may improve the network signaling and the user experience.

Figure 28:
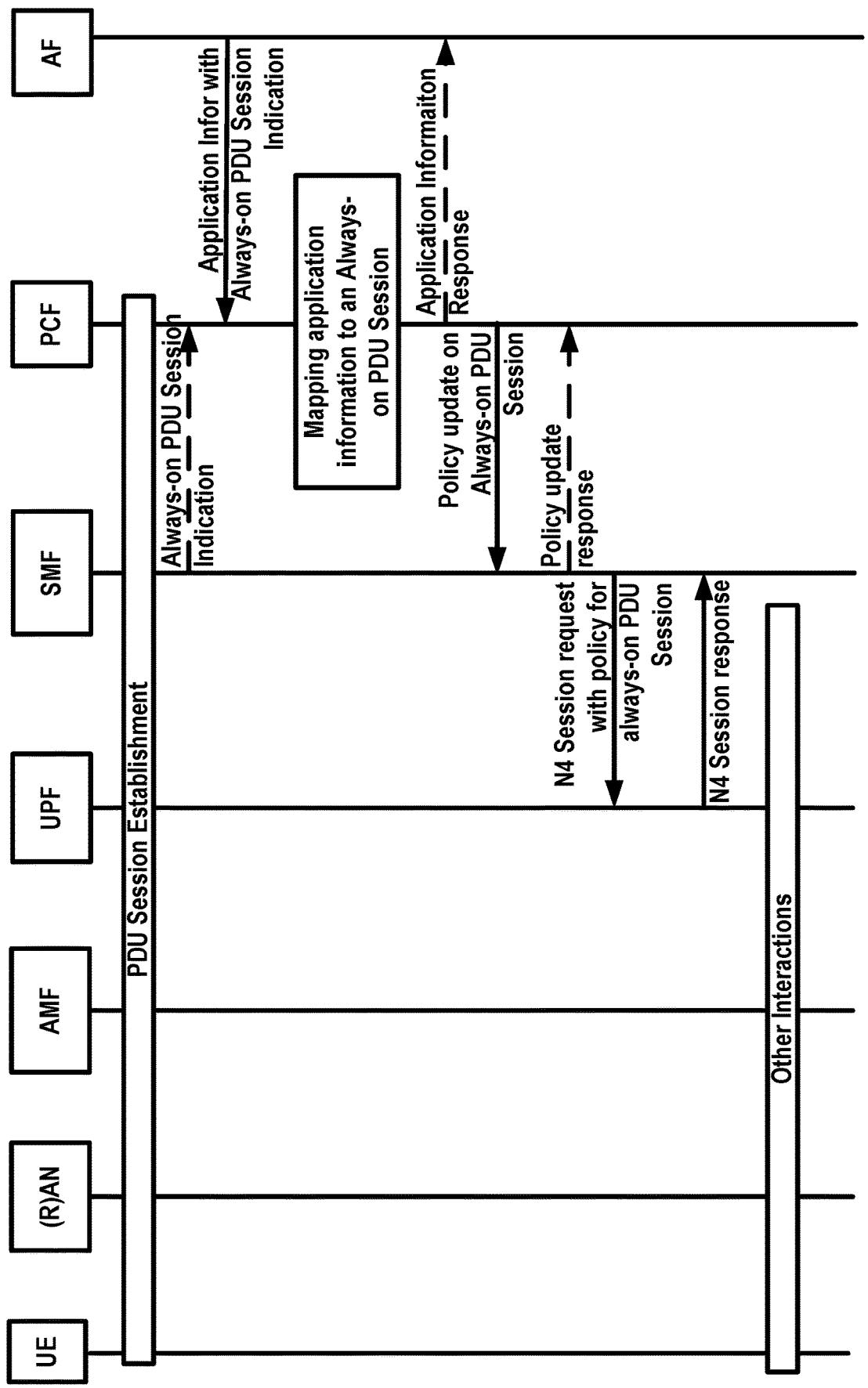
FIG. 28 is an example call flow as per an aspect of an embodiment of the present disclosure.

In an example, a policy control function (PCF) may receive from an application function (AF) application/service information and/or always-on PDU session request indication, the PCF may map the application/service information to an always-on PDU session. FIG. 28 shows an example call flow which may comprise one or more actions.

A UE may have established one or more PDU sessions between the UE and a data network (DN). During the PDU session establishment(s), the UE may request a SMF to establish at least one always-on PDU session for the one or more PDU sessions by comprising a first always-on PDU session indication (e.g. always-on PDU session requested indication). In an example, a PDU session establishment request message(s) may comprise the first always-on PDU session indication. In an example, in response to the PDU session establishment request message received from the UE, the SMF may request a PCF to grant the at least one always-on PDU session by sending the first always-on PDU session indication to the PCF. In an example, a SM policy association establishment message (e.g. comprising the first always-on PDU session indication) sent to the PCF by the SMF may comprise at least one of the following information elements: at least one identity of a wireless device (e.g. SUPI, PEI, and/or GPSI), at least one UE IP address (e.g. UE IPv4 address and/or UE IPv6 network prefix), Default 5QI and default ARP, Type of PDU Session (e.g. IPv4, IPv6, IPv4v6, Ethernet, Unstructured); Access Type (e.g. 3GPP access); RAT Type (e.g. 3GPP-NR-FDD); a PLMN identifier; an application identifier; an allocated application instance identifier; DNN, S-NSSAI(s) and/or network slice instance identifier(s), PDU Session ID, user location information, or information of the SMF for the PDU session (e.g. SMF identifier, IP address or FQDN of the SMF). In an example, in response to the SM policy association establishment message received from the SMF, the PCF may grant the at least one always-on PDU session by sending at least one second always-on PDU session indication (e.g. always-on PDU session grant indication) to the SMF in a SM policy association establishment response message, and the PCF may keep/store/have a mapping information between the at least one always-on PDU session and the information received from the SMF (e.g. identity of a wireless device, S-NSSAI and/or S-NSSAI associated network slice instance identifier). In an example, the at least one always-on PDU session may be identified by a PDU session ID. In an example, the at least one always-on PDU session may be associated with a network slice identified by the S-NSSAI and/or a network slice instance identifier, e.g. the at least one always-on PDU session may be employed/configured to serve/provide a network slice identified by the S-NSSAI and/or the network slice instance identifier. In an example, the at least one always-on PDU session may be associated with a data network identified by a DNN, e.g. the at least one always-on PDU session may be employed/configured to serve/provide a data network identified by the DNN. In an example, in response to the SM policy association establishment response message received from the PCF, the SMF may send the at least one second always-on PDU session indication to the UE.

In an example, an always-on PDU session may be needed to support an application service which requires short delay (e.g. a low latency service). An application function (AF) may request an always-on PDU session for the application service for a wireless device by sending a message (e.g. always-on PDU session request, or application/service information provisional) to a PCF. The application/service information provisional message sent to the PCF may comprise one or more of the following information elements: an always-on PDU session requested indication, at least one identity of a wireless device (e.g. SUPI, PEI, and/or GPSI), at least one UE IP address (e.g. UE IPv4 address and/or UE IPv6 network prefix), an DNN, at least one S-NSSAI and/or at least one S-NSSAI associated network slice instance identifier, and application/service information. The always-on PDU session requested indication may be used by the AF to indicate a request for an always-on PDU session for the application service for the wireless device. The application/service information may comprise one or more of: IP filter information to identify a service data flow of the application service, an application identifier, a media/application/service type, and requested media/application/service QoS (e.g. 5QI, ARP, and/or bandwidth).

In an example, in response to the application/service information provisional message received from the AF, the PCF may take one or more actions. For example, the PCF may determine/map the application/service information to an always-on PDU session for the wireless device based on the information received from the AF, and/or the at least one always-on PDU session information stored in the PCF, and/or the user subscription information, and/or the local operator policies. In an example, the PCF may determine/map the application/service information to an always-on PDU session based on the requested media/application/service QoS and/or the QoS supported by an always-on PDU session. In an example, the PCF may determine/map the application/service information to an always-on PDU session if the requested media/application/service QoS (e.g. 5QI, ARP, and/or bandwidth) is the same as QoS (e.g. 5QI, ARP, and/or bandwidth) supported by an always-on PDU session. In an example, the PCF may determine/map the application/service information to an always-on PDU session if the requested media/application/service QoS (e.g. 5QI, ARP, and/or bandwidth) is supported by an always-on PDU session, e.g. the requested media/application/service QoS is lower than the QoS supported by an always-on PDU session.

In an example, the PCF may determine/map the application/service information to an always-on PDU session based on the network slice information (e.g. S-NSSAI and/or S-NSSAI associated network slice instance identifier). In an example, the PCF may determine/map the application/service information to an always-on PDU session if the at least one S-NSSAI and/or at least one S-NSSAI associated network slice instance identifier received from the AF is supported by an always-on PDU session, e.g. a S-NSSAI and/or the S-NSSAI associated network slice instance identifier of the always-on PDU session is the same as the at least one S-NSSAI and/or at least one S-NSSAI associated network slice instance identifier received from the AF. In an example, the PCF may determine/map the application/service information to an always-on PDU session based on the identity of the wireless device and/or UE IP address, e.g. if the at least one identity of the wireless device and/or UE IP address received from the AF is the same as the identity of the wireless device and/or UE IP address of an always-on PDU session. In an example, the PCF may determine/map the application/service information to an always-on PDU session based on the DNN, e.g. if the DNN received from the AF is the same as the DNN of an always-on PDU session. In an example, the PCF may determine/map the application/service information to an always-on PDU session based on the IP filter information, e.g. if an always-on PDU session comprises the IP filter information received from the AF. In an example, the determined always-on PDU session may be associated with an SMF.

In an example action, the PCF may send to the AF a response message (e.g. always-on PDU session response, or application/service information provisional response) comprising one or more of: a cause value, a PDU session ID. The cause value may be used to indicate whether the request sent from the PCF is success/allowed or not. The PDU session ID may be used to indicate the always-on PDU session which the application/service information is associated to.

In an example action, the PCF may make policy decision based on the application/service information received from the AF. The PCF may determine/update one or more PCC rules applied to the always-on PDU session based on the application/service information received from the AF. In an example, the determined/updated one or more PCC rules may comprise the IP filter information received from the AF. In an example, one or more of the one or more PCC rules may comprise a QoS control rule and/or a charging control rule applied to the always-on PDU session. In an example, based on the requested media/application/service QoS (e.g. 5QI, ARP, and/or bandwidth) received from the AF, the PCF may determine/update the QoS control rule applied to the always-on PDU session, e.g. the determined/updated QoS control rule may comprise 5QI, ARP, and/or bandwidth parameters which may support the requested media/application/service QoS. In an example, based on the media/application/service type received from the AF, the PCF may determine/update the QoS control rule applied to the always-on PDU session, e.g. the determined/updated QoS control rule may comprise 5QI, ARP, and/or bandwidth parameters which may support the media/application/service type. In an example, based on the media/application/service type received from the AF, the PCF may determine/update the charging control rule applied to the always-on PDU session, e.g. the determined/updated charging control rule may comprise a charging rate and/or a charging method parameter which may appropriate for the media/application/service type based on operator policy.

In an example action, the PCF may send to the SMF a message (e.g. SM policy association modification), where the determined always-on PDU session is served/supported by the SMF. The SM policy association modification message may comprise the determined/updated one or more PCC rules applied to the always-on PDU session. In an example, in response to the SM policy association modification message received from the PCF, the SMF may send to the PCF a response message (e.g. SM policy association modification response). The SMF may determine/update at least one of the following user plane rules based on the one or more PCC rules received from the PCF: at least one packet detection rule; at least one forwarding action rule; at least one QoS enforcement rule; or at least one usage reporting rule. The at least one user plane rule determined by the SMF may be applied to the always-on PDU session. In an example, the packet detection rule may comprise data/traffic packet detection information, e.g. one or more match fields against which incoming packets are matched and may apply other user plane rules (e.g. forwarding action rule, QoS enforcement rule, and usage reporting rule) to the data/traffic packets matching the packet detection rule. In an example, the packet detection rule may comprise the IP filter information for the application service. In an example, the forwarding action rule may comprise an apply action parameter, which may indicate whether a UP function may forward, duplicate, drop or buffer the data/traffic packet respectively. in an example, the QoS enforcement rule contains instructions to request the UP function to perform QoS enforcement of the user plane traffic. In an example, the usage reporting rule may be used to measure the network resources usage in terms of traffic data volume, duration (i.e. time) and/or events, according to a measurement method in the usage reporting rule.

In an example action, the SMF may send to the UPF a message (e.g. N4 session establishment/modification request) comprising the at least one of the following user plane rules for the always-on PDU session: the at least one packet detection rule; the at least one forwarding action rule; the at least one QoS enforcement rule; or the at least one usage reporting rule.

In an example, in response to the N4 session establishment/modification request message received from the SMF, the UPF may install the user plane rules received from the SMF, send to the SMF a response message (e.g. N4 session establishment/modification response), and enforce the user plane rules for the always-on PDU session.

In an example, the UPF may enforce the at least one packet detection rule by matching a user data/traffic packet with service data flow template (e.g. IP filter information for the application service, service data flow filters and/or application identifiers). The UPF may apply other user plane rules (e.g. forwarding action rule, QoS enforcement rule, and usage reporting rule) to the data/traffic packets matched the packet detection rule.

Figure 29:
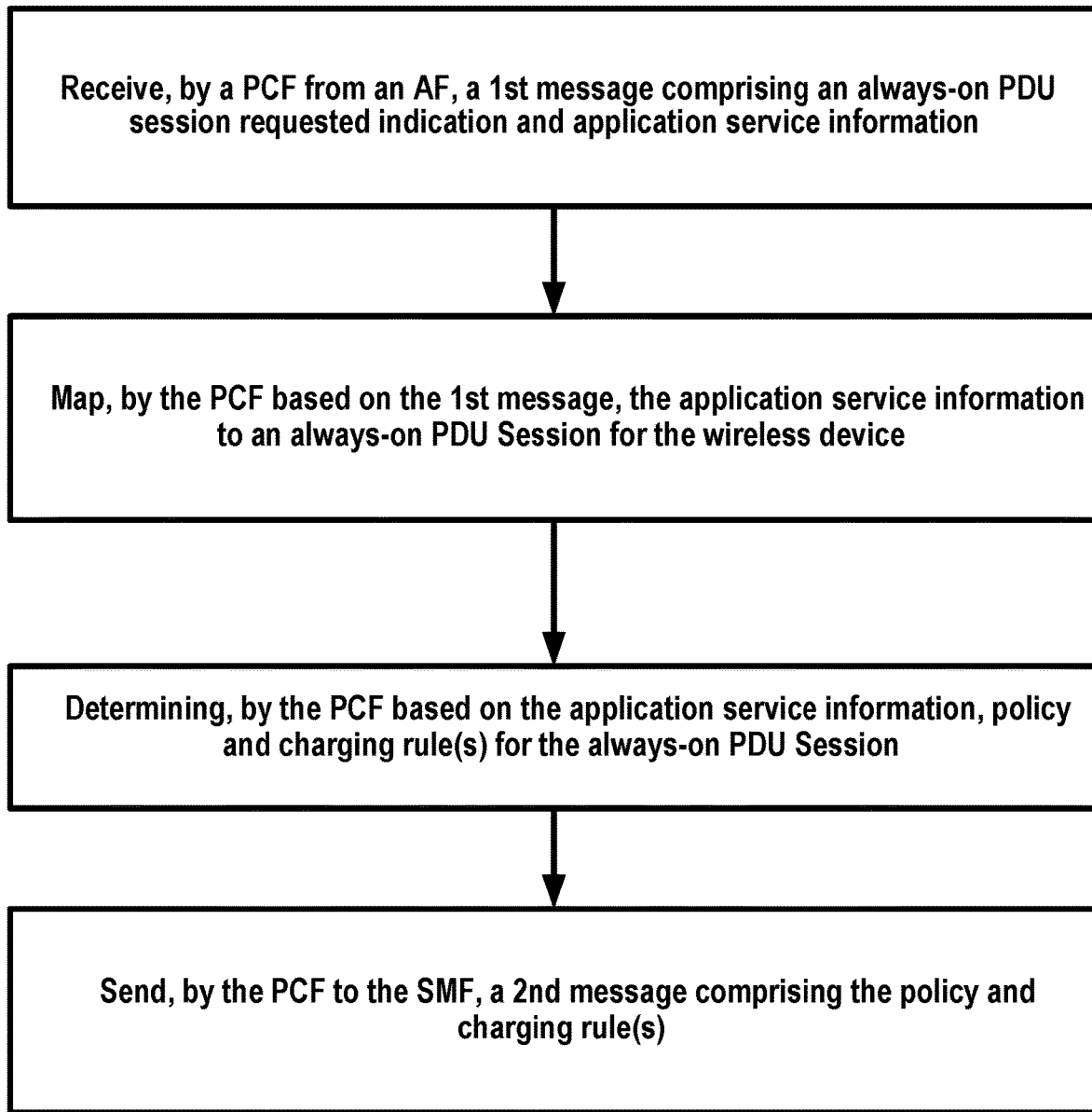
FIG. 29 is an example diagram depicting the procedures of PCF as per an aspect of an embodiment of the present disclosure.

In an example, other interactions may be performed between SMF, AMF, (R)AN and UE for the PDU session modification procedure. FIG. 29 is an example diagram depicting the procedures of PCF as per an aspect of an embodiment of the present disclosure.

Figure 30:
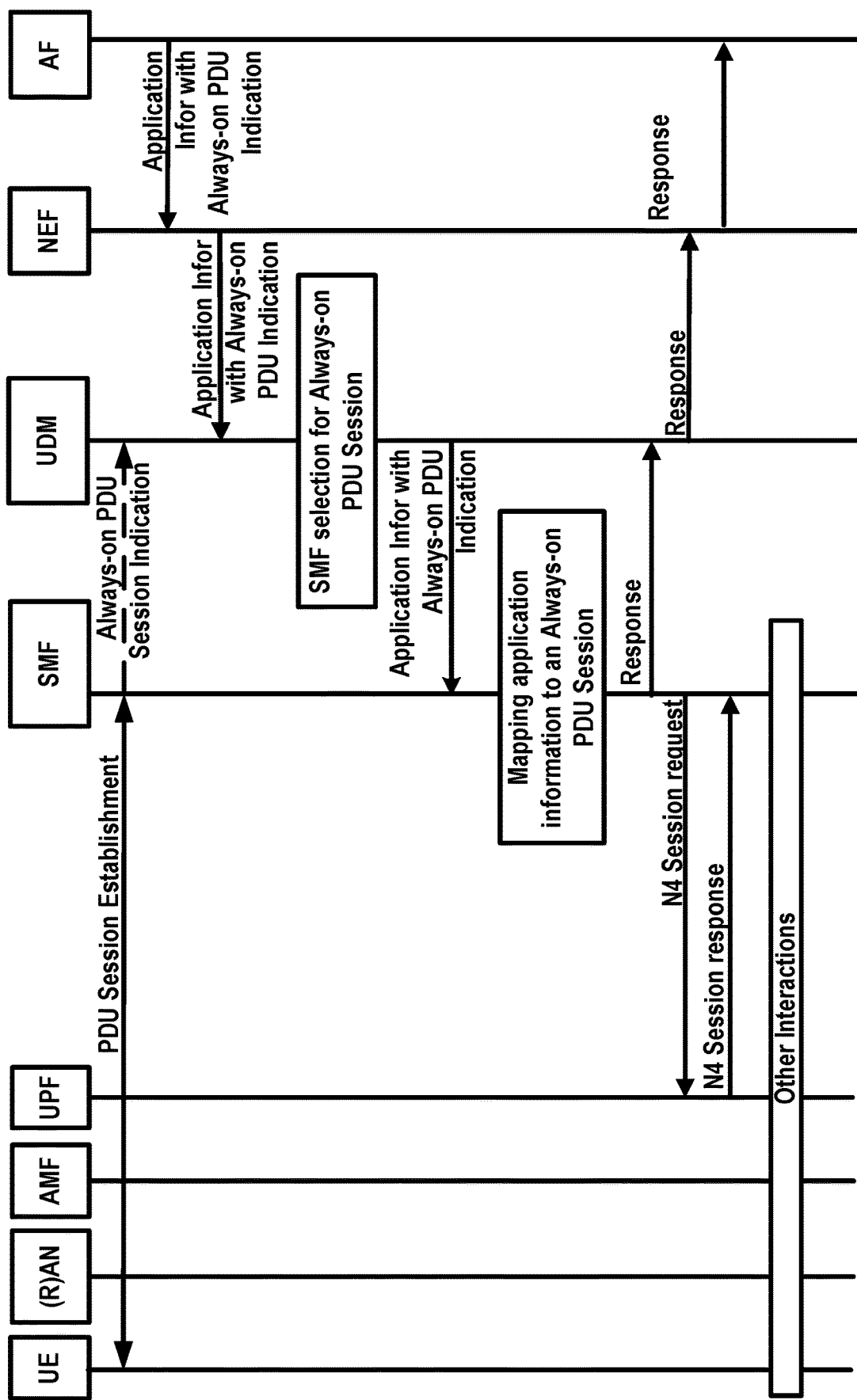
FIG. 30 is an example call flow as per an aspect of an embodiment of the present disclosure.

In an example, a UDM may keep/store/have a mapping information between always-on PDU session(s) and SMF(s), e.g. an always-on PDU session may be associated with a SMF, e.g. the always-on PDU session may be served/supported by the SMF. When receives a request of always-on PDU session from a NEF or an AF, the UDM may select a SMF which is associated with an always-on PDU session. The UDM may send a request to the selected SMF. The SMF may map application/service information to an always-on PDU session. FIG. 30 shows an example call flow which may comprise one or more actions.

A UE may have established one or more PDU sessions between the UE and a data network (DN). During the PDU session establishment(s), the UE may request a SMF to establish at least one always-on PDU session for the one or more PDU sessions by comprising a first always-on PDU session indication (e.g. always-on PDU session requested indication) in the PDU session establishment request message (s), the SMF may determine/grant at least one always-on PDU session for the one or more PDU sessions. In an example, the SMF may determine a second always-on PDU session indication (e.g. always-on PDU session grant indication) for the at least one always-on PDU session. The SMF may send to a UDM a message (e.g. always-on PDU session information provisional) comprising always-on PDU session information. The always-on PDU session information may comprise at least one of the following information elements: the second always-on PDU session indication and associated PDU session ID; at least one identity of a wireless device (e.g. SUPI, PEI, and/or GPSI), at least one UE IP address (e.g. UE IPv4 address and/or UE IPv6 network prefix), Default 5QI and default ARP, Type of PDU Session (e.g. IPv4, IPv6, IPv4v6, Ethernet, Unstructured); Access Type (e.g. 3GPP access); RAT Type (e.g. 3GPP-NR-FDD); a PLMN identifier; an application identifier; an allocated application instance identifier; DNN, S-NSSAI(s) and/or S-NSSAI(s) associated network slice instance identifier(s), user location information, or information of the SMF for the at least one always-on PDU session (e.g. SMF identifier, IP address or FQDN of the SMF). The UDM may store the always-on PDU session information which may comprise the mapping information between the at least one always-on PDU session and other information elements of the always-on PDU session information (e.g. the at least one identity of the wireless device, the SMF, the DNN).

In an example, an always-on PDU session may be needed to support an application service which requires short delay (e.g. an emergency service, or a low latency service), an application function (AF) may request an always-on PDU session for the application service for a wireless device by sending a message (e.g. always-on PDU session request, or application/service information provisional) to a NEF, the message sent to the NEF may comprise one or more of the following information: an always-on PDU session requested indication, at least one identity of the wireless device (e.g. SUPI, PEI, and/or GPSI), at least one UE IP address (e.g. UE IPv4 address and/or UE IPv6 network prefix), an DNN, at least one S-NSSAI and/or at least one S-NSSAI associated network slice instance identifier, and application/service information. The always-on PDU session requested indication may be used by the AF to indicate a request for an always-on PDU session for the application service for the wireless device. The application/service information may comprise one or more of the following information elements: IP filter information to identify a service data flow of the application service, an application identifier, a media/application/service type, and requested media/application/service QoS (e.g. 5QI, ARP, and/or bandwidth). In an example, the AF may send the message (e.g. always-on PDU session request, or application/service information provisional) to the UDM without via a NEF.

In an example, in response to the application/service information provisional message received from the AF, the NEF may send to the UDM a message (e.g. always-on PDU session request, or application/service information provisional) comprising one or more information received from the AF. In an example, in response to the application/service information provisional message received from the NEF, the UDM may take one or more actions. In an example action, the UDM may select an always-on PDU session for the application/service information. In an example action, the UDM may select a SMF which is associated with an always-on PDU session for the application/service information. The UDM may determine/select the SMF and/or the always-on PDU session for the application/service information based on the information received from the NEF/AF and/or the always-on PDU session information received from the SMF. In an example, the UDM may determine/select the SMF and/or the always-on PDU session for the application/service information based on the at least one identity of the wireless device (e.g. SUPI, PEI, and/or GPSI) and/or the at least one UE IP address (e.g. UE IPv4 address and/or UE IPv6 network prefix), e.g. the at least one identity of the wireless device and/or the at least one UE IP address received from the NEF/AF is (are) the same as the at least one identity of the wireless device and/or the at least one UE IP address received from the SMF which is(are) associating with an always-on PDU session. In an example, the UDM may determine/select the SMF and/or the always-on PDU session for the application/service information based on the DNN, e.g. the DNN received from the NEF/AF is the same as the DNN received from the SMF which is associating with an always-on PDU session. In an example, the UDM may determine/select the SMF and/or the always-on PDU session for the application/service information based on the S-NSSAI and/or the S-NSSAI associated network slice instance identifier, e.g. the at least one S-NSSAI and/or at least one S-NSSAI associated network slice instance identifier received from the NEF/AF is(are) the same as the S-NSSAI and/or the S-NSSAI associated network slice instance identifier received from the SMF which is(are) associating with an always-on PDU session.

In an example action, the UDM may send to the selected SMF a message (e.g. always-on PDU session request, or application/service information provisional) comprising one or more information received from the NEF/AF. In an example, in response to the application/service information provisional message received from the UDM, the SMF may take one or more actions. For example, the SMF may determine/map the application/service information received from the UDM to an always-on PDU session based on the information received from the UDM, and/or the at least one always-on PDU session information stored in the SMF, and/or the user subscription information, and/or the local operator policies. In an example, the SMF may determine/map the application/service information to an always-on PDU session based on the requested media/application/service QoS and/or the QoS supported by an always-on PDU session. In an example, the SMF may determine/map the application/service information to an always-on PDU session if the requested media/application/service QoS (e.g. 5QI, ARP, and/or bandwidth) is the same as QoS (e.g. 5QI, ARP, and/or bandwidth) supported by an always-on PDU session. In an example, the SMF may determine/map the application/service information to an always-on PDU session if the requested media/application/service QoS (e.g. 5QI, ARP, and/or bandwidth) may be supported by an always-on PDU session, e.g. the requested media/application/service QoS is lower than the QoS supported by an always-on PDU session.

In an example, the SMF may determine/map the application/service information to an always-on PDU session based on the network slice information (e.g. S-NSSAI and/or S-NSSAI associated network slice instance identifier). In an example, the SMF may determine/map the application/service information to an always-on PDU session if the at least one S-NSSAI and/or at least one S-NSSAI associated network slice instance identifier received from the UDM may be supported by an always-on PDU session, e.g. a S-NSSAI and/or a S-NSSAI associated network slice instance identifier of the always-on PDU session is(are) the same as the at least one S-NSSAI and/or at least one S-NSSAI associated network slice instance identifier received from the UDM. In an example, the SMF may determine/map the application/service information to an always-on PDU session based on identity of the wireless device and/or UE IP address, e.g. if the at least one identity of a wireless device and/or UE IP address received from the UDM is the same as the identity of a wireless device and/or UE IP address of an always-on PDU session. In an example, the SMF may determine/map the application/service information to an always-on PDU session based on the DNN, e.g. if the DNN received from the UDM is the same as the DNN of an always-on PDU session. In an example, the SMF may determine/map the application/service information to an always-on PDU session based on the IP filter information, e.g. if an always-on PDU session comprises the IP filter information received from the UDM.

In an example action, the SMF may send to the UDM a response message (e.g. always-on PDU session response, or application/service information provisional response) comprising one or more of the following information: a cause value, PDU session ID. The cause value may be used to indicate whether the request sent from the UDM is success/allowed or not. The PDU session ID may be used to indicate the always-on PDU session which the application/service information associated to. In an example action, in response to the message received from the NEF, the UDM may send to the NEF a response message (e.g. always-on PDU session response, or application/service information provisional response) comprising one or more information (e.g. PDU session ID) received from the SMF. In an example action, in response to the message received from the AF, the NEF may send to the AF a response message (e.g. always-on PDU session response, or application/service information provisional response) comprising one or more information (e.g. PDU session ID) received from the UDM.

In an example action, the SMF determine/generate/create/derive at least one of the following user plane rules based on the received application/service information: at least one packet detection rule; at least one forwarding action rule; at least one QoS enforcement rule; or at least one usage reporting rule. The at least one user plane rule determined by the SMF may be applied to the always-on PDU session. The SMF may send to a UPF a message (e.g. N4 session establishment/modification request) comprising the at least one user plane rule determined by the SMF.

In an example, in response to the N4 session establishment/modification request message received from the SMF, the UPF may install the user plane rules received from the SMF, send to the SMF a response message (e.g. N4 session establishment/modification response), and enforce the user plane rules for the always-on PDU session.

In an example, the UPF may enforce the at least one packet detection rule by matching a user data/traffic packet with service data flow template (e.g. IP filter information for the application service, service data flow filters and/or application identifiers) and may apply other user plane rules (e.g. forwarding action rule, QoS enforcement rule, and usage reporting rule) to the data/traffic packets matched the packet detection rule.

Figure 31:
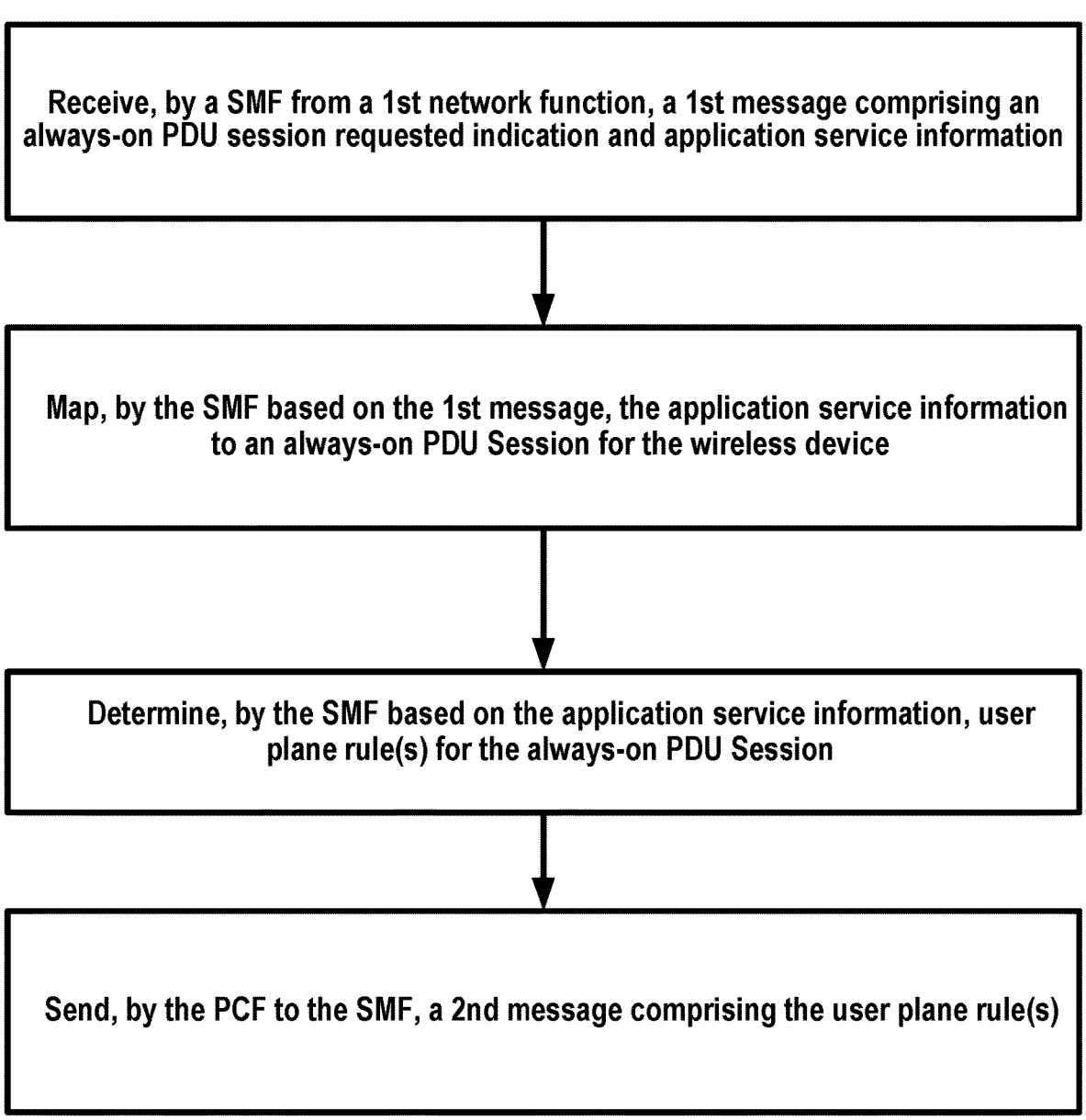
FIG. 31 is example diagram depicting the procedures of SMF as per an aspect of an embodiment of the present disclosure.
Figure 32:
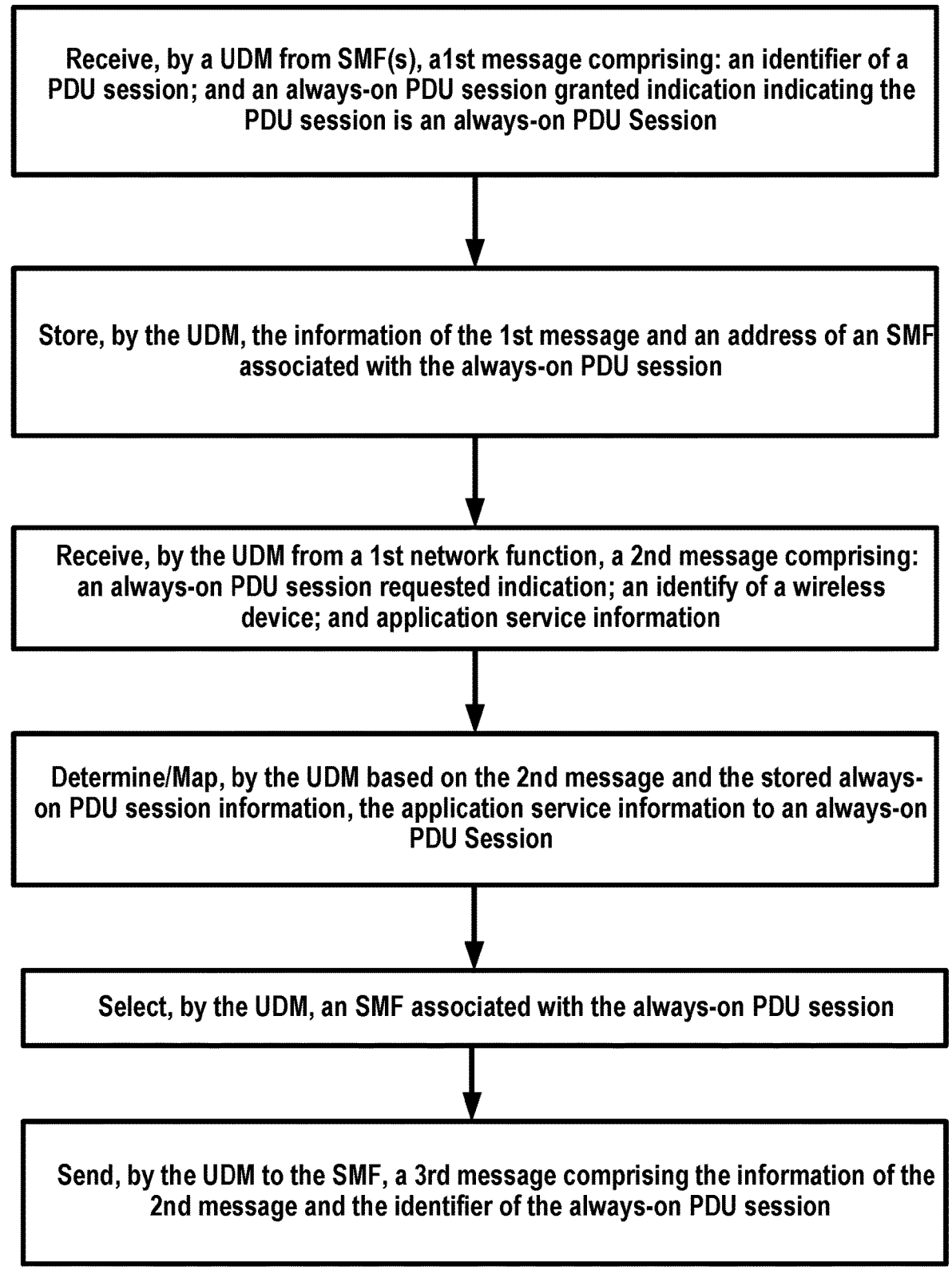
FIG. 32 is example diagram depicting the procedures of UDM as per an aspect of an embodiment of the present disclosure.

In an example, other interactions may be performed between SMF, AMF, (R)AN and UE for the PDU session modification procedure. FIG. 31 is example diagram depicting the procedures of SMF as per an aspect of an embodiment of the present disclosure. FIG. 32 is example diagram depicting the procedures of UDM as per an aspect of an embodiment of the present disclosure.

Figure 33:
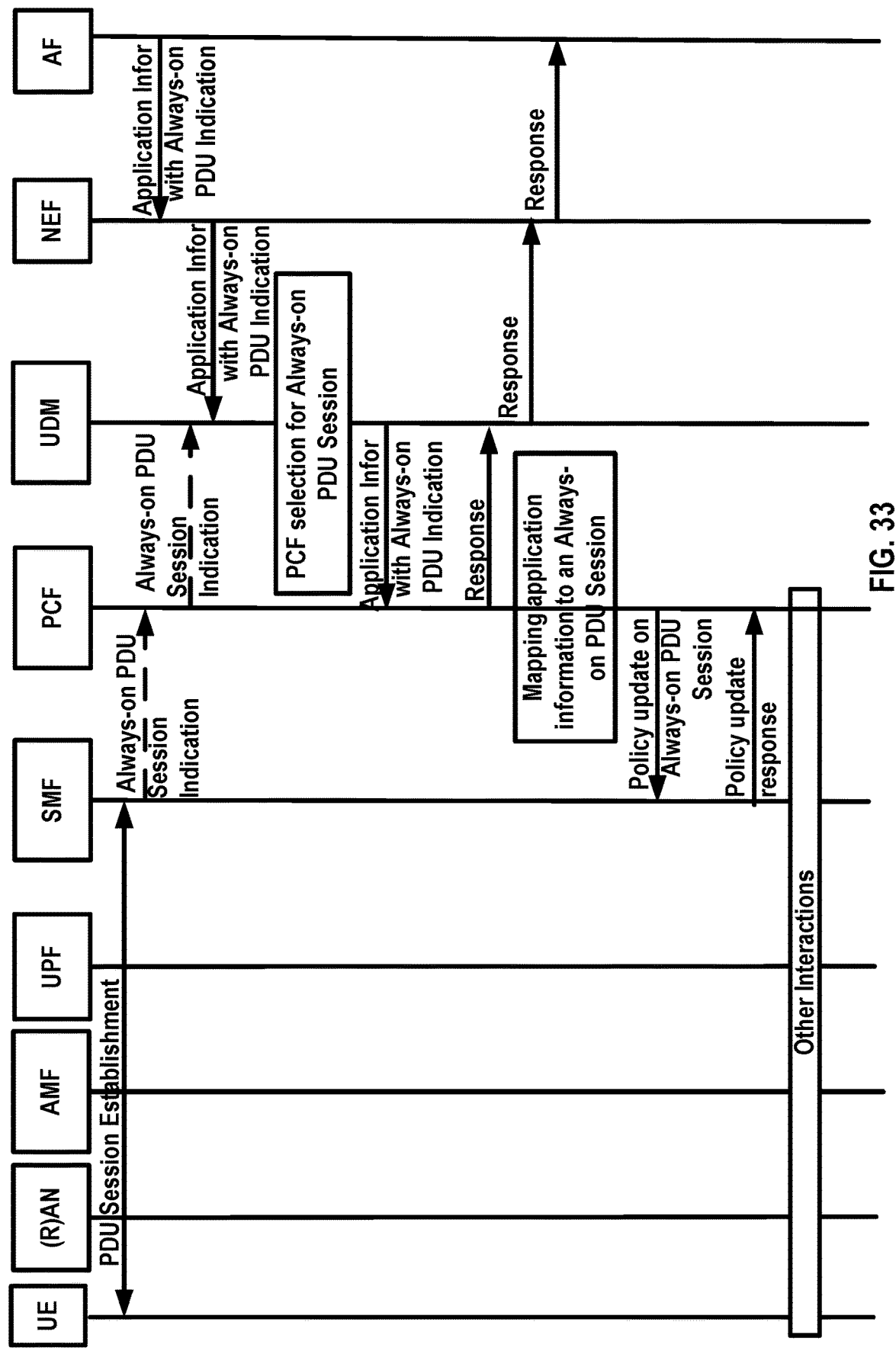
FIG. 33 is an example call flow as per an aspect of an embodiment of the present disclosure.

In an example, a UDM may comprise a mapping information between always-on PDU session(s) and PCF(s), e.g. an always-on PDU session may be associated with a PCF. When receives a request of always-on PDU session from a NEF or AF, the UDM may select a PCF which may be associated with an always-on PDU session, e.g. the PCF serves/supports the always-on PDU session. The UDM may send a request to the selected PCF. The PCF may map application/service information to an always-on PDU session. FIG. 33 shows an example call flow which may comprise one or more actions.

A UE may have established one or more PDU sessions between the UE and a data network (DN). During the PDU session establishment(s), the UE may request a SMF to establish at least one always-on PDU session for the one or more PDU sessions by comprising a first always-on PDU session indication (e.g. always-on PDU session requested indication) in the PDU session establishment request message (s), the SMF may request a PCF to grant the at least one always-on PDU session by sending the first always-on PDU session indication to the PCF, the PCF may grant the at least one always-on PDU session by determining at least one second always-on PDU session indication (e.g. always-on PDU session grant indication) and sending the at least one second always-on PDU session indication to the SMF, and the SMF may send the at least one second always-on PDU session indication to the UE.

In an example, the PCF may serve/support one or more always-on PDU session, and the one or more always-on PDU session may comprise always-on PDU session information. In an example, the always-on PDU session information may comprise at least one of the following information elements: the at least one second always-on PDU session indication and associated PDU session ID; at least one identity of a wireless device (e.g. SUPI, PEI, and/or GPSI), at least one UE IP address (e.g. UE IPv4 address and/or UE IPv6 network prefix), Default 5QI and default ARP, Type of PDU Session (e.g. IPv4, IPv6, IPv4v6, Ethernet, Unstructured); Access Type (e.g. 3GPP access); RAT Type (e.g. 3GPP-NR-FDD); a PLMN identifier; an application identifier; an allocated application instance identifier; DNN, S-NSSAI(s) and/or S-NSSAI(s) associated network slice instance identifier(s), user location information, information of the SMF for the at least one always-on PDU session (e.g. SMF identifier, IP address or FQDN of the SMF), or information of the PCF for the at least one always-on PDU session (e.g. PCF identifier, IP address or FQDN of the PCF). In an example, the always-on PDU session information may comprise the mapping information between a determined/granted always-on PDU session and other information elements of the always-on PDU session information (e.g. information of the SMF for the at least one always-on PDU session).

In an example, the PCF may send to a UDM a message (e.g. always-on PDU session information provisional) comprising always-on PDU session information. The UDM may store the always-on PDU session information which may comprise the mapping information between the always-on PDU session and other information elements of the always-on PDU session information (e.g. the PCF). In an example, the always-on PDU session may be identified by a PDU session ID. In an example, the always-on PDU session may be associated with a network slice identified by a S-NSSAI and/or a network slice instance identifier, e.g. the always-on PDU session may serve/support a network slice identified by a S-NSSAI and/or a network slice instance identifier. In an example, the always-on PDU session may be associated with a data network identified by a DNN, e.g. the always-on PDU session may serve/support a data network identified by a DNN.

In an example, an always-on PDU session may be needed to support an application service (e.g. an emergency service, or a low latency service), an application function (AF) may request an always-on PDU session for the application service for a wireless device by sending a message (e.g. always-on PDU session request, or application/service information provisional) to a NEF, the message sent to the NEF may comprise one or more of the following information elements: an always-on PDU session requested indication, at least one identity of a wireless device (e.g. SUPI, PEI, and/or GPSI), at least one UE IP address (e.g. UE IPv4 address and/or UE IPv6 network prefix), an DNN, at least one S-NSSAI and/or at least one S-NSSAI associated network slice instance identifier, and application/service information.

The always-on PDU session requested indication may be used by the AF to indicate a request for an always-on PDU session for the application service. The application/service information may comprise one or more of the information: IP filter information to identify a service data flow of the application service, an application identifier, a media/application/service type, and requested media/application/service QoS (e.g. 5QI, ARP, and/or bandwidth). In an example, the AF may send the message (e.g. always-on PDU session request, or application/service information provisional) to the UDM without via a NEF.

In an example, in response to the application/service information provisional message received from the AF, the NEF may send to the UDM a message (e.g. always-on PDU session request, or application/service information provisional) comprising one or more information received from the AF. In an example, in response to the application/service information provisional message received from the NEF, the UDM may take one or more actions. In an example action, the UDM may select an always-on PDU session for the application/service information. In an example action, the UDM may select a PCF which is associated with an always-on PDU session for the application/service information, e.g. the PCF serves/supports the always-on PDU session. The UDM may determine/select the PCF and/or the always-on PDU session for the application/service information based on the information received from the NEF/AF and/or the always-on PDU session information received from the PCF. In an example, the UDM may determine/select the PCF and/or the always-on PDU session for the application/service information based on the at least one identity of the wireless device (e.g. SUPI, PEI, and/or GPSI) and/or the at least one UE IP address (e.g. UE IPv4 address and/or UE IPv6 network prefix), e.g. the at least one identity of the wireless device and/or the at least one UE IP address received from the NEF/AF is (are) the same as the at least one identity of the wireless device and/or the at least one UE IP address received from the PCF which is(are) associating with an always-on PDU session. In an example, the UDM may determine/select the PCF and/or the always-on PDU session for the application/service information based on the DNN, e.g. the DNN received from the NEF/AF is the same as the DNN received from the PCF which is associating with an always-on PDU session. In an example, the UDM may determine/select the PCF and/or the always-on PDU session for the application/service information based on the S-NSSAI and/or the S-NSSAI associated network slice instance identifier, e.g. at least one S-NSSAI and/or at least one S-NSSAI associated network slice instance identifier received from the NEF/AF is(are) the same as the S-NSSAI and/or the S-NSSAI associated network slice instance identifier received from the PCF which is(are) associating with an always-on PDU session.

In an example action, the UDM may send to the selected PCF a message (e.g. always-on PDU session request, or application/service information provisional) comprising one or more information received from the NEF/AF. In an example, in response to the application/service information provisional message received from the UDM, the PCF may take one or more actions. For example, the PCF may determine/map the application/service information received from the UDM to an always-on PDU session based on the information received from the UDM, and/or the at least one always-on PDU session information stored in the PCF, and/or the user subscription information, and/or the local operator policies. In an example, the PCF may determine/map the application/service information to an always-on PDU session based on the requested media/application/service QoS and/or the QoS supported by an always-on PDU session. In an example, the PCF may determine/map the application/service information to an always-on PDU session if the requested media/application/service QoS (e.g. 5QI, ARP, and/or bandwidth) is the same as QoS (e.g. 5QI, ARP, and/or bandwidth) supported by an always-on PDU session. In an example, the PCF may determine/map the application/service information to an always-on PDU session if the requested media/application/service QoS (e.g. 5QI, ARP, and/or bandwidth) may be supported by an always-on PDU session, e.g. the requested media/application/service QoS is lower than the QoS supported by an always-on PDU session.

In an example, the PCF may determine/map the application/service information to an always-on PDU session based on the network slice information (e.g. S-NSSAI and/or S-NSSAI associated network slice instance identifier). In an example, the PCF may determine/map the application/service information to an always-on PDU session if the at least one S-NSSAI and/or at least one S-NSSAI associated network slice instance identifier received from the UDM may be supported by an always-on PDU session, e.g. a S-NSSAI and/or a S-NSSAI associated network slice instance identifier of the always-on PDU is(are) the same as the at least one S-NSSAI and/or at least one S-NSSAI associated network slice instance identifier received from the UDM. In an example, the PCF may determine/map the application/service information to an always-on PDU session based on the at least one identity of a wireless device and/or UE IP address, e.g. if the at least one identity of a wireless device and/or UE IP address received from the UDM is the same as the identity of a wireless device and/or UE IP address of an always-on PDU session. In an example, the PCF may determine/map the application/service information to an always-on PDU session based on the DNN, e.g. if the DNN received from the UDM is the same as the DNN of an always-on PDU session. In an example, the PCF may determine/map the application/service information to an always-on PDU session based on the IP filter information, e.g. if an always-on PDU session comprises the IP filter information received from the UDM. In an example, the always-on PDU session determined by the PCF may be associated with an SMF, e.g. the SMF serves/support the always-on PDU session.

In an example action, the PCF may send to the UDM a response message (e.g. always-on PDU session response, or application/service information provisional response) comprising one or more of the following information: a cause value, PDU session ID. The cause value may be used to indicate whether the request sent from the UDM is success/allowed or not. The PDU session ID may be used to indicate the always-on PDU session which the application/service information associated to. In an example action, in response to the message received from the NEF, the UDM may send to the NEF a response message (e.g. always-on PDU session response, or application/service information provisional response) comprising one or more information (e.g. PDU session ID) received from the PCF. In an example action, in response to the message received from the AF, the NEF may send to the AF a response message (e.g. always-on PDU session response, or application/service information provisional response) comprising one or more information (e.g. PDU session ID) received from the UDM.

In an example action, the PCF may make policy decision based on the application/service information received from the UDM. The PCF may determine/update one or more PCC rules applied to the always-on PDU session based on the application/service information received from the UDM. In an example, the determined/updated one or more PCC rules may comprise the IP filter information received from the UDM. In an example, the one or more PCC rules may comprise a QoS control rule and/or a charging control rule applied to the always-on PDU session. In an example, based on the requested media/application/service QoS (e.g. 5QI, ARP, and/or bandwidth) received from the UDM, the PCF may determine/update the QoS control rule applied to the always-on PDU session, e.g. the determined/updated QoS control rule may comprise 5QI, ARP, and/or bandwidth parameters which may support the requested media/application/service QoS. In an example, based on the media/application/service type received from the UDM, the PCF may determine/update the QoS control rule applied to the always-on PDU session, e.g. the determined/updated QoS control rule may comprise 5QI, ARP, and/or bandwidth parameters which may support the media/application/service type. In an example, based on the media/application/service type received from the UDM, the PCF may determine/update the charging control rule applied to the always-on PDU session, e.g. the determined/updated charging control rule may comprise a charging rate and/or a charging method parameter which may appropriate for the media/application/service type based on operator policy.

In an example action, the PCF may send to the SMF a message (e.g. SM policy association modification), where the SMF is associated with the determined always-on PDU session, e.g. the SMF serves/supports the determined always-on PDU session, and the SM policy association modification message may comprise the determined/updated one or more PCC rules applied to the always-on PDU session. In an example, in response to the SM policy association modification message received from the PCF, the SMF may send to the PCF a response message (e.g. SM policy association modification response). And the SMF may determine/update at least one of the following user plane rules based on the one or more PCC rules received from the PCF: at least one packet detection rule; at least one forwarding action rule; at least one QoS enforcement rule; or at least one usage reporting rule. The at least one user plane rule determined by the SMF may be applied to the always-on PDU session. In an example, the packet detection rule may comprise the IP filter information for the application service.

In an example action, the SMF may send to the UPF a message (e.g. N4 session establishment/modification request) comprising the at least one of the following user plane rules for the always-on PDU session: at least one packet detection rule; at least one forwarding action rule; at least one QoS enforcement rule; or at least one usage reporting rule.

In an example, in response to the N4 session establishment/modification request message received from the SMF, the UPF may install the user plane rules received from the SMF, send to the SMF a response message (e.g. N4 session establishment/modification response), and enforce the user plane rules for the always-on PDU session.

In an example, the UPF may enforce the at least one packet detection rule by matching a user data/traffic packet with service data flow template (e.g. IP filter information for the application service, service data flow filters and/or application identifiers) and may apply other user plane rules (e.g. forwarding action rule, QoS enforcement rule, and usage reporting rule) to the data/traffic packets matched the packet detection rule.

Figure 35:
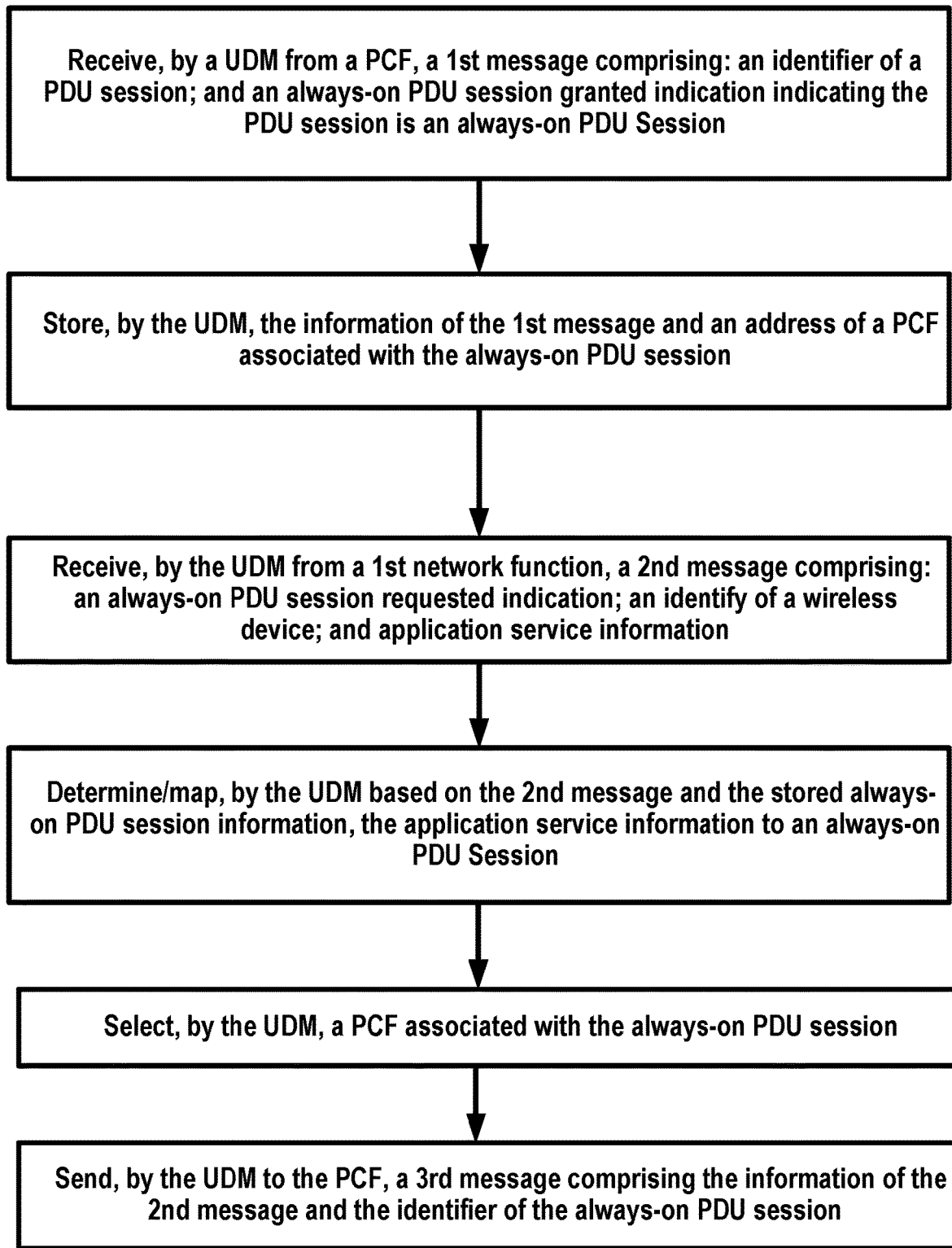
FIG. 35 is an example diagram depicting the procedures of UDM as per an aspect of an embodiment of the present disclosure.

In an example, other interactions may be performed between SMF, AMF, (R)AN and UE for the PDU session modification procedure. FIG. 34 is an example diagram depicting the procedures of PCF as per an aspect of an embodiment of the present disclosure. FIG. 35 is an example diagram depicting the procedures of UDM as per an aspect of an embodiment of the present disclosure.

Figure 36:
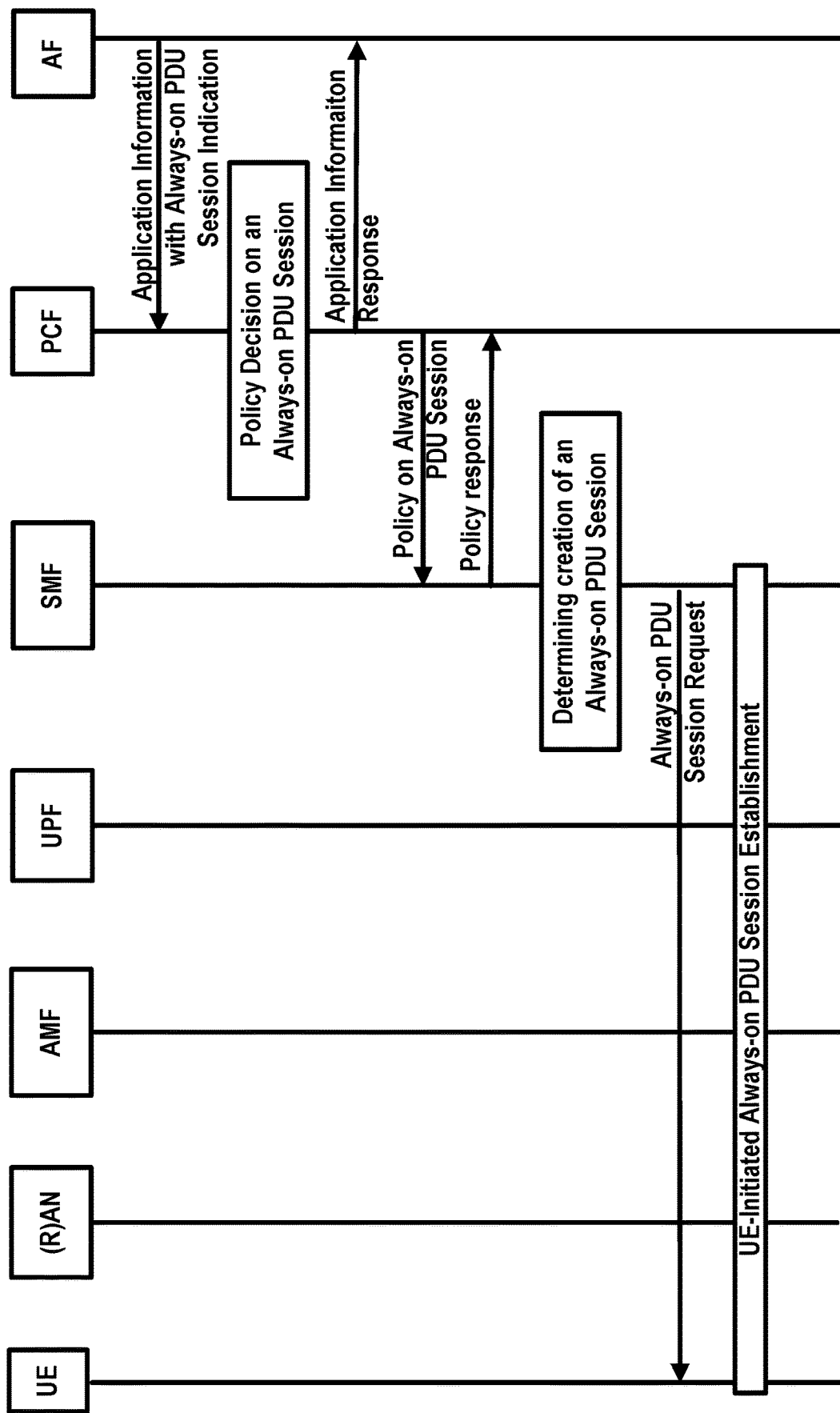
FIG. 36 is an example call flow as per an aspect of an embodiment of the present disclosure.

According to an example embodiment, a policy control function (PCF) may receive from an application function (AF) application/service information and always-on PDU session request indication, the PCF may determine one or more PCC rules for an always-on PDU session, and the PCF may send to a SMF a message comprising the one or more PCC rules for the always-on PDU session. The SMF may perform a network-initiated always-on PDU session procedure towards a wireless device. FIG. 36 shows an example call flow which may comprise one or more these actions.

According to an example embodiment, an always-on PDU session may be needed to support an application service (e.g. a low latency service), an application function (AF) may request an always-on PDU session for the application service by sending a message (e.g. always-on PDU session request, or application/service information provisional) to a PCF, the message sent to the PCF may comprise one or more of the following information: an always-on PDU session requested indication, at least one identity of a wireless device (e.g. SUPI, PEI, and/or GPSI), at least one UE IP address (e.g. UE IPv4 address and/or UE IPv6 network prefix), an DNN, at least one S-NSSAI and/or at least one S-NSSAI associated network slice instance identifier, and application/service information. The always-on PDU session requested indication may be used by the AF to indicate a request for an always-on PDU session for the application service. The application/service information may comprise one or more of the information: IP filter information to identify a service data flow of the application service, an application identifier, a media/application/service type, and requested media/application/service QoS (e.g. 5QI, ARP, and/or bandwidth).

According to an example embodiment, in response to the application/service information provisional message received from the AF, the PCF may take one or more actions. According to an example embodiment action, the PCF may make policy decision based on the application/service information received from the AF. The PCF may determine/create one or more PCC rules applied to the always-on PDU session based on the application/service information received from the AF. According to an example embodiment, the determined/created one or more PCC rules may comprise the IP filter information received from the AF. According to an example embodiment, the one or more PCC rules may comprise a QoS control rule and/or a charging control rule applied to the always-on PDU session. According to an example embodiment, based on the requested media/application/service QoS (e.g. 5QI, ARP, and/or bandwidth) received from the AF, the PCF may determine/create the QoS control rule applied to the always-on PDU session, e.g. the determined/created QoS control rule may comprise 5QI, ARP, and/or bandwidth parameters which may support the requested media/application/service QoS. According to an example embodiment, based on the media/application/service type received from the AF, the PCF may determine/create the QoS control rule applied to the always-on PDU session, e.g. the determined/created QoS control rule may comprise 5QI, ARP, and/or bandwidth parameters which may support the media/application/service type. According to an example embodiment, based on the media/application/service type received from the AF, the PCF may determine/create the charging control rule applied to the always-on PDU session, e.g. the determined/created charging control rule may comprise a charging rate and/or a charging method parameter which may appropriate for the media/application/service type based on operator policy.

According to an example embodiment action, the PCF may send to the AF a response message (e.g. always-on PDU session response, or application/service information provisional response) comprising a cause value indicating whether the request sent from the PCF is success/allowed or not.

According to an example embodiment action, the PCF may determine/select a SMF based on the information received from the AF, and/or user subscription information, and/or local operator policies, and/or SMF and wireless device association information. According to an example embodiment, the PCF may have the SMF and wireless device association information, e.g. the wireless device is serving by the SMF for one or more PDU sessions, the PCF may determine/select the SMF based on SMF and wireless device association information. According to an example embodiment, the PCF may determine/select a SMF based on user location information, e.g. a wireless device may be served by an SMF based on the user location information.

Figure 37:
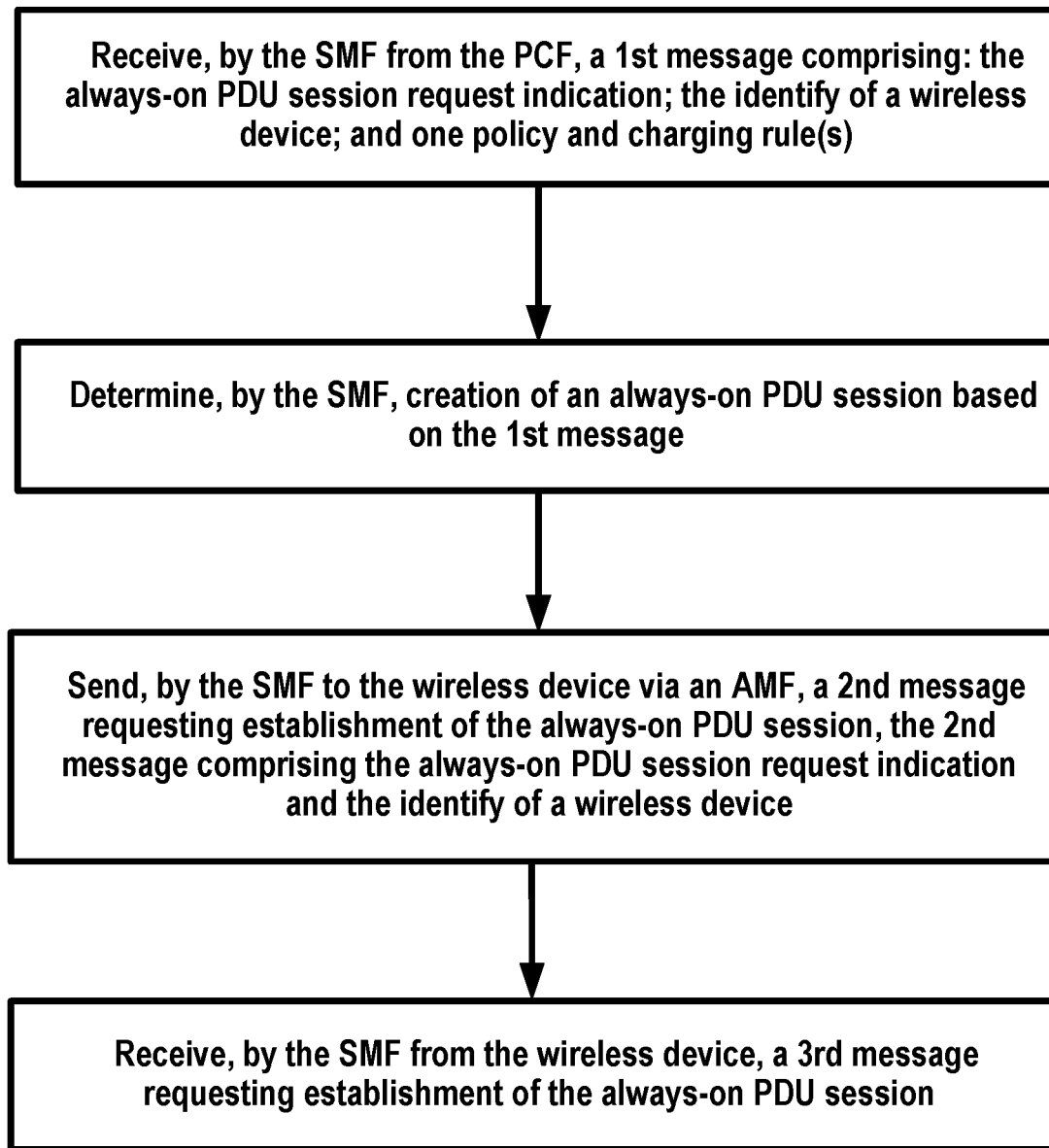
FIG. 37 is example diagram depicting the procedures of SMF as per an aspect of an embodiment of the present disclosure.

According to an example embodiment, the PCF may send to the SMF a message (e.g. SM policy association creation/modification) comprising the determined/created one or more PCC rules applied to the always-on PDU session and/or the always-on PDU session requested indication. According to an example embodiment, in response to the SM policy association creation/modification message received from the PCF, the SMF may send to the PCF a response message (e.g. SM policy association creation/modification response). According to an example embodiment, the SMF may determine creation of an always-on PDU session based on the information received from the PCF (e.g. the always-on PDU session requested indication). According to an example embodiment, the SMF may perform network-initiated always-on PDU session procedure towards the wireless device by sending to the UE a message (e.g. always-on PDU session request). The always-on PDU session request message sent to the UE may comprise an always-on PDU session establishment request indication. The always-on PDU session request message sent to the UE may comprise the at least one identity of a wireless device. The always-on PDU session request message sent to the UE may comprise the at least one UE IP address. The always-on PDU session request message sent to the UE may comprise the DNN, the at least one S-NSSAI. The always-on PDU session request message sent to the UE may comprise at least one S-NSSAI associated network slice instance identifier. The always-on PDU session request message sent to the UE may comprise IP filter information. According to an example embodiment, in response to the always-on PDU session request message received from the SMF, the UE may initiate a PDU session establishment procedure and indicating to the SMF that an always-on PDU session is requested. The SMF may grant the requested always-on PDU session and complete the PDU session establishment procedure. FIG. 37 is example diagram depicting the procedures of SMF as per an aspect of an embodiment of the present disclosure.

According to an example embodiment, a policy control function (PCF) may receive from an application function (AF), a first message comprising: an always-on PDU session requested indication; an identity of a wireless device; and application service information. According to an example embodiment, based on the first message, the PCF may map the application service information to an always-on PDU Session for the wireless device. According to an example embodiment, based on the application service information the PCF may determine at least one policy and charging rule for the always-on PDU Session. According to an example embodiment, the PCF may send to the SMF a second message comprising the at least one policy and charging rule.

According to an example embodiment, the PCF may map the application service information to an always-on PDU session based on requested media/application/service QoS of the AF and/or the QoS supported by an always-on PDU session. According to an example embodiment, the PCF may map the application service information to an always-on PDU session if the requested media/application/service QoS is supported by an always-on PDU session. According to an example embodiment, the PCF may map the application service information to an always-on PDU session based on network slice information, wherein the network slice information comprises S-NSSAI and/or S-NSSAI associated network slice instance identifier. According to an example embodiment, the PCF may map the application service information to an always-on PDU session based on the identity of a wireless device, wherein the identity of a wireless device comprises subscriber permanent identifier. According to an example embodiment, the PCF may map the application service information to an always-on PDU session based on the UE IP address, wherein the UE IP address comprises UE IPv4 address and/or UE IPv6 network prefix. According to an example embodiment, the PCF may map the application service information to an always-on PDU session based on DNN. According to an example embodiment, the PCF may map the application service information to an always-on PDU session based on IP filter information.

According to an example embodiment, the first message may comprise an DNN. According to an example embodiment, the first message may comprise at least one S-NSSAI and/or at least one S-NSSAI associated network slice instance identifier. According to an example embodiment, the application service information may comprise an information element indicating IP filter information to identify a service data flow. According to an example embodiment, the application service information may comprise an information element indicating a media type.

According to an example embodiment, the application service information may comprise an information element indicating an information element indicating a media or an application bandwidth requirement for QoS control. According to an example embodiment, the application service information may comprise an information element indicating an application identifier to identify an application or service. According to an example embodiment, the identity of a wireless device may comprise at least one of: an information element indicating a subscription permanent identifier (SUPI); an information element indicating a permanent equipment identifier (PEI); or an information element indicating a generic public subscription identifier (GPSI). According to an example embodiment, the identity of a wireless device may comprise an information element indicating an IPv4 address. According to an example embodiment, the identity of a wireless device may comprise an information element indicating an IPv6 network prefix.

According to an example embodiment, the PCF may receive from a SMF a third message comprising an always-on PDU session requested indication for at least one packet data unit (PDU) session. According to an example embodiment, based on the always-on PDU session requested indication, the PCF may determine an always-on PDU session granted indication indicating the at least one PDU Session to be an always-on PDU Session. According to an example embodiment, the PCF may send to the SMF, a fourth message comprising the always-on PDU session granted indication. According to an example embodiment, the SMF may determine at least one user plane rule based on the one or more PCC rules received from the PCF.

According to an example embodiment, a session management function (SMF) may receive from a first network function, a first message comprising: an always-on PDU session requested indication; an identity of a wireless device; and application service information. According to an example embodiment, based on the first message, the SMF may determine/map the application service information to an always-on PDU session. According to an example embodiment, based on the application service information, the SMF may determine at least one user plane rule for the always-on PDU session. According to an example embodiment, the SMF may send to a user plane function (UPF) a second message comprising the at least one user plane rule. According to an example embodiment, the first network function is a unified data management (UDM). According to an example embodiment, the first network function is a network exposure function (NEF).

According to an example embodiment, a unified data management (UDM) may receive from at least one session management function (SMF), a first message comprising: an identifier of a packet data unit (PDU) session; and an always-on PDU session granted indication indicating the PDU session is an always-on PDU Session. According to an example embodiment, the UDM may store the information of the first message and an address of an SMF associated with the always-on PDU session. According to an example embodiment, the UDM may receive from a first network function, a second message comprising: an always-on PDU session requested indication; an identity of a wireless device; and application service information. According to an example embodiment, based on the second message and the stored always-on PDU session information, the UDM may determine/map, the application service information to an always-on PDU Session. According to an example embodiment, the UDM may select an SMF associated with the always-on PDU session. According to an example embodiment, the UDM may send to the SMF, a third message comprising the information of the second message and the identifier of the always-on PDU session.

According to an example embodiment, a PCF may send to a unified data management (UDM), a first message comprising: an always-on PDU session granted indication for an always-on PDU session; an PDU session ID for the always-on PDU session; and an identity of a wireless device. According to an example embodiment, the PCF may receive from the UDM, a second message comprising: the always-on PDU session requested indication; the identity of a wireless device; and application service information. According to an example embodiment, based on the second message, the PCF may determine/map the application service information to the always-on PDU session for the wireless device. According to an example embodiment, based on the application service information, the PCF may determine at least one policy and charging rule for the always-on PDU session. According to an example embodiment, the PCF may send to the SMF, a third message comprising the at least one policy and charging rule.

According to an example embodiment, the SMF may receive from the PCF, a first message comprising: the always-on PDU session request indication; the identity of a wireless device; and the at least one policy and charging rule. According to an example embodiment, the SMF may determine creation of an always-on PDU session based on the first message. According to an example embodiment, the SMF may send to the wireless device via an access and mobility management function (AMF) a second message requesting establishment of the always-on PDU session, the second message comprising the always-on PDU session request indication and the identity of a wireless device. According to an example embodiment, the SMF may receive from the wireless device, a third message requesting establishment of the always-on PDU session.

According to an example embodiment, a policy control function (PCF) may receive from an application function (AF), a first message comprising: an always-on PDU session requested indication; an identity of a wireless device; and application service information. According to an example embodiment, based on the first message, the PCF may determine an always-on PDU session granted indication indicating the at least one PDU session is an always-on PDU Session; and at least one policy and charging rule for the always-on PDU session. According to an example embodiment, the PCF may send to the SMF, a third message comprising: the always-on PDU session granted indication; the identity of a wireless device; and the at least one policy and charging rule. According to an example embodiment, the SMF may send to the wireless device via an access and mobility management function (AMF) a second message requesting establishment of the always-on PDU session, the second message comprising the always-on PDU session request indication and the identity of a wireless device. According to an example embodiment, the SMF may receive from the wireless device, a third message requesting establishment of the always-on PDU session.

Figure 38:
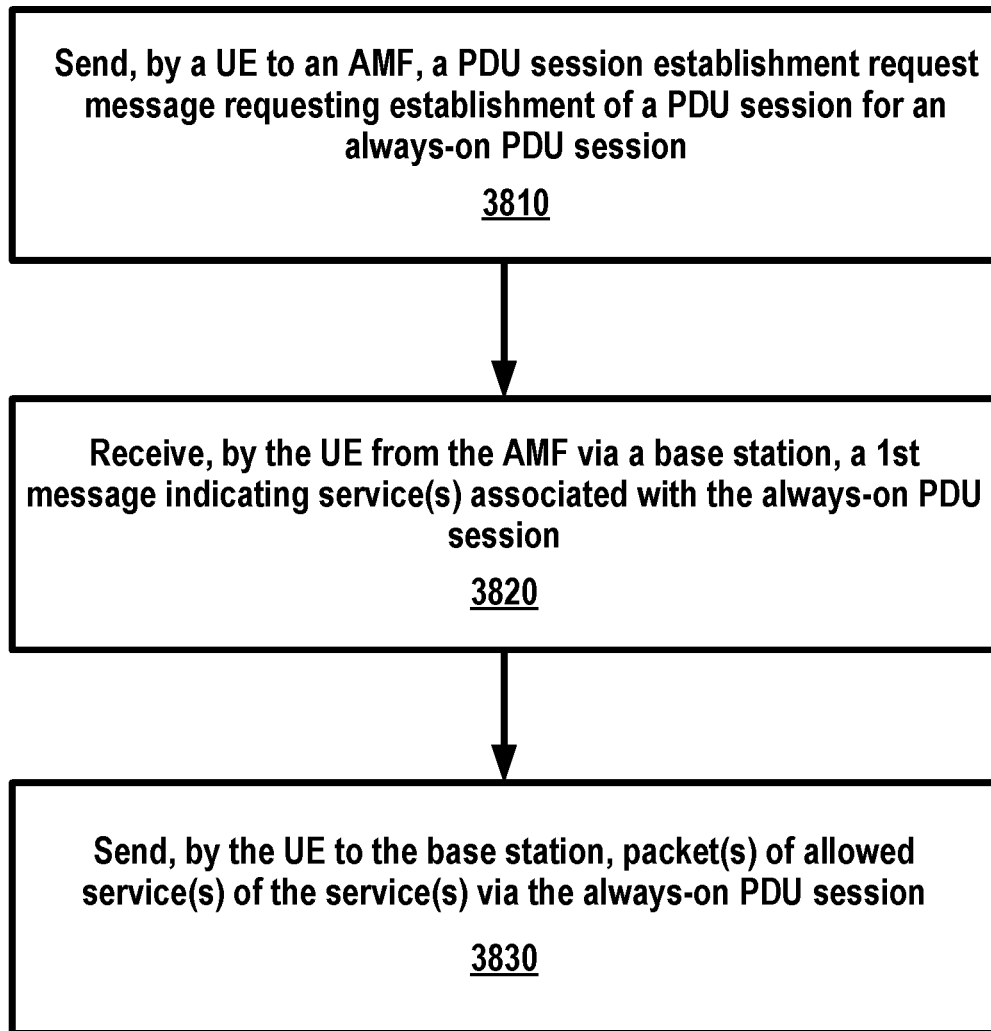
FIG. 38 is a flow diagram as per an aspect of an example embodiment of the present disclosure.

FIG. 38 is a flow diagram of an aspect of an embodiment of the present disclosure. At 3810, a wireless device may send to an access and mobility management function (AMF) a PDU session establishment request message requesting establishment of a packet data unit (PDU) session for an always-on PDU session. At 3820, the wireless device may receive from the AMF a first message indicating at least one service associated with the always-on PDU session. At 3830, the wireless device may send at least one packet of an at least one allowed service of the at least one service via the always-on PDU session.

In an example embodiment, the at least one service may comprise at least one of: an information element indicating a service type; an information element indicating an application identifier; or an information element indicating the at least one service is allowed or not. In an example embodiment, the service type comprises an information element indicating an emergency service. In an example embodiment, the service type comprises an information element indicating ultra-reliable low-latency communications (URLLC) service. In an example embodiment, the service type comprises an information element indicating vehicle-to-x communications (V2X) service. In an example embodiment, the service type comprises an information element indicating internet of things (IoT) service. In an example embodiment, the service type comprises an information element indicating voice over voice over long-term evolution (VoLTE). In an example embodiment, the AMF may send a SMF, a PDU session establishment request message comprising the parameter indicating the request for an always-on PDU session. In an example embodiment, the SMF may send to a UDM, a subscription request message requesting subscription information of the wireless device, the subscription request message may comprise an identity of the wireless device. In an example embodiment, the UDM may determine the first list of restricted services based on user subscription information. In an example embodiment, the SMF may receive from the UDM, a subscription response message comprising the first list of restricted services for the always-on PDU session of the wireless device. In an example embodiment, the SMF may grant the request for the always-on PDU session based on the first list of restricted services. In an example embodiment, the SMF may determine the at least one restricted service from the first list of restricted services for the always-on PDU session. In an example embodiment, the SMF may send to the wireless device via the AMF a second message comprising at least one of: the at least one restricted service; and/or a parameter indicating the request for the always-on PDU session is granted. In an example embodiment, the second message may be a restrict service provision message. In an example embodiment, the second message may be a Namf_Communication_N1N2MessageTransfer message. In an example embodiment, the SMF may determine at least one of the user plane rules based on the at least one restricted service. In an example embodiment, the SMF may select a UPF based on the second list of restricted services. In an example embodiment, the SMF may send to the UPF, the at least one of the user plane rules. In an example embodiment, the UPF may determine to forward or drop the user plane packet on an always-on PDU session based on the at least one of the user plane rules.

According to an example embodiment, a wireless device may send to an access and mobility management function (AMF), a PDU session establishment request message requesting establishment of a packet data unit (PDU) session of the wireless device. The PDU session establishment request message may comprise a parameter indicating a request for an always-on PDU session. According to an example embodiment, the wireless device may receive from the AMF via a base station, a first message indicating at least one restricted service for the always-on PDU session. According to an example embodiment, the wireless device may receive from the AMF via a base station, a first message indicating the request for the always-on PDU session is granted. According to an example embodiment, the wireless device may determine at least one allowed service from the at least one restricted service for the always on PDU session. According to an example embodiment, the wireless device may send to the base station, at least one packet of the at least one allowed service on the always-on PDU session.

According to an example embodiment, a session management function (SMF) may receive from a wireless device, a first message requesting establishment of a packet data unit (PDU) session as an always-on PDU session. According to an example embodiment, the SMF may determine a list of restricted services associated with the always-on PDU session. According to an example embodiment, the SMF may determine whether to grant the request for the always-on PDU session based on the list of restricted services. According to an example embodiment, the SMF may send to the wireless device, a second message indicating the list of restricted services and/or whether the request for the always-on PDU session is granted.

According to an example embodiment, a user plane function (UPF) may receive from a session management function (SMF) a first message comprising at least one user plane rule for an always-on PDU session for a wireless device. According to an example embodiment, the UPF may receive from the wireless device via a base station a user plane data packet on the always-on PDU session. According to an example embodiment, based on the at least one user plane rule, the UPF may determine forwarding the user plane data packet. According to an example embodiment, the UPF may send to a data network (DN) the user plane data packet. According to an example embodiment, the at least one user plane rule may indicate at least one restricted service. According to an example embodiment embodiment, the determining may be based on whether the user plane data packet is associated with the at least one restricted service. According to an example embodiment embodiment, the UPF may drop a second user plane data packet based on the user plane rule.

According to an example embodiment, a unified data management (UDM) may receive from a session management function (SMF) a first message comprising an always-on packet date unit (PDU) session requested indication and/or an identity of a wireless device. According to an example embodiment, based on the first message and subscription information of the wireless device, the UDM may determine a list of restricted services for an always-on PDU session of the wireless device. According to an example embodiment, the UDM may send to the SMF a second message comprising the list of restricted services.

According to an example embodiment, a policy control function (PCF) may receive from a session management function (SMF) a first message comprising a parameter indicating a request for an always-on packet data unit (PDU) session for at least one PDU session of a wireless device. According to an example embodiment, the PCF may send to a user data convergence (UDR) a subscription retrieval request for the wireless device. According to an example embodiment, the PCF may receive from the UDR a second message comprising a list of restricted services for an always-on PDU session for the wireless device. According to an example embodiment, the PCF may grant the request for the always-on PDU session based on the list of restricted services for the always-on PDU session of the wireless device. According to an example embodiment, the PCF may determine at least one restricted service from the list of restricted services for the always-on PDU session. According to an example embodiment, the PCF may send to the SMF a third message comprising the at least one restricted service and/or a parameter indicating the request for the always-on PDU session is granted. According to an example embodiment, the SMF may send to the wireless device a fourth message indicating the at least one restricted service and/or the request for the always-on PDU session is granted.

According to an example embodiment, a user data convergence (UDR) may receive from a policy control function (PCF) a first message comprising an always-on PDU Session Requested indication and/or an identity of a wireless device. According to an example embodiment, based on first message and a user subscription information, the UDR may determine a list of restricted services for an always-on PDU session of the wireless device. According to an example embodiment, the UDR may send to the PCF a second message comprising the list of restricted services.

According to an example embodiment, a policy control function (PCF) may receive from an access and mobility management function (AMF) a first message requesting a UE policy. The first message may comprise an identity of a wireless device. According to an example embodiment, the PCF may send to a user data convergence (UDR) a subscription retrieval request for the wireless device. According to an example embodiment, the PCF may receive from the UDR a second message comprising a list of restricted services for an always-on PDU session for the wireless device. According to an example embodiment, based on the list of restricted services, the PCF may determine at least one restricted service for the always-on PDU session for the wireless device. According to an example embodiment, the PCF may send to the AMF a third message comprising a UE route selection policy (URSP). The URSP may comprise the at least one restricted service. According to an example embodiment, the AMF may send to the wireless device through a base station a fourth message comprising the URSP and/or the at least one restricted service. According to an example embodiment, the wireless device may send to the base station the at least one restricted service on the always-on PDU Session.

Figure 39:
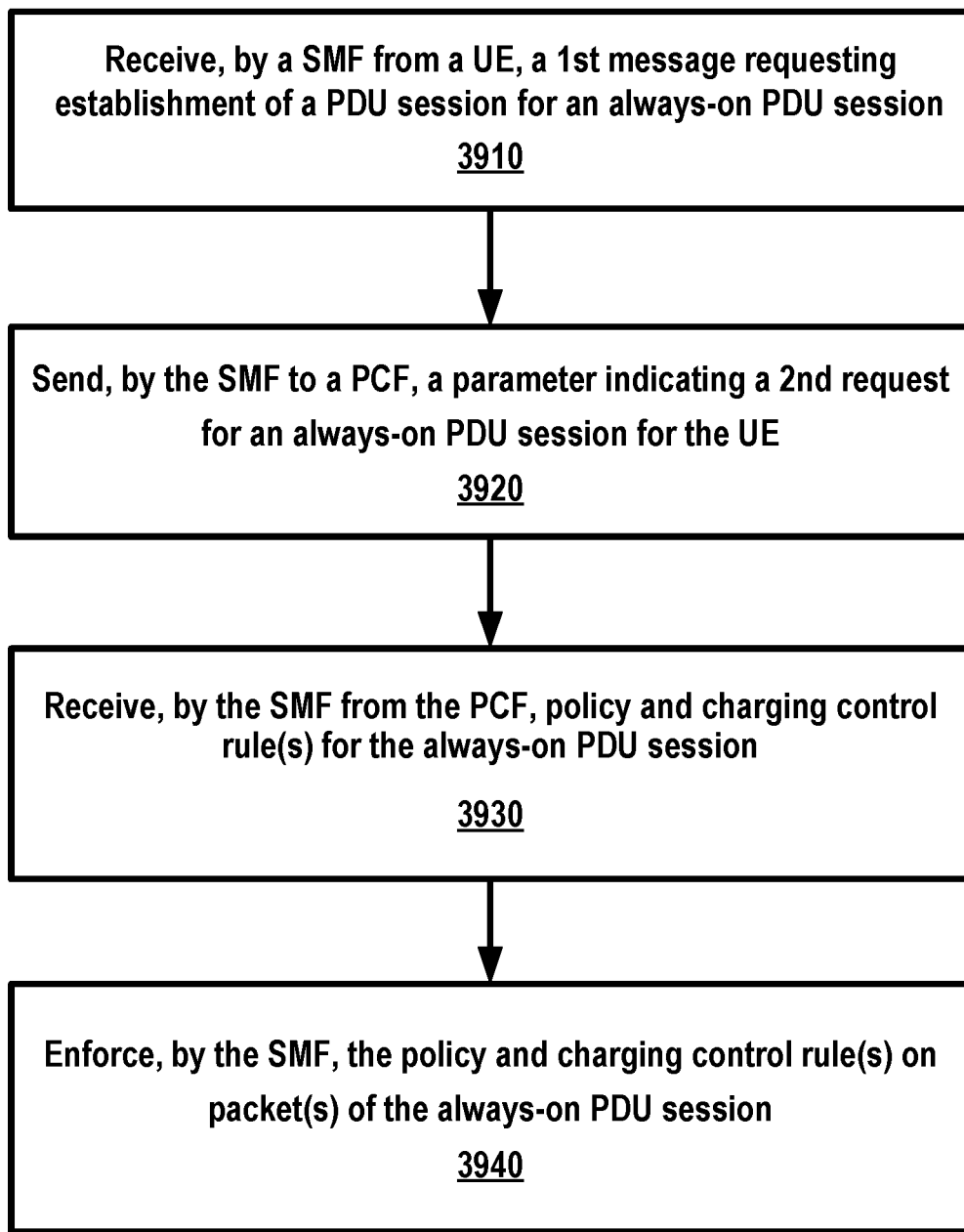
FIG. 39 is a flow diagram as per an aspect of an example embodiment of the present disclosure.

FIG. 39 is a flow diagram of an aspect of an embodiment of the present disclosure. At 3910, a session management function (SMF) may receive from a wireless device, a first request for establishment of a packet data unit (PDU) session for an always-on PDU session. At 3920, the SMF may send to a policy control function (PCF), a parameter indicating a second request for an always-on PDU session for the wireless device. At 3930, the SMF may receive from the PCF at least one policy and charging control rule for the always-on PDU session. At 3940, the SMF may enforce the policy and charging control rule on at least one packet of the always-on PDU session.

According to an example embodiment, a SMF may receive from a wireless device, a first message requesting establishment of a PDU session of the wireless device. The first message may comprise a parameter indicating a request for an always-on PDU session. According to an example embodiment, the SMF may send to a PCF a second message comprising the parameter indicating a request for an always-on PDU session for the wireless device. According to an example embodiment, the SMF may receive from the PCF a third message comprising at least one policy and charging control rule. The at least one policy and charging control rule may comprise a charging rate for the always-on PDU session. According to an example embodiment, the SMF may receive from the PCF a third message comprising an always-on PDU session granted indication indicating the request for an always-on PDU session is granted. According to an example embodiment, the SMF may determine a requested charging rate based on the charging rate. According to an example embodiment, the SMF may select a charging function (CHF) based on the at least one policy and charging control rule and the always-on PDU session granted indication. According to an example embodiment, the SMF may send to the CHF a charging request message comprising the requested charging rate and the always-on PDU session granted indication.

Figure 40:
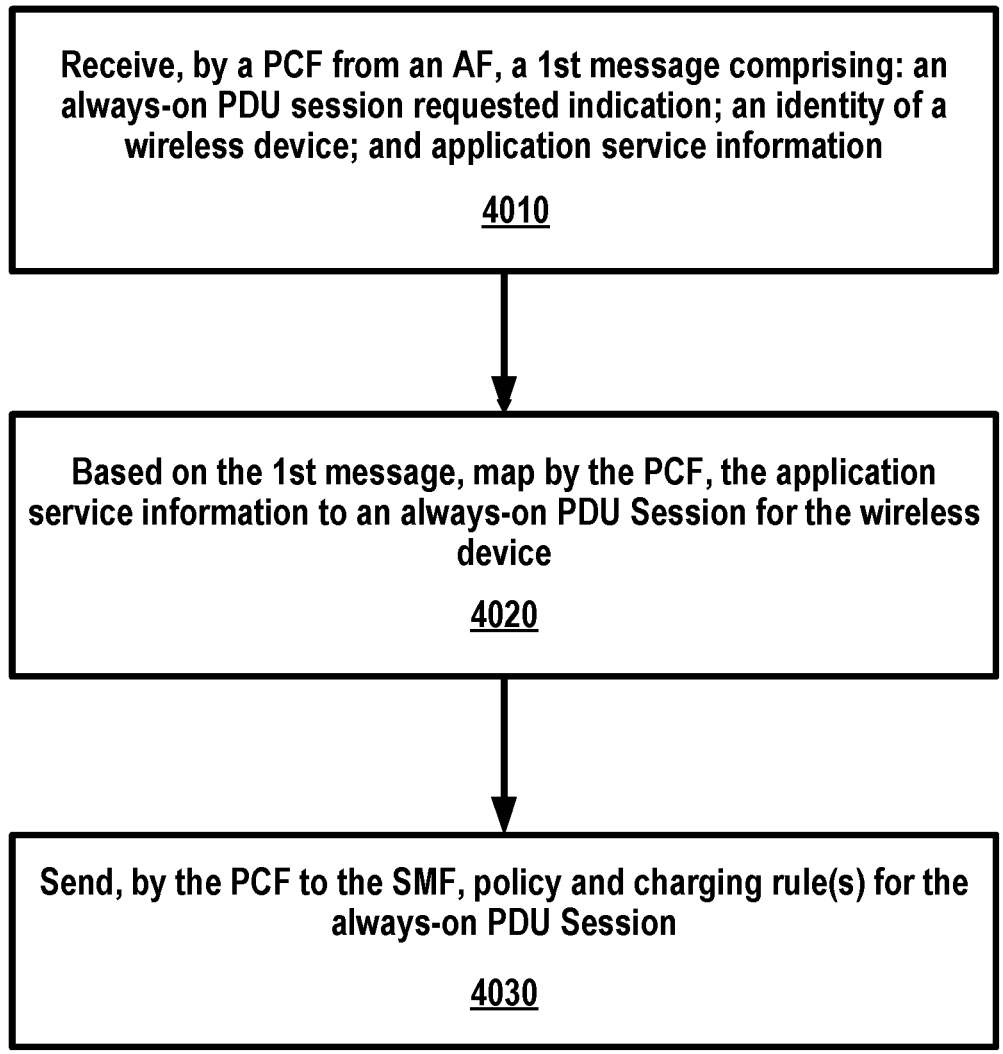
FIG. 40 is a flow diagram as per an aspect of an example embodiment of the present disclosure.

FIG. 40 is a flow diagram of an aspect of an embodiment of the present disclosure. At 4010, a PCF may receive from an AF a first message comprising an always-on PDU session requested indication. At 4010, a PCF may receive from an AF a first message comprising an identity of a wireless device. At 4010, a PCF may receive from an AF a first message comprising application service information. At 4020, based on the first message, the PCF may map the application service information to an always-on PDU Session for the wireless device. At 4030, the PCF may send to a session management function (SMF), at least one policy and charging rule for the always-on PDU Session.

According to an example embodiment, a PCF may receive from an AF a first message comprising an always-on PDU session requested indication. According to an example embodiment, a PCF may receive from an AF a first message comprising an identity of a wireless device. According to an example embodiment, a PCF may receive from an AF a first message comprising application service information. According to an example embodiment, based on the first message, the PCF may map the application service information to an always-on PDU Session for the wireless device. According to an example embodiment, based on the application service information, the PCF may determine at least one policy and charging rule for the always-on PDU Session. According to an example embodiment, the PCF may send to the SMF, a second message comprising the at least one policy and charging rule.

In this specification, "a" and "an" and similar phrases are to be interpreted as "at least one" and "one or more." In this specification, the term "may" is to be interpreted as "may, for example." In other words, the term "may" is indicative that the phrase following the term "may" is an example of one of a multitude of suitable possibilities that may, or may not, be employed to one or more of the various Examples. If A and B are sets and every element of A is an element of B, A is called a subset of B. In this specification, only non-empty sets and subsets are considered. For example, possible subsets of B={cell1, cell2} are: {cell1}, {cell2}, and {cell1, cell2}.

In this specification, various Examples are disclosed. Limitations, features, and/or elements from the disclosed example Examples may be combined to create further Examples within the scope of the disclosure.

In this specification, parameters (Information elements: IEs) may comprise one or more objects, and one of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example, when one or more messages comprise a plurality of parameters, it implies that a parameter in the plurality of parameters is in at least one of the one or more messages, but does not have to be in one of the one or more messages.

Many of the elements described in the disclosed Examples may be implemented as modules. A module is defined here as an isolatable element that performs a defined function and has a defined interface to other elements. The modules described in this disclosure may be implemented in hardware, software in combination with hardware, firmware, wetware (e.g. hardware with a biological element) or a combination thereof, some of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various Examples have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative Examples. Thus, the present Examples should not be limited by any of the above described exemplary Examples. In particular, it should be noted that, for example purposes, the above explanation has focused on the example(s) using 5G AN. However, one skilled in the art will recognize that Examples of the invention may be implemented in a system comprising one or more legacy systems or LTE. The disclosed methods and systems may be implemented in wireless or wireline systems. The features of various Examples presented in this invention may be combined. One or many features (method or system) of one Example may be implemented in other Examples. A limited number of example combinations are shown to indicate to one skilled in the art the possibility of features that may be combined in various Examples to create enhanced transmission and reception systems and methods.

In addition, it should be understood that any figures which highlight the functionality and advantages, are presented for example purposes. The disclosed architecture is sufficiently flexible and configurable, such that it may be utilized in ways other than that shown. For example, the actions listed in any flowchart may be re-ordered or optionally used in some examples.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A method comprising:
   receiving, by a policy control function (PCF) from an application function (AF), a first message comprising:
   an always-on packet data unit (PDU) session requested indication;
   an identity of a wireless device; and
   application service information;
   mapping, by the PCF based on the first message, the application service information to an always-on PDU session for the wireless device; and
   sending, by the PCF to a session management function (SMF), at least one policy and charging rule for the always-on PDU session.

2. The method of claim 1, further comprising mapping, by the PCF, the application service information to the always-on PDU session based on a quality of service (QoS) of the application service information from the AF or a QoS supported by the always-on PDU session.

3. The method of claim 2, further comprising mapping, by the PCF, the application service information to the always-on PDU session if the QoS of the application service information is supported by an always-on PDU session.

4. The method of claim 1, further comprising mapping, by the PCF, the application service information to the always-on PDU session based on network slice information, wherein the network slice information comprises single network slice selection assistance information (S-NSSAI) or a S-NSSAI associated network slice instance identifier.

5. The method of claim 1, further comprising mapping, by the PCF, the application service information to the always-on PDU session based on the identity of the wireless device, wherein the identity of the wireless device comprises subscriber permanent identifier.

6. The method of claim 1, further comprising mapping, by the PCF, the application service information to the always-on PDU session based on a UE IP address, wherein the UE IP address comprises UE IPv4 address or UE IPv6 network prefix.

7. The method of claim 1, further comprising mapping, by the PCF, the application service information to the always-on PDU session based on a data network name (DNN).

8. The method of claim 1, further comprising mapping, by the PCF, the application service information to the always-on PDU session based on internet protocol (IP) filter information.

9. The method of claim 1, wherein the first message further comprises a data network name (DNN).

10. The method of claim 1, wherein the first message further comprises at least one single network slice selection assistance information (S-NSSAI) or at least one S-NSSAI associated network slice instance identifier.

11. The method of claim 1, wherein the application service information comprises an information element indicating internet protocol (IP) filter information to identify a service data flow.

12. The method of claim 1, wherein the application service information comprises an information element indicating a media type.

13. The method of claim 1, wherein the application service information comprises an information element indicating a media or an application bandwidth requirement for quality of service (QoS) control.

14. The method of claim 1, wherein the application service information comprises an information element indicating an application identifier to identify an application or service.

15. The method of claim 1, wherein the identity of the wireless device comprises at least one of:
   a subscription permanent identifier (SUPI);
   a permanent equipment identifier (PEI); or
   a generic public subscription identifier (GPSI).

16. The method of claim 1, further comprising receiving, by the PCF from the SMF, a third message comprising the always-on PDU session requested indication for at least one PDU session.

17. The method of claim 16, further comprising determining, by the PCF based on the always-on PDU session requested indication, an always-on PDU session granted indication indicating at least one PDU session to be the always-on PDU session.

18. The method of claim 17, further comprising sending, by the PCF to the SMF, a fourth message comprising the always-on PDU session granted indication.

19. A method comprising:
   receiving, by a policy control function (PCF) from an application function (AF), a first message comprising:
   an always-on packet data unit (PDU) session requested indication;
   an identity of a wireless device; and
   application service information;
   mapping, by the PCF based on the first message, the application service information to an always-on PDU session for the wireless device;
   determining, by the PCF based on the application service information, at least one policy and charging rule for the always-on PDU session; and
   sending, by the PCF to a session management function (SMF), a second message comprising the at least one policy and charging rule.

20. A method comprising:
   receiving, by a session management function (SMF) from a policy control function (PCF), a first message comprising:
   an always-on packet data unit (PDU) session request indication;
   an identity of a wireless device; and
   at least one policy and charging rule;
   determining, by the SMF, creation of an always-on PDU session based on the first message;
   sending, by the SMF to the wireless device via an access and mobility management function (AMF), a second message requesting establishment of the always-on PDU session, the second message comprising the always-on PDU session request indication and the identity of the wireless device; and
   receiving, by the SMF from the wireless device, a third message requesting establishment of the always-on PDU session.

* * * * *